United States Patent
Ji et al.

(10) Patent No.: US 10,688,930 B2
(45) Date of Patent: Jun. 23, 2020

(54) CLOAKING DEVICES CONSTRUCTED FROM REFLECTION BOUNDARIES AND COLOR FILTERS AND VEHICLES COMPRISING THE SAME

(71) Applicant: Toyota Motor Engineering & Manufacturing North America, Inc., Erlanger, KY (US)

(72) Inventors: Chengang Ji, Ann Arbor, MI (US); Kyu-Tae Lee, Ann Arbor, MI (US); Debasish Banerjee, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 200 days.

(21) Appl. No.: 15/883,875

(22) Filed: Jan. 30, 2018

(65) Prior Publication Data

US 2019/0235143 A1     Aug. 1, 2019

(51) Int. Cl.
    *B60R 1/08*           (2006.01)
    *G02B 5/26*           (2006.01)
        (Continued)

(52) U.S. Cl.
CPC ............. *B60R 1/08* (2013.01); *B60R 1/00* (2013.01); *B60R 1/007* (2013.01); *B60R 1/081* (2013.01);
(Continued)

(58) Field of Classification Search
CPC ........... B60R 1/007; B60R 1/08; B60R 1/081; B60R 1/082; B60R 1/10; B60R 2300/202;
(Continued)

(56) References Cited

U.S. PATENT DOCUMENTS 3,792,916 A * 2/1974 Sarna ............... G02B 5/288
                                                   359/577
3,827,788 A * 8/1974 Clark ................ B60R 1/10
                                                   359/633
(Continued)

FOREIGN PATENT DOCUMENTS

WO      2006054648 A1    5/2006

OTHER PUBLICATIONS

Howell, et al. "Simple, broadband, optical spatial cloaking of very large objects," arXiv:1306.0863v3. (Year: 2013).*
(Continued)

*Primary Examiner* — Nicholas R. Pasko
(74) *Attorney, Agent, or Firm* — Dinsmore & Shohl LLP

(57) ABSTRACT

A cloaking device includes an object-side, an image-side, a cloaked region (CR) between the object-side and the image-side. An object-side CR reflection boundary and a plurality of object-side color filters are positioned on the object side and an image-side CR reflection boundary and a plurality of image-side color filters are positioned on the image-side. The plurality of object-side color filters are spaced apart from and positioned generally parallel to the object-side CR reflection boundary, and the plurality of image-side color filters are spaced apart from and positioned generally parallel to the image-side CR reflection boundary. The plurality of object-side color filters and the plurality of image-side color filters may be co-planar and light from an object located on the object-side of the cloaking device propagates via at least two optical paths to form an image of the object on the image-side of the cloaking device.

20 Claims, 8 Drawing Sheets

(51) Int. Cl.
*B60R 1/10* (2006.01)
*B60R 1/00* (2006.01)
*G02B 5/20* (2006.01)

(52) U.S. Cl.
CPC ............... *B60R 1/10* (2013.01); *G02B 5/20* (2013.01); *G02B 5/26* (2013.01)

(58) Field of Classification Search
CPC .......... G02B 1/002; G02B 1/007; G02B 5/26; G02B 17/006; G02B 17/023; G02B 17/0621; G02B 17/0642; G02B 27/14; G02B 27/145; A63H 33/22
USPC ....... 359/629, 839, 850, 854, 855, 856, 857, 359/860, 861
See application file for complete search history.

(56) References Cited

U.S. PATENT DOCUMENTS

| | | | | |
|---|---|---|---|---|
| 3,857,632 | A * | 12/1974 | Yamashita | B60R 1/084 359/512 |
| 5,392,161 | A * | 2/1995 | Weder | A63H 33/22 359/861 |
| 5,930,048 | A | 7/1999 | Kaneko | |
| 8,462,436 | B2 * | 6/2013 | Tilford | G02B 27/145 359/577 |
| 8,714,745 | B2 | 5/2014 | Inoko | |
| 9,971,162 | B2 * | 5/2018 | Banerjee | G02B 27/14 |
| 9,994,154 | B1 * | 6/2018 | Takagi | B60R 1/007 |
| 10,300,956 | B2 * | 5/2019 | He | G02B 5/045 |
| 10,317,685 | B1 * | 6/2019 | Lee | B60R 13/025 |
| 10,351,062 | B2 * | 7/2019 | Lee | B60R 1/081 |
| 10,421,402 | B2 * | 9/2019 | Lee | G02B 17/023 |
| 2013/0038956 | A1 * | 2/2013 | Matsumoto | B60R 1/006 359/857 |
| 2015/0183375 | A1 * | 7/2015 | Wu | G02B 17/023 359/734 |
| 2016/0318448 | A1 * | 11/2016 | Haruyama | B60R 1/04 |
| 2017/0010451 | A1 * | 1/2017 | Naya | G02B 5/04 |
| 2017/0113617 | A1 * | 4/2017 | Obata | B60R 1/082 |
| 2017/0227781 | A1 | 8/2017 | Banerjee et al. | |

OTHER PUBLICATIONS

Howell, et al. "Amplitude-only, passive, broadband, optical spatial cloaking of very large objects," Applied Optics, vol. 53, No. 9, pp. 1958-1963. (Year: 2014).*

Banenee, Debasish et al., "Invisibility cloak with image projection capability", Sci. Rep., 6: 38965 (2016).

"Physics demonstrations: cloaking device?", Apr. 25, 2013; URL: https://skullsinthestars.com/2013/04/25/physics-demonstrations-cloaking-device/.

U.S. Appl. No. 15/813,830, filed Nov. 15, 2017; Inventors: Kyu-Tae Lee et al.

U.S. Appl. No. 15/816,084, filed Nov. 17, 2017; Inventors: Kyu-Tae Lee et al.

* cited by examiner

CLOAKING DEVICES CONSTRUCTED FROM REFLECTION BOUNDARIES AND COLOR FILTERS AND VEHICLES COMPRISING THE SAME

TECHNICAL FIELD

The present specification generally relates to apparatuses and methods for making an object appear transparent and, more specifically, to cloaking devices for pillars of vehicles and vehicles comprising the same.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, a cloaked region (CR) between the object-side and the image-side, and a reference optical axis extending from the object-side to the image-side. An object-side CR reflection boundary and a plurality of object-side color filters spaced apart from and positioned generally parallel to the object-side CR reflection boundary are included, as are an image-side CR reflection boundary and a plurality of image-side color filters spaced apart from and positioned generally parallel to the image-side CR reflection boundary. The plurality of object-side color filters and the plurality of image-side color filters may be co-planar and light from an object located on the object-side of the cloaking device and obscured by the CR propagates via at least two optical paths to form an image of the object on the image-side of the cloaking device such that the light from the object appears to pass through the CR.

In some embodiments, each of the plurality of object-side color filters and each of the plurality of image-side color filters have a cut-off wavelength and the plurality of object-side and image-side color filters are sequentially arranged in a cut-off wavelength order between the reference optical axis and the bisecting axis. For example, in some embodiments, the plurality of object-side color filters may be a plurality object-side long-pass color filters and the plurality of image-side color filters comprise a plurality of image-side long-pass color filters. In such embodiments, each of the plurality of object-side long-pass color filters and each of the plurality of image-side long-pass color filters have a short cut-off wavelength, and the plurality of object-side long-pass and image-side long-pass colors filters may be sequentially arranged in a cut-off wavelength order between the reference optical axis and the bisecting axis with increasing short cut-off wavelengths from the reference optical axis to the bisecting axis. In other embodiments, the plurality of object-side color filters may be a plurality of object-side short-pass color filters and the plurality of image-side color filters may be a plurality of short-side long-pass color filters. In such embodiments, each of the plurality of object-side short-pass color filters and each of the plurality of image-side short-pass color filters have a long cut-off wavelength and the plurality of object-side short-pass and image-side short-pass color filters may be sequentially arranged in a cut-off wavelength order between the reference optical axis and the bisecting axis with decreasing long cut-off wavelengths from the reference optical axis to the bisecting axis.

According to another embodiment, a cloaking device assembly includes an object-side, an image-side, a cloaked region (CR) between the object-side and the image-side, a reference optical axis extending from the object-side to the image-side, and a bisecting axis extending between the object-side and the image-side. A first object-side CR reflection boundary and a plurality of first object-side color filters are positioned on a first side of the reference optical axis and the plurality of first object-side color filters are spaced apart from and positioned generally parallel to the first object-side CR reflection boundary. A second object-side CR reflection boundary and a plurality of second object-side color filters are positioned on a second side of the reference optical axis opposite the first side and the plurality of second object-side color filters are spaced apart from and positioned generally parallel to the second object-side CR reflection boundary. A first image-side CR reflection boundary and a plurality of first image-side color filters are positioned on the first side of the reference optical axis and the plurality of first image-side color filters are spaced apart from and positioned generally parallel to the first image-side CR reflection boundary. A second image-side CR reflection boundary and a plurality of second image-side color filters are positioned on the second side of the reference optical axis opposite the first image-side and the plurality of second image-side color filters are spaced apart from and positioned generally parallel to the second object-side CR reflection boundary. The plurality of first and second object-side color filters, and the plurality of first and second image-side color filters may be co-planar and light from an object located on the object-side of the cloaking device assembly and obscured by the CR is redirected around the CR via at least two optical paths on the first side of the reference optical axis and at least two optical paths on the second side of the reference optical axis to form an image of the object on the image-side of the cloaking device assembly.

In embodiments, the plurality of first object-side color filters on the first side of the reference optical axis may have a plurality of first cut-off wavelengths and the plurality of second object-side color filters on the second side of the reference optical axis may have a plurality of second cut-off wavelengths. In embodiments, the plurality of second cut-off wavelengths are equal to the plurality of first cut-off wavelengths. The plurality of first object-side color filters and the plurality of second object-side color filters are sequentially arranged in a cut-off wavelength order between the reference optical axis and the bisecting axis. Also, the plurality of first image-side color filters on the first side of the reference optical axis may have the plurality of first cut-off wavelengths and the plurality of second image-side color filters on the second side of the reference optical axis may have the plurality of second cut-off wavelengths. The plurality of first image-side color filters and the plurality of second image-side color filters are sequentially arranged in a cut-off wavelength order between the reference optical axis and the bisecting axis.

In some embodiments the plurality of first object-side color filters, the plurality of second object-side color filters, the plurality of first image-side color filters and the plurality of second image-side color filters are long-pass color filters. In such embodiments, the plurality of first object-side color filters, the plurality of second object-side color filters, the plurality of first image-side color filters and the plurality of second image-side color filters are sequentially arranged in a cut-off wavelength order between the reference optical axis and the bisecting axis with increasing short cut-off wavelengths from the reference optical axis to the bisecting axis. In other embodiments, the plurality of first object-side color filters, the plurality of second object-side color filters, the plurality of first image-side color filters and the plurality of second image-side color filters are short-pass color filters. In such embodiments, the plurality of first object-side color filters, the plurality of second object-side color filters, the plurality of first image-side color filters and the plurality of second image-side color filters are sequentially arranged in a cut-off wavelength order between the reference optical axis to the bisecting axis with decreasing long cut-off wavelengths from the reference optical axis to the bisecting axis.

According to another embodiment, a vehicle includes an A-pillar and a cloaking device positioned on the A-pillar. The cloaking device includes an object-side positioned on an exterior side of the vehicle, an image-side positioned on an interior side of the vehicle, a reference optical axis extending from the object-side to the image-side, a bisecting axis extending between the object-side and the image-side, and a cloaked region (CR) between the object-side and the image-side. An object-side CR reflection boundary and a plurality of object-side color filters spaced apart from and positioned generally parallel to the object-side CR reflection boundary, and an image-side CR reflection boundary and a plurality of image-side color filters spaced apart from and positioned generally parallel to the image-side CR reflection boundary, are included. Light from an object located on the object-side of the cloaking device and obscured by the A-pillar is redirected around the A-pillar via at least three optical paths to form an image of the object on the image-side of the cloaking device such that the light from the object appears to pass through the A-pillar.

In embodiments, the plurality of object-side color filters and the plurality of image-side color filters have a plurality of cut-off wavelengths and the plurality of object-side color filters and the plurality of image-side color filters are sequentially arranged in a cut-off wavelength order between the reference optical axis and the bisecting axis. In some embodiments, the plurality of object-side color filters are a plurality object-side long-pass color filters and the plurality of image-side color filters comprise a plurality of image-side long-pass color filters. In such embodiments, the plurality of object-side long-pass color filters and the plurality of image-side long-pass color filters are sequentially arranged in a cut-off wavelength order between the reference optical axis and the bisecting axis with increasing short cut-off wavelengths from the reference optical axis to the bisecting axis. In other embodiments, the plurality of object-side color filters are a plurality object-side short-pass color filters and the plurality of image-side color filters are a plurality of image-side short-pass color filters. In such embodiments, the plurality of object-side short-pass color filters and the plurality of image-side short-pass color filters are sequentially arranged in a cut-off wavelength order between the reference optical axis and the bisecting axis with decreasing long cut-off wavelengths from the reference optical axis to the bisecting axis.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of reflection boundaries and a plurality of color filters that reflect and transmit light around a cloaked region. The cloaking devices described herein may be used, for example and without limitation, to cloak vehicle articles such as a vehicle A-pillar, B-pillar, C-pillar, D-pillar, etc., and remove a "blind spot" caused by the vehicle article. A blind spot refers to a region of the vehicle where an occupant's view may be obstructed. In the alternative, or in addition to, cloaking devices described herein may be used to cloak home, office and industrial articles such as extension cords, electrical conduit, piping, etc. The utilization of the reflection boundaries and color filters allows an individual to perceive an image which, if not for the cloaking device, would be obstructed by an article. Various embodiments of cloaking devices and vehicles comprising the same will be described in further detail herein with specific reference to the appended drawings.

Figure 1A:
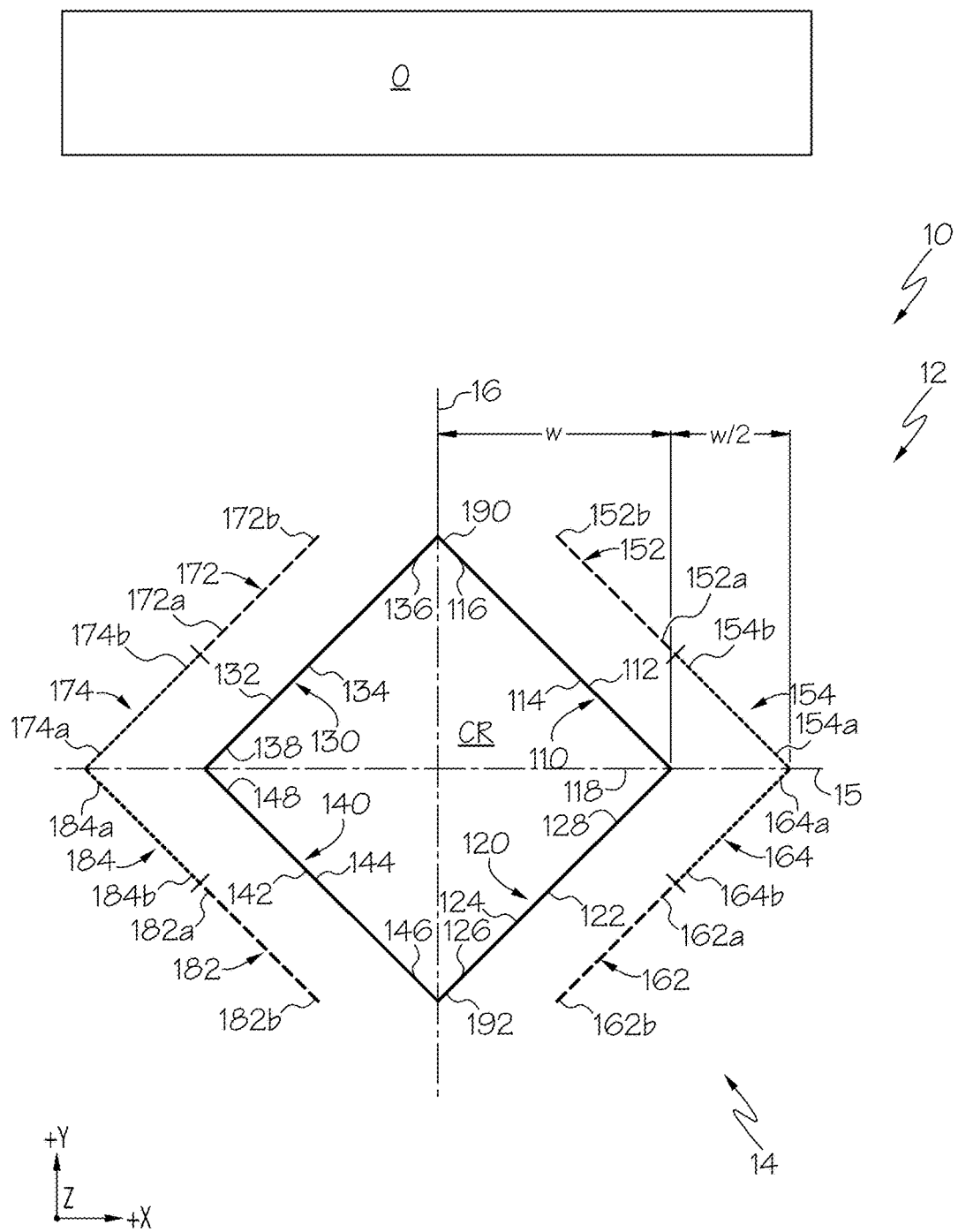
FIG. 1A schematically depicts a top view of a cloaking device assembly according to one or more embodiments described and illustrated herein.

FIG. 1A generally depicts one embodiment of a cloaking device. The cloaking device includes an object-side, an image-side, and a cloaked region (CR) between the image-side and the object-side. A CR reflection boundary and a plurality of dichroic color filters (also referred to herein simply as "color filters") are positioned on the object-side and another CR reflection boundary and another plurality of color filters are positioned on the image-side. As used herein the term "dichroic color filter" refers to a color filter that reflects a first range of light wavelengths above or below a cut-off wavelength "$\lambda_C$" and transmits light wavelengths below or above the cut-off wavelength $\lambda_C$, respectively. The terms "boundaries" and "boundary" refer to a physical surface.

Light from an object located on the object-side of the cloaking device and obscured by the cloaked region is redirected around the cloaked region via at least two optical paths to form an image of the object on the image-side of the cloaking device such that the light from the object appears to pass through the cloaked region. As used herein, the phrase "at least two optical paths" refers to a first optical path and a second optical path that is different than the first optical path due to different reflections by and/or transmittances through a plurality of optical components. For example, the first optical path may include light from the object on the object-side of the cloaking device being reflected by the CR reflection boundaries and color filters and the second optical path may include light from the object being transmitted through the color filters. Accordingly, the at least two optical paths redirect or "bend" light such that an individual will see the object located on the opposite side of the cloaked region (and thus on the opposite side of a cloaked article) giving the visual impression that the cloaked article is transparent.

Still referring to FIG. 1A, embodiments of a cloaking device include a cloaking device assembly 10 with an object-side 12, an image-side 14, four CR reflection boundaries 110, 120, 130, 140, and a cloaked region CR at least partially bounded by the CR reflection boundaries 110, 120, 130, 140. In embodiments, the CR reflection boundaries 110, 120, 130, 140 are planar reflection boundaries. In other embodiments, the CR reflection boundaries 110, 120, 130, 140 are not planar reflection boundaries. The object-side 12 is positioned above (+Y direction) a bisecting axis 15 and the image-side 14 is positioned below (−Y direction) the bisecting axis 15. That is, the bisecting axis 15 extends between and delineates the object-side 12 and the image-side 14. Each of the CR reflection boundaries 110, 120, 130, 140 has a length, a width and a height.

The CR reflection boundaries 110, 120, 130, 140 each has an outward facing reflection surface 112, 122, 132, 142 and an inward facing surface 114, 124, 134, 144, respectively. In embodiments, the inward facing surfaces 114, 124, 134, 144 may be an opaque surface that prevents light from within the cloaked region CR from propagating through the CR reflection boundaries 110, 120, 130, 140, respectively. The outward facing reflection surfaces 112, 122, 132, 142 may be made from omnidirectional photonic crystals or mirrors such that light incident on the outward facing reflection surfaces 112, 122, 132, 142 is reflected there from. In the alternative, one or more of the outward facing reflection surfaces 112, 122, 132, 142 may be a surface of a prism, e.g., a right angle prism, that totally internally reflects light incident on the surface. As used herein, the term "reflection surface" refers to a surface that reflects all modes of light (e.g. s-polarized light and p-polarized light) incident on the reflection surface. Also, as used herein the term "reflected there from" refers to at least 60% of incident light being reflected from a surface. In some embodiments, at least 70% of incident light is reflected from the surface, while in other embodiments at least 80% of incident light is reflected from the surface. In still other embodiments, at least 90% of incident light, for example at least 95% of incident light is reflected from the surface.

The CR reflection boundaries 110, 120, 130, 140 may have an apex end 116, 126, 136, 146 and a side end 118, 128, 138, 148, respectively. The side ends 118, 128, 138, 148 are spaced apart from the apex ends 116, 126, 136, 146, respectively, and the CR reflection boundaries 110, 120, 130, 140 extend between the apex ends 116, 126, 136, 146 and the side ends 118, 128, 138, 148, respectively. In embodiments, the apex ends 116, 136 of the two object-side CR reflection boundaries 110, 130, respectively, meet or intersect at an apex 190. In the alternative or in addition to, the apex ends 126, 146 of the two image-side CR reflection boundaries 120, 140, respectively, meet or intersect at an apex 192. In such embodiments, the reference optical axis 16 bisects the apex 190 and the apex 192, and may be a centerline between a first side (+X direction) and a second side (−X direction) of the cloaking device assembly 10. In other embodiments, the apex ends 116, 136 of the two object-side CR reflection boundaries 110, 130, respectively, are spaced apart (X direction) from each other and/or the apex ends 126, 146 of the two image-side CR reflection boundaries 120, 140, respectively, are spaced apart from each other such that an uncloaked region or gap (not shown) is present between the spaced apart apex ends 116, 136 and/or spaced apart apex ends 126, 146. In such embodiments, an image of the portion of the object O positioned above (+Y direction) the uncloaked region is not provided on the image-side 14 of the cloaking device assembly 10. Also, in embodiments, the side end 118 may be positioned adjacent to and may be joined to side end 128 and the side end 138 may be positioned adjacent to and may be joined to side end 148 as depicted in FIG. 1A. In other embodiments, the side ends 118, 138 may be spaced apart (Y direction) from the side ends 128, 148 (not shown).

The two CR reflection boundaries 110, 130 may be positioned on the object-side 12 of the cloaking device assembly 10 to face an object 'O' and may be referred to herein as object-side CR reflection boundaries 110, 130. Also, the object-side CR reflection boundary 110 is positioned on a first side (+X direction) of the reference optical axis 16 and may be referred to herein as a first object-side CR reflection boundary 110 and the object-side CR reflection boundary 130 is positioned on a second side (−X direction) of the reference optical axis 16 opposite the first side and may be referred to herein as a second object-side CR reflection boundary 130. The two CR reflection boundaries 120, 140 may be positioned on the image-side 14 of the cloaking device assembly 10 to provide an image 'I' formed by the cloaking device assembly 10 and may be referred to herein as image-side CR reflection boundaries 120, 140. The image-side CR reflection boundary 120 is positioned on the first side (+X direction) of the reference optical axis 16 and may be referred to herein as a first image-side CR reflection boundary 120 and the image-side CR reflection boundary 140 is positioned on the second side (−X direction) of the reference optical axis 16 opposite the first side and may be referred to herein as a second image-side CR reflection boundary 140.

In embodiments, the two object-side CR reflection boundaries 110, 130 and the two image-side CR reflection boundaries 120, 140 may be oriented at an acute angle (e.g., 45°) relative to the bisecting axis 15 and the reference optical axis 16, and form the cloaked region CR that is bound at least partly by the inward facing surfaces 114, 134, 124, 144, respectively. The two object-side CR reflection boundaries 110, 130 and the two image-side CR reflection boundaries 120, 140 have a height 'h' (FIG. 4) in the Z-direction of the coordinate axes in the figures and light reflected or transmitted within the cloaked region CR does not pass through the inward facing surfaces 114, 134, 124, 144. Accordingly, an article located within the cloaked region CR (e.g., a cloaked article) is not visible to an observer viewing the cloaking device assembly 10 from the image-side 14 in the +Y direction.

Still referring to FIG. 1A, the cloaking device assembly 10 may include a plurality of color filters (also referred to herein simply as "color filters") spaced apart from and positioned generally parallel (within +/−2°) with each of the CR reflection boundaries 110, 120, 130, 140. For example, in embodiments, two color filters 152, 154 are spaced apart from and positioned generally parallel to the first object-side CR reflection boundary 110; two color filters 162, 164 are spaced apart from and positioned generally parallel to the first image-side CR reflection boundary 120; two color filters 172, 174 are spaced apart from and positioned generally parallel to the second object-side CR reflection boundary 130; and two color filters 182, 184 are spaced apart from and positioned generally parallel to the second image-side CR reflection boundary 140. In embodiments, the color filters 152, 154 are co-planar, the color filters 162, 164 are co-planar, the color filters 172, 174 are co-planar, and the color filters 182, 184 are co-planar.

The two object-side color filters 152, 154 are positioned on the first side (+X direction) of the reference optical axis 16 of the cloaking device assembly 10 and may be referred to herein as first object-side color filters 152, 154. The two object-side color filters 172, 174 are positioned on the second side (−X direction) of the reference optical axis 16 opposite the first side and may be referred to herein as second object-side color filters 172, 174. The two image-side color filters 162, 164 are positioned on the first side (+X direction) of the reference optical axis 16 and may be referred to herein as first image-side color filters 162, 164. The two image-side color filters 182, 184 are positioned on the second side (−X direction) of the reference optical axis 16 and may be referred to herein as second image-side color filters 182, 184.

The color filters 152, 162, 172, 182 include a proximal end 152a, 162a, 172a, 182a, respectively, located proximal to the bisecting axis 15 and a distal end 152b, 162b, 172b, 182b, respectively, located distal from the bisecting axis 15. As used herein, the term "proximal end" refers to an end or edge of an optical component positioned proximal to a bisecting axis of a cloaking device assembly (compared to a distal end of the optical component) and the term "distal end" refers to an end or edge of an optical component positioned distal from the bisecting axis of the cloaking device assembly (compared to a proximal end of the optical component). The distal ends 152b, 162b, 172b, 182b are spaced apart from the proximal ends 152a, 162a, 172a, 182a, respectively, and the color filters 152, 162, 172, 182 extend from the proximal ends 152a, 162a, 172a, 182a to the distal ends 152b, 162b, 172b, 182b, respectively. Also, the color filters 154, 164, 174, 184 include a proximal end 154a, 164a, 174a, 184a, respectively, proximal to the bisecting axis 15 and a distal end 154b, 164b, 174b, 184b, respectively, distal from the bisecting axis 15. The distal ends 154b, 164b, 174b, 184b are spaced apart from the proximal ends 154a, 164a, 174a, 184a, respectively, and the color filters 154, 164, 174, 184 extend from the proximal ends 154a, 164a, 174a, 184a to the distal ends 154b, 164b, 174b, 184b, respectively. In embodiments, the distal ends 154b, 164b, 174b, 184b of the color filters 154, 164, 174, 184, respectively, are positioned in contact with the proximal ends 152a, 162a, 172a, 182a of the color filters 152, 162, 172, 182, respectively. In such embodiments, the distal ends 154b, 164b, 174b, 184b of the color filters 154, 164, 174, 184, respectively, may be attached to the proximal ends 152a, 162a, 172a, 182a of the color filters 152, 162, 172, 182, respectively.

Still referring to FIG. 1A, in some embodiments, the CR reflection boundaries 110, 120 are aligned at an angle of 45° relative to the reference optical axis 16 as depicted in FIG. 1A and the length of the first object-side color filter 152 extending from the proximal end 152a to the distal end 152b is equal to the length of the first object-side color filter 154 extending from the proximal end 154a to the distal end 154b. Also, the total length of the first object-side color filters 152 and 154 extending from the distal end 152b to the proximal end 154a is equal to the length of the first object-side CR reflection boundary 110 from the apex end 116 to the side end 118, and the distal end 154b of the first object-side color filter 154 is positioned on a line extending from the side end 118 parallel to the reference optical axis 16. In such embodiments, the width (X direction) of the cloaking device assembly 10 on the first side (+X direction) of the reference optical axis 16 is equal to the width 'w' of the cloaked region CR from the reference optical axis 16 to the side end 118 of the first object-side CR reflection boundary 110 plus the width w divided by the number of color filters spaced apart from and extending generally parallel to the first object-side CR reflection boundary 110, i.e., w/2. Accordingly, the width of the cloaking device assembly 10 on the first side (+X direction) of the reference optical axis 16 is equal to w+w/2=3/2·w.

Adjacent co-planar color filters, e.g., color filters 152, 154, color filters 162, 164, color filters 172, 174, and color filters 182, 184 are different color filters. As used herein, the phrase "different color filters" refers to color filters that reflect a different range of visible light. For example, the color filter 152 reflects a different range of visible light than the color filter 154, the color filter 162 reflects a different range of visible light than the color filter 164, the color filter 172 reflects a different range of visible light than the color filter 174, and the color filter 182 reflects a different range of visible light than the color filter 184.

In embodiments, the color filters color filters 152, 154, color filters 162, 164, color filters 172, 174, and color filters 182, 184 may be sequentially arranged in a cut-wavelength order between the reference optical axis 16 and the bisecting axis 15. As used herein, the phrase "sequentially arranged in a cut-off wavelength order" refers to a plurality of color filters co-planar between a reference optical axis and a bisecting axis and the plurality of color filters so arranged have either sequentially increasing or sequentially decreasing cut-off wavelengths starting from the color filter most proximal to the reference optical axis to the color filter most distal to the reference optical axis. The term "sequential" or "sequentially" refers to following a numerical increasing or decreasing pattern.

The color filters 152, 154, 162, 164, 172, 174, 182, 184 may be long-pass color filters, short-pass color filters, or a combination of long-pass color filters and short-pass color filters. As used herein, the phrase "long-pass color filter" refers to a dichroic color filter that reflects wavelengths that are shorter than a short cut-off wavelength $\lambda_{SC}$ of the dichroic color filter and transmits wavelengths longer than the short cut-off wavelength. As used herein, the phrase "short-pass color filter" refers to a dichroic color filter that reflects wavelengths that are longer than a long cut-off wavelength $\lambda_{LC}$ of the dichroic color filter and transmits wavelengths shorter than the long cut-off wavelength. Accordingly, long-pass color filters transmit "long" light wavelengths (i.e., wavelengths>$\lambda_{LC}$) and short-pass color filters transmit "short" light wavelengths (i.e., wavelengths<$\lambda_{LC}$). The phrase "short cut-off wavelength" or "$\lambda_{SC}$" as used herein refers to a light wavelength at which transmission through a long-pass color filter increases to 50% of total incident light on the long-pass dichroic filter and the phrase "long cut-off wavelength" or "$\lambda_{LC}$" as used herein refers to a wavelength at which transmission through a short-pass color filter decreases to 50% of total incident light on the short-pass dichroic color filter. In embodiments, the color filters 152, 154, 162, 164, 172, 174, 182, 184 are all long-pass color filters or all short-pass color filters. In other embodiments, the first side (+X direction) color filters, i.e., color filters 152, 154, 162, 164 are long-pass color filters and the second side (−X direction) color filters, i.e., the color filters 172, 174, 182, 184 are short-pass color filters. In still other embodiments, the first side (+X direction) color filters, i.e., color filters 152, 154, 162, 164 are short-pass color filters and the second side (−X direction) color filters, i.e., the color filters 172, 174, 182, 184 are long-pass color filters.

As noted above, the color filters 152, 162, 172, 182 may be different than the color filters 154, 164, 174, 184, respectively. Accordingly, in embodiments, the color filters 152, 162, 172, 182 may have a different cut-off wavelength ($\lambda_C$) than the color filters 154, 164, 174, 184. For example, if the color filters 152, 154, 162, 164, 172, 174, 182, 184 are long-pass color filters, the short cut-off wavelength of the long-pass color filter 152 (e.g., $\lambda_{SC1}$) may be less than the short cut-off wavelength of the long-pass color filter 154 (e.g., $\lambda_{SC2}$). Also, the short cut-off wavelength of the long-pass color filter 162 may be less than the short cut-off wavelength of the long-pass color filter 164, the short cut-off wavelength of the long-pass color filter 172 may be less than the short cut-off wavelength of the long-pass color filter 174, and the short cut-off wavelength of the long-pass color filter 182 may be less than the short cut-off wavelength of the long-pass color filter 184. In the alternative, if the color filters 152, 154, 162, 164, 172, 174, 182, 184 are short-pass color filters, the long cut-off wavelength of the short-pass color filter 152 (e.g., $\lambda_{LC1}$) may be greater than the long cut-off wavelength of the short-pass color filter 154 (e.g., $\lambda_{LC2}$). Also, the long cut-off wavelength of short-pass color filter 162 may be greater than the long cut-off wavelength of the short-pass color filter 164, the long cut-off wavelength of the short-pass color filter 172 may be greater than the long cut-off wavelength of the short-pass color filter 174, and the long cut-off wavelength the short-pass color filter 182 may be greater than the long cut-off wavelength of the short-pass color filter 184. In embodiments, the cut-off wavelengths of the first image-side color filters 162, 164 are the same as the cut-off wavelengths of the first object-side color filters 152, 154, respectively, and the cut-off wavelengths of the second image-side color filters 182, 184 are the same as the cut-off wavelengths of the second object-side color filters 172, 174, respectively. Also, the cut-off wavelengths of the first object-side color filters 152, 154 may be the same as the second object-side color filters 172, 174, respectively, and/or the cut-off wavelengths of the first image-side color filters 162, 164 may be the same as the second image-side color filters 182, 184, respectively.

Figure 1B:
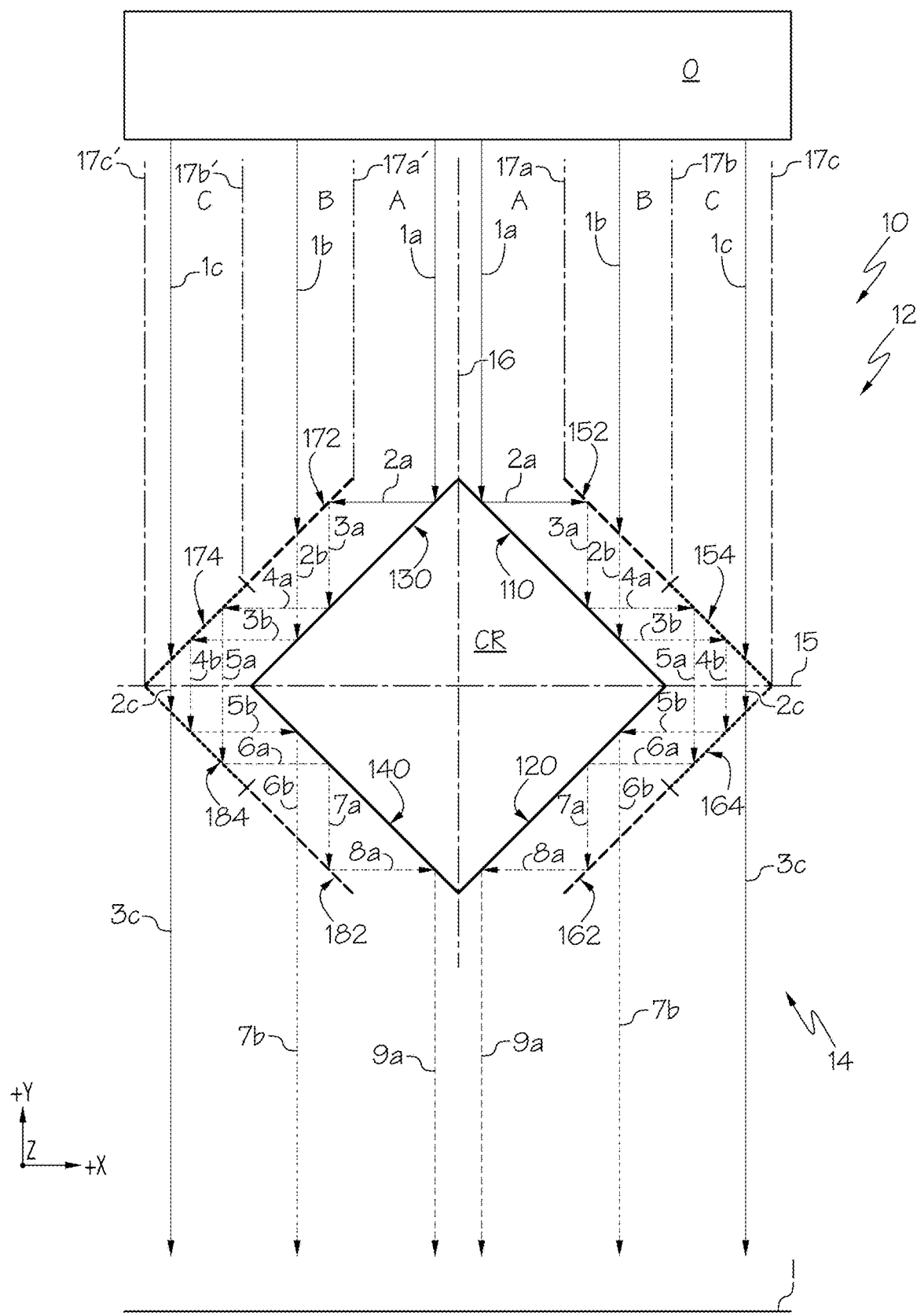
FIG. 1B schematically depicts a top view of the cloaking device assembly of FIG. 1A with light propagating from an object on an object-side of the cloaking device assembly to form an image on an image-side of the cloaking device assembly via three optical paths.

Referring now to FIGS. 1A and 1B, the cloaking device assembly 10 includes three optical paths for light from an object 'O' positioned on the object-side 12 to propagate and form an image 'I' on the image-side 14 on the first side (+X direction) of the reference optical axis 16. The cloaking device assembly 10 may also include three optical paths for light from an object 'O' positioned on the object-side 12 to propagate and form an image 'I' on the image-side 14 on the second side (−X direction) of the reference optical axis 16. Regarding the three optical paths on the first side (+X direction) of the reference optical axis 16, light from the object O incident on the cloaking device assembly 10 between the reference optical axis 16 and a first optical path transition axis 17a propagates via an optical path 'A'. Light from the object O incident on the cloaking device assembly 10 between the first optical path transition axis 17a and a second optical path transition axis 17b propagates via an optical path 13'. Light from the object O positioned above (+Y direction) the cloaking device assembly 10 between the second optical path transition axis 17b and a third optical path transition axis 17c propagates via an optical path 'C'. The first optical path transition axis 17a extends parallel to the Y-axis in the figures from the distal end 152b (FIG. 1A) of the first object-side color filter 152 to the object O. Accordingly, light propagating via optical path A is incident on the first object-side CR reflection boundary 110. The second optical path transition axis 17b extends parallel to the Y-axis from the distal end 154b (FIG. 1A) of the first object-side color filter 154 to object O. Accordingly, light propagating via optical path B is incident on the first object-side color filter 152. The third optical path transition axis 17c extends parallel to the Y-axis from the proximal end 154a (FIG. 1A) of the first object-side color filter 154 to the object O. Accordingly, light propagating via optical path C is incident on the first object-side color filter 154.

Regarding the first optical path A on the first side (+X direction) of the reference optical axis 16, light from the object O positioned above (+Y direction) the cloaking device assembly 10 between the reference optical axis 16 and the first optical path transition axis 17a is incident on the first object-side CR reflection boundary 110 (shown as arrow '1a' in FIG. 1B) where it is reflected by the outward facing reflection surface 112 (FIG. 1A) as light 2a. The first object-side CR reflection boundary 110 is positioned relative to the first object-side color filter 152 such that light 2a reflected by the outward facing reflection surface 112 of the first object-side CR reflection boundary 110 is incident on the first object-side color filter 152. In embodiments where the color filters 152, 154, 162, 164 are long-pass color filters, the first object-side color filter 152 and the first image-side color filter 162 have a short cut-off wavelength $\lambda_{SC1}$, and the first object-side color filter 154 and the first image-side color filter 164 have a short cut-off wavelength $\lambda_{SC2}$ that is greater than $\lambda_{SC1}$ ($\lambda_{SC1} < \lambda_{SC2}$) Wavelengths of light 2a shorter than $\lambda_{SC1}$ are reflected by the first object-side color filter 152 as light 3a and wavelengths of light 2a longer than $\lambda_{SC1}$ are transmitted through the first object-side color filter 152 (not shown). The first object-side color filter 152 is positioned relative to the first object-side CR reflection boundary 110 such that light 3a reflected by the first object-side color filter 152 is incident on the outward facing reflection surface 112 of the first object-side CR reflection boundary 110 where it is reflected as light 4a. The first object-side CR reflection boundary 110 is positioned relative to the first object-side color filter 154 with $\lambda_{SC2}$ such that light 4a reflected by the outward facing reflection surface 112 is incident on the first object-side color filter 154. Light 4a has wavelengths shorter than $\lambda_{SC1}$ and is reflected by the first object-side color filter 154. That is, since the first object-side color filter 154 with $\lambda_{SC2}$ reflects electromagnetic radiation with wavelengths shorter than $\lambda_{SC2}$, and light 4a has wavelengths shorter than $\lambda_{SC1}$ (which is less than $\lambda_{SC2}$), all of light 4a is reflected by the first object-side color filter 154 as light 5a. The first object-side color filter 154 is positioned relative to the first image-side color filter 164 such that light 5a reflected by the first object-side color filter 154 is incident on the first image-side color filter 164 with $\lambda_{SC2}$ where it is reflected as light 6a. The first image-side color filter 164 is positioned relative to the first image-side CR reflection boundary 120 such that light 6a reflected by the first image-side color filter 164 is incident on the outward facing reflection surface 122 (FIG. 1A) where it is reflected as light 7a. The first image-side CR reflection boundary 120 is positioned relative to the first image-side color filter 162 with $\lambda_{SC1}$ such that light 7a reflected by the outward facing reflection surface 122 is incident on the first image-side color filter 162 where it is reflected as light 8a. The first image-side color filter 162 is positioned relative to the first image-side CR reflection boundary 120 such that light 8a reflected by the first image-side color filter 162 is incident on the outward facing reflection surface 122 where it is reflected as light 9a generally parallel to light 1a and forms a portion of the image I on the image-side 14 of the cloaking device assembly 10. It should be understood that the portion of the image I on the image-side 14 formed by light 9a on the first side (+X direction) of the reference optical axis 16 is formed from light with wavelengths shorter than $\lambda_{SC1}$.

Still referring to optical path A on the first side (+X direction) of the reference optical axis 16 in FIG. 1A, in embodiments where the color filters 152, 154, 162, 164 are short-pass color filters, the first object-side color filter 152 and the first image-side color filter 162 have a long cut-off wavelength $\lambda_{LC1}$, and the first object-side color filter 154 and the first image-side color filter 164 have a long cut-off wavelength $\lambda_{LC2}$ that is less than $\lambda_{LC1}$ ($k_{LC1} > \lambda_{LC2}$). Accordingly, wavelengths of light 2a longer than $\lambda_{LC1}$ are reflected by the first object-side color filter 152 as light 3a and wavelengths of light 2a lower than $\lambda_{LC1}$ are transmitted through the first object-side color filter 152 (not shown). The first object-side color filter 152 is positioned relative to the first object-side CR reflection boundary 110 such that light 3a reflected by the first object-side color filter 152 is incident on the outward facing reflection surface 112 of the first object-side CR reflection boundary 110 where it is reflected as light 4a. The first object-side CR reflection boundary 110 is positioned relative to the first object-side color filter 154 with $\lambda_{LC2}$ such that light 4a reflected by the outward facing reflection surface 112 is incident on the first object-side color filter 154. Light 4a has wavelengths longer than $\lambda_{LC1}$ and is reflected by the first object-side color filter 154. That is, since the first object-side color filter 154 with $k_{LC2}$ reflects light with wavelengths longer than $\lambda_{LC2}$, and light 4a has wavelengths longer than $\lambda_{LC1}$ (which is greater than $\lambda_{LC2}$), all of light 4a is reflected by the first object-side color filter 154 as light 5a. The first object-side color filter 154 is positioned relative to the first image-side color filter 164 $\lambda_{LC2}$ such that light 5a reflected by the first object-side color filter 154 is incident on the first image-side color filter 164 where it is reflected as light 6a. The first image-side color filter 164 is positioned relative to the first image-side CR reflection boundary 120 such that light 6a reflected by the first image-side color filter 164 is incident on the outward facing reflection surface 122 (FIG. 1A) where it is reflected as light 7a. The first image-side CR reflection boundary 120 is positioned relative to the first image-side color filter 162 $\lambda_{LC1}$ such that light 7a reflected by the outward facing reflection surface 122 is incident on the first image-side color filter 162 where it is reflected as light 8a. The first image-side color filter 162 is positioned relative to the first image-side CR reflection boundary 120 such that light 8a reflected by the first image-side color filter 162 is incident on the outward facing reflection surface 122 where it is reflected as light 9a generally parallel to light 1a and forms a portion of the image I on the image-side 14 of the cloaking device assembly 10. It should be understood that the portion of the image I on the image-side 14 formed by light 9a on the first side (+X direction) of the reference optical axis 16 is formed from light with wavelengths longer than $\lambda_{LC1}$.

Accordingly, light from the object O may travel from the object-side 12 to the image-side 14 on the first side (+X direction) of the reference optical axis 16 via the first optical path A: object O—first object-side CR reflection boundary 110—first object-side color filter 152—first object-side CR reflection boundary 110—first object-side color filter 154—first image-side color filter 164—first image-side CR reflection boundary 120—first image-side color filter 162—first image-side CR reflection boundary 120—image I. That is, light from the object O may travel from the object-side 12 to the image-side 14 on the first side (+X direction) of the reference optical axis 16 via the first optical path A: object O reflection from first object-side CR reflection boundary 110—reflection from first object-side color filter 152—reflection from first object-side CR reflection boundary 110—reflection from first object-side color filter 154—reflection from first image-side color filter 164—reflection from first image-side CR reflection boundary 120—reflection from first image-side color filter 162—reflection from first image-side CR reflection boundary 120—image I.

Regarding the second optical path B on the first side (+X direction) of the reference optical axis 16, light from the object O positioned above (+Y direction) the cloaking device assembly 10 between the first optical path transition axis 17a and the second optical path transition axis 17b is incident on the first object-side color filter 152 (shown as arrow '1b' in FIG. 1B). In embodiments where the color filters 152, 154, 162, 164 are long-pass color filters, the color filters 152, 162 have the short cut-off wavelength $\lambda_{SC1}$ and the color filters 154, 164 have the short cut-off wavelength $\lambda_{SC2}$. Accordingly, wavelengths of light 1b shorter than $\lambda_{SC1}$ are reflected by the first object-side color filter 152 (not shown) and wavelengths of light 1b longer than $\lambda_{SC1}$ are transmitted through the first object-side color filter 152 as light 2b. The first object-side color filter 152 is positioned relative to the first object-side CR reflection boundary 110 such that light 2b transmitted through the first object-side color filter 152 is incident on the first object-side CR reflection boundary 110 where it is reflected by the outward facing reflection surface 112 (FIG. 1A) as light 3b. The first object-side CR reflection boundary 110 is positioned relative to the first object-side color filter 154 with $\lambda_{SC2}$ such that light 3b reflected by the outward facing reflection surface 112 is incident on the first object-side color filter 154. Wavelengths of light 3b shorter than the short cut-off wavelength $\lambda_{SC2}$ are reflected by the first object-side color filter 154 as light 4b and wavelengths of light 3b longer than short cut-off wavelength $\lambda_{SC2}$ are transmitted through the first object-side color filter 154 (not shown). That is, light 4b reflected by the first object-side color filter 154 has wavelengths longer than $\lambda_{SC1}$ and shorter than $\lambda_{SC2}$. The first object-side color filter 154 is positioned relative to the first image-side color filter 164 $\lambda_{SC2}$ such that light 4b reflected by the first object-side color filter 154 is incident on the first image-side color filter 164 where it is reflected as light 5b. The first image-side color filter 164 is positioned relative to the first image-side CR reflection boundary 120 such that light 5b reflected by the first image-side color filter 164 is incident on the outward facing reflection surface 122 (FIG. 1A) where it is reflected as light 6b. The first image-side CR reflection boundary 120 is positioned relative to the first image-side color filter 162 $\lambda_{SC1}$ such that light 6b reflected by the outward facing reflection surface 122 is incident on the first image-side color filter 162. Light 6b has wavelengths of light longer than $\lambda_{SC1}$ and is transmitted through first image-side color filter 162 as light 7b and forms a portion of the image I on the image-side 14 of the cloaking device assembly 10. It should be understood that the portion of the image I on the image-side 14 formed by light 7b on the first side (+X direction) of the reference optical axis 16 is formed from light with wavelengths between $\lambda_{SC1}$ and $\lambda_{SC2}$.

Still referring to optical path B on the first side (+X direction) of the reference optical axis 16 in FIG. 1A, in embodiments where the color filters 152, 154, 162, 164 are short-pass color filters, the color filters 152, 162 have the long cut-off wavelength $\lambda_{LC1}$ and the color filters 154, 164 have the long cut-off wavelength $\lambda_{LC2}$. Accordingly, wavelengths of light 1b longer than $\lambda_{LC1}$ are reflected by the first object-side color filter 152 (not shown) and wavelengths of light 1b shorter than $\lambda_{LC1}$ are transmitted through the first object-side color filter 152 as light 2b. The first object-side color filter 152 is positioned relative to the first object-side CR reflection boundary 110 such that light 2b transmitted through the first object-side color filter 152 is incident on the first object-side CR reflection boundary 110 where it is reflected by the outward facing reflection surface 112 (FIG. 1A) as light 3b. The first object-side CR reflection boundary 110 is positioned relative to the first object-side color filter 154 with $\lambda_{LC2}$ such that light 3b reflected by the outward facing reflection surface 112 is incident on the first object-side color filter 154. Wavelengths of light 3b longer than the long cut-off wavelength $\lambda_{LC2}$ are reflected by the first object-side color filter 154 as light 4b and wavelengths of light 3b shorter than the long cut-off wavelength $\lambda_{LC2}$ are transmitted through the first object-side color filter 154 (not shown). That is, light 4b reflected by the first object-side color filter 154 has wavelengths shorter than $\lambda_{LC1}$ and longer than $\lambda_{LC2}$. The first object-side color filter 154 is positioned relative to the first image-side color filter 164 with $\lambda_{LC2}$ such that light 4b reflected by the first object-side color filter 154 is incident on the first image-side color filter 164 where it is reflected as light 5b. The first image-side color filter 164 is positioned relative to the first image-side CR reflection boundary 120 such that light 5b reflected by the first image-side color filter 164 is incident on the outward facing reflection surface 122 (FIG. 1A) where it is reflected as light 6b. The first image-side CR reflection boundary 120 is positioned relative to the first image-side color filter 162 with $\lambda_{LC1}$ such that light 6b reflected by the outward facing reflection surface 122 is incident on the first image-side color filter 162. Light 6b has wavelengths of light shorter than $\lambda_{LC1}$ and is transmitted through the first image-side color filter 162 as light 7b and forms a portion of the image I on the image-side 14 of the cloaking device assembly 10. It should be understood that the portion of the image I on the image-side 14 formed by light 7b on the first side (+X direction) of the reference optical axis 16 is formed with electromagnetic radiation wavelengths between $\lambda_{LC1}$ and $\lambda_{LC2}$.

Accordingly, light from the object O may travel from the object-side 12 to the image-side 14 on the first side (+X direction) of the reference optical axis 16 via the second optical path B: object O—first object-side color filter 152—first object-side CR reflection boundary 110—first object-side color filter 154—first image-side color filter 164—first image-side CR reflection boundary 120—first image-side color filter 162—image I. That is, light from the object O may travel from the object-side 12 to the image-side 14 on the first side (+X direction) of the reference optical axis 16 via the second optical path B: object O transmittance through first object-side color filter 152—reflection from first object-side CR reflection boundary 110—reflection from first object-side color filter 154—reflection from first image-side color filter 164—reflection from first image-side CR reflection boundary 120—transmittance through first image-side color filter 162—image I.

Regarding the third optical path C on the first side (+X direction) of the reference optical axis 16, light from the object O positioned above (+Y direction) the cloaking device assembly 10 between the second optical path transition axis 17b and the third optical path transition axis 17c is incident on the first object-side color filter 154 (shown as arrow '1c' in FIG. 1B). In embodiments where the color filters 152, 154, 162, 164 are long-pass color filters, the first object-side color filter 154 and the first image-side color filter 164 have the short cut-off wavelength $\lambda_{SC2}$. Accordingly, wavelengths of light 1c shorter than $\lambda_{SC2}$ are reflected by the first object-side color filter 154 (not shown) and wavelengths of light 1c longer than $\lambda_{SC2}$ are transmitted through the first object-side color filter 154 as light 2c. The first object-side color filer 154 is positioned relative to the first image-side color filer 164 such that light 2c transmitted through the first object-side color filer 154 is incident on the first image-side color filer 164 where it is transmitted through as light 3c. Light 3c is generally parallel to light 1c and forms a portion of the image I on the image-side 14 of the cloaking device assembly 10. It should be understood that the portion of the image I on the image-side 14 formed by light 3c on the first side (+X direction) of the reference optical axis 16 is formed from light with wavelengths longer than $\lambda_{SC2}$.

In embodiments where the color filters 152, 154, 162, 164 are short-pass color filters, the first object-side color filter 154 and the first image-side color filter 164 have the long cut-off wavelength $\lambda_{LC2}$. Accordingly, wavelengths of light 1c longer than $\lambda_{LC2}$ are reflected by the first object-side color filter 154 (not shown) and wavelengths of light 1*c* shorter than $\lambda_{LC2}$ are transmitted through the first object-side color filter 154 as light 2*c*. The first object-side color filer 154 is positioned relative to the first image-side color filer 164 such that light 2*c* transmitted through the first object-side color filer 154 is incident on the first image-side color filer 164 where it is transmitted through as colored light 3*c*. Light 3*c* is generally parallel to light 1*c* and forms a portion of the image I on the image-side 14 of the cloaking device assembly 10. It should be understood that the portion of the image I on the image-side 14 formed by light 3*c* on the first side (+X direction) of the reference optical axis 16 on the first side (+X direction) of the reference optical axis 16 is formed from light with wavelengths shorter than $\lambda_{LC2}$.

Accordingly, light from the object O may travel from the object-side 12 to the image-side 14 on the first side (+X direction) of the reference optical axis 16 via the third optical path C: object O—first object-side color filter 154—first image-side color filter 164—image I. That is, light from the object O may travel from the object-side 12 to the image-side 14 on the first side (+X direction) of the reference optical axis 16 via the second optical path C: object O—transmittance through first object-side color filter 154—transmittance through first image-side color filter 164—image I.

Still referring to FIGS. 1A and 1B, and regarding the three optical paths on the second side (−X direction) of the reference optical axis 16, light from the object O incident on the cloaking device assembly 10 between the reference optical axis 16 and a first optical path transition axis 17*a*' propagates via an optical path 'A'. Light from the object O incident on the cloaking device assembly 10 between the first optical path transition axis 17*a*' and a second optical path transition axis 17*b*' propagates via an optical path 13'. Light from the object O positioned above (+Y direction) the cloaking device assembly 10 between the second optical path transition axis 17*b*' and a third optical path transition axis 17*c*' propagates via an optical path 'C'. The first optical path transition axis 17*a*' extends parallel to the Y-axis in the figures from the distal end 172*b* (FIG. 1A) of the second object-side color filter 172 to the object O. Accordingly, light propagating via optical path A is incident on the second object-side CR reflection boundary 130. The second optical path transition axis 17*b*' extends parallel to the Y-axis from the distal end 174*b* (FIG. 1A) of the second object-side color filter 174 to object O. Accordingly, light propagating via optical path B is incident on the second object-side color filter 172. The third optical path transition axis 17*c*' extends parallel to the Y-axis from the proximal end 174*a* (FIG. 1A) of the second object-side color filter 174 to the object O. Accordingly, light propagating via optical path C is incident on the second object-side color filter 174.

Regarding the first optical path A on the second side (−X direction) of the reference optical axis 16, light from the object O positioned above (+Y direction) the cloaking device assembly 10 between the reference optical axis 16 and the first optical path transition axis 17*a*' is incident on the second object-side CR reflection boundary 130 (shown as arrow '1*a*' in FIG. 1B) where it is reflected by the outward facing reflection surface 132 (FIG. 1A) as light 2*a*. The second object-side CR reflection boundary 130 is positioned relative to the second object-side color filter 172 such that light 2*a* reflected by the outward facing reflection surface 132 of the second object-side CR reflection boundary 130 is incident on the second object-side color filter 172. In embodiments where the color filters 172, 174, 182, 184 are long-pass color filters, the second object-side color filter 172 and the second image-side color filter 182 have a short cut-off wavelength $\lambda_{SC3}$, and the second object-side color filter 174 and the second image-side color filter 184 have a short cut-off wavelength $\lambda_{SC4}$ that is greater than $\lambda_{SC3}$ ($\lambda_{SC3} < \lambda_{SC4}$). In some embodiments, the short cut-off wavelengths $\lambda_{SC3}$ and $\lambda_{SC4}$ are equal to the short cut-off wavelengths $\lambda_{SC1}$ and $\lambda_{SC2}$, respectively. In other embodiments, the short cut-off wavelengths $\lambda_{SC3}$ and $\lambda_{SC4}$ are not equal to the short cut-off wavelengths $\lambda_{SC1}$ and $\lambda_{SC2}$, respectively. Wavelengths of light 2*a* shorter than $\lambda_{SC3}$ are reflected by the second object-side color filter 172 as light 3*a* and wavelengths of light 2*a* longer than $\lambda_{SC3}$ are transmitted through the second object-side color filter 172 (not shown). The second object-side color filter 172 is positioned relative to the second object-side CR reflection boundary 130 such that light 3*a* reflected by the second object-side color filter 172 is incident on the outward facing reflection surface 132 of the second object-side CR reflection boundary 130 where it is reflected as light 4*a*. The second object-side CR reflection boundary 130 is positioned relative to the second object-side color filter 174 such that light 4*a* reflected by the outward facing reflection surface 132 is incident on the second object-side color filter 174. As noted above, the second object-side color filter 174 has the short cut-off wavelength $\lambda_{SC4}$ that is greater than the short cut-off wavelength $\lambda_{SC3}$ of the second object-side color filter 172. Accordingly, light 4*a* has wavelengths shorter than $\lambda_{SC3}$ and is reflected by the second object-side color filter 174. That is, since the second object-side color filter 174 reflects electromagnetic radiation with wavelengths shorter than $\lambda_{SC4}$, and light 4*a* has wavelengths shorter than $\lambda_{SC3}$ (which is less than $\lambda_{SC4}$), all of light 4*a* is reflected by the second object-side color filter 174 as light 5*a*. The second object-side color filter 174 is positioned relative to the second image-side color filter 184 such that light 5*a* reflected by the second object-side color filter 174 is incident on the second image-side color filter 184 with the short cut-off wavelength $\lambda_{SC4}$ where it is reflected as light 6*a*. The second image-side color filter 184 is positioned relative to the second image-side CR reflection boundary 140 such that light 6*a* is reflected by the second image-side color filter 184 onto the outward facing reflection surface 142 (FIG. 1A) where it is reflected as light 7*a*. The second image-side CR reflection boundary 140 is positioned relative to the second image-side color filter 182 such that light 7*a* reflected by the outward facing reflection surface 142 is incident on the second image-side color filter 182 where it is reflected as light 8*a*. That is, since the second image-side color filter 182 reflects electromagnetic radiation with wavelengths shorter than $\lambda_{SC3}$, and light 8*a* has wavelengths shorter than $\lambda_{SC3}$, all of light 8*a* is reflected by the second image-side color filter 182 as light 8*a*. The second image-side color filter 182 is positioned relative to the second image-side CR reflection boundary 140 such that light 8*a* reflected by the second image-side color filter 182 is incident on the outward facing reflection surface 142 where it is reflected as light 9*a* generally parallel to light 1*a* and forms a portion of the image I on the image-side 14 of the cloaking device assembly 10. It should be understood that the portion of the image I on the image-side 14 formed by light 9*a* on the second side (−X direction) of the reference optical axis 16 is formed from light with wavelengths shorter than $\lambda_{SC3}$.

Still referring to optical path A on the second side (−X direction) of the reference optical axis 16 in FIG. 1A, in embodiments where the color filters 172, 174, 182, 184 are short-pass color filters, the second object-side color filter 172 and the second image-side color filter 182 have a long cut-off wavelength $\lambda_{LC3}$, and the second object-side color filter 174 and the second image-side color filter 184 have a long cut-off wavelength $\lambda_{LC4}$ that is less than $\lambda_{LC3}$ ($\lambda_{LC3} > \lambda_{LC4}$). In some embodiments, the long cut-off wavelengths $\lambda_{LC3}$ and $\lambda_{LC4}$ are equal to the long cut-off wavelengths $\lambda_{LC1}$ and $\lambda_{LC2}$, respectively. In other embodiments, the long cut-off wavelengths $\lambda_{LC3}$ and $\lambda_{LC4}$ are not equal to the long cut-off wavelengths $\lambda_{LC1}$ and $\lambda_{LC2}$, respectively. Wavelengths of light 2*a* longer than $\lambda_{LC3}$ are reflected by the second object-side color filter 172 as light 3*a* and wavelengths of light 2*a* less than $\lambda_{LC3}$ are transmitted through the second object-side color filter 172 (not shown). The second object-side color filter 172 is positioned relative to the second object-side CR reflection boundary 130 such that light 3*a* reflected by the second object-side color filter 172 is incident on the outward facing reflection surface 132 of the second object-side CR reflection boundary 130 where it is reflected as light 4*a*. The second object-side CR reflection boundary 130 is positioned relative to the second object-side color filter 174 with $\lambda_{LC4}$ such that light 4*a* reflected by the outward facing reflection surface 132 is incident on the second object-side color filter 174. Light 4*a* has wavelengths longer than $\lambda_{LC3}$ and is reflected by the second object-side color filter 174. That is, since the second object-side color filter 174 with $\lambda_{LC4}$ reflects electromagnetic radiation with wavelengths longer than $\lambda_{LC4}$, and light 4*a* has wavelengths longer than $\lambda_{LC3}$ (which is greater than $\lambda_{LC4}$), all of light 4*a* is reflected by the second object-side color filter 174 as light 5*a*. The second object-side color filter 174 is positioned relative to the second image-side color filter 184 with $\lambda_{LC4}$ such that light 5*a* reflected by the second object-side color filter 174 is incident on the second image-side color filter 184 where it is reflected as light 6*a*. The second image-side color filter 184 is positioned relative to the second image-side CR reflection boundary 140 such that light 6*a* reflected by the second image-side color filter 184 is incident on the outward facing reflection surface 142 (FIG. 1A) where it is reflected as light 7*a*. The second image-side CR reflection boundary 140 is positioned relative to the second image-side color filter 182 $\lambda_{LC3}$ such that light 7*a* reflected by the outward facing reflection surface 142 is incident on the second image-side color filter 182 ($\lambda_{LC3}$) where it is reflected as light 8*a*. The second image-side color filter 182 is positioned relative to the second image-side CR reflection boundary 140 such that light 8*a* reflected by the second image-side color filter 182 is incident on the outward facing reflection surface 142 where it is reflected as light 9*a* generally parallel to light 1*a* and forms a portion of the image I on the image-side 14 of the cloaking device assembly 10. It should be understood that the portion of the image I on the image-side 14 formed by light 9*a* on the second side (−X direction) of the reference optical axis 16 is formed from light with wavelengths longer than $\lambda_{LC3}$.

Accordingly, light from the object O may travel from the object-side 12 to the image-side 14 on the second side (−X direction) of the reference optical axis 16 via the first optical path A on the second side (−X direction) of the reference optical axis 16: object O—second object-side CR reflection boundary 130—second object-side color filter 172—second object-side CR reflection boundary 130—second object-side color filter 174—second image-side color filter 184—second image-side CR reflection boundary 140—second image-side color filter 182—second image-side CR reflection boundary 140—image I. That is, light from the object O may travel from the object-side 12 to the image-side 14 on the second side (−X direction) of the reference optical axis 16—via the first optical path A: object O reflection from second object-side CR reflection boundary 130—reflection from second object-side color filter 172—reflection from second object-side CR reflection boundary 130—reflection from second object-side color filter 174—reflection from second image-side color filter 184—reflection from second image-side CR reflection boundary 140—reflection from second image-side color filter 182—reflection from second image-side CR reflection boundary 140—image I.

Regarding the second optical path B on the second side (−X direction) of the reference optical axis 16, light from the object O positioned above (+Y direction) the cloaking device assembly 10 between the first optical path transition axis 17*a*' and the second optical path transition axis 17*b*' is incident on the second object-side color filter 172 (shown as arrow '1*b*' in FIG. 1B). In embodiments where the color filters 172, 174, 182, 184 are long-pass color filters, the second object-side color filter 172 and the second image-side color filter 182 have the short cut-off wavelength $\lambda_{SC3}$, and the second object-side color filter 174 and the second image-side color filter 184 have the short cut-off wavelength $\lambda_{SC4}$ that is greater than $\lambda_{SC3}$ ($\lambda_{SC3} < \lambda_{SC4}$) Accordingly, wavelengths of light 1*b* shorter than $\lambda_{SC3}$ are reflected by the second object-side color filter 172 (not shown) and wavelengths of light 1*b* longer than $\lambda_{SC3}$ are transmitted through the second object-side color filter 172 as light 2*b*. The second object-side color filter 172 is positioned relative to the second object-side CR reflection boundary 130 such that light 2*b* transmitted through the second object-side color filter 172 is incident on the second object-side CR reflection boundary 130 where it is reflected by the outward facing reflection surface 132 (FIG. 1A) as light 3*b*. The second object-side CR reflection boundary 130 is positioned relative to the second object-side color filter 174 with $\lambda_{SC4}$ such that light 3*b* reflected by the outward facing reflection surface 132 is incident on the second object-side color filter 174. Wavelengths of light 3*b* shorter than the short cut-off wavelength $\lambda_{SC4}$ are reflected by the second object-side color filter 174 as light 4*b* and wavelengths of light 3*b* longer than the short cut-off wavelength $\lambda_{SC4}$ are transmitted through the second object-side color filter 174 (not shown). That is, light 4*b* reflected by the second object-side color filter 174 has wavelengths longer than $\lambda_{SC3}$ and shorter than $\lambda_{SC4}$. The second object-side color filter 174 is positioned relative to the second image-side color filter 184 with $\lambda_{SC4}$ such that light 4*b* reflected by the second object-side color filter 174 is incident on the second image-side color filter 184 where it is reflected as light 5*b*. The second image-side color filter 184 is positioned relative to the second image-side CR reflection boundary 140 such that light 5*b* reflected by the second image-side color filter 184 is incident on the outward facing reflection surface 142 (FIG. 1A) where it is reflected as light 6*b*. The second image-side CR reflection boundary 140 is positioned relative to the second image-side color filter 182 $\lambda_{SC3}$ such that light 6*b* reflected by the outward facing reflection surface 142 is incident on the second image-side color filter 182. Light 6*b* has wavelengths of light longer than $\lambda_{SC3}$ and is transmitted through second image-side color filter 182 as light 7*b* and forms a portion of the image I on the image-side 14 of the cloaking device assembly 10. It should be understood that the portion of the image I on the image-side 14 formed by light 7*b* on the second side (−X direction) of the reference optical axis 16 is formed with electromagnetic radiation with wavelengths between $\lambda_{SC3}$ and $\lambda_{SC4}$.

Still referring to optical path B on the second side (−X direction) of the reference optical axis 16 in FIG. 1A, in embodiments where the color filters 172, 174, 182, 184 are short-pass color filters, the second object-side color filter 172 and the second image-side color filter 182 have the long cut-off wavelength $\lambda_{LC3}$, and the second object-side color filter 174 and the second image-side color filter 184 have the long cut-off wavelength $\lambda_{LC4}$ that is less than $\lambda_{LC3}$ ($\lambda_{LC3} > \lambda_{LC4}$). Accordingly, wavelengths of light 1b longer than $\lambda_{LC3}$ are reflected by the second object-side color filter 172 (not shown) and wavelengths of light 1b shorter than $\lambda_{LC3}$ are transmitted through the second object-side color filter 172 as light 2b. The second object-side color filter 172 is positioned relative to the second object-side CR reflection boundary 130 such that light 2b transmitted through the second object-side color filter 172 is incident on the second object-side CR reflection boundary 130 where it is reflected by the outward facing reflection surface 132 (FIG. 1A) as light 3b. The second object-side CR reflection boundary 130 is positioned relative to the second object-side color filter 174 with $\lambda_{LC4}$ such that light 3b reflected by the outward facing reflection surface 132 is incident on the second object-side color filter 174. Wavelengths of light 3b longer than the long cut-off wavelength $\lambda_{LC4}$ are reflected by the second object-side color filter 174 as light 4b and wavelengths of light 3b shorter than the long cut-off wavelength $\lambda_{LC4}$ are transmitted through the second object-side color filter 174 (not shown). That is, light 4b reflected by the second object-side color filter 174 has wavelengths shorter than $\lambda_{LC3}$ and longer than $\lambda_{LC4}$. The second object-side color filter 174 is positioned relative to the second image-side color filter 184 with $\lambda_{LC4}$ such that light 4b reflected by the second object-side color filter 174 is incident on the second image-side color filter 184 where it is reflected as light 5b. The second image-side color filter 184 is positioned relative to the second image-side CR reflection boundary 140 such that light 5b reflected by the second image-side color filter 184 is incident on the outward facing reflection surface 142 (FIG. 1A) where it is reflected as light 6b. The second image-side CR reflection boundary 140 is positioned relative to the second image-side color filter 182 with $\lambda_{LC3}$ such that light 6b reflected by the outward facing reflection surface 142 is incident on the second image-side color filter 182. Light 6b has wavelengths of light shorter than $\lambda_{LC3}$ and is transmitted through the second image-side color filter 182 as light 7b and forms a portion of the image I on the image-side 14 of the cloaking device assembly 10. It should be understood that the portion of the image I on the image-side 14 formed by light 7b on the second side (−X direction) of the reference optical axis 16 is formed from light with wavelengths between $\lambda_{LC3}$ and $\lambda_{LC4}$.

Accordingly, light from the object O may travel from the object-side 12 to the image-side 14 on the second side (−X direction) of the reference optical axis 16 via the second optical path B: object O—second object-side color filter 172—second object-side CR reflection boundary 130—second object-side color filter 174—second image-side color filter 184—second image-side CR reflection boundary 140—second image-side color filter 182—image I. That is, light from the object O may travel from the object-side 12 to the image-side 14 on the second side (−X direction) of the reference optical axis 16 via the second optical path B: object O—transmittance through second object-side color filter 172—reflection from second object-side CR reflection boundary 130—reflection from second object-side color filter 174—reflection from second image-side color filter 184—reflection from second image-side CR reflection boundary 140—transmittance through second image-side color filter 182—image I.

Still referring to FIGS. 1A and 1B, embodiments of a cloaking device assembly with two color filters positioned on the first object-side of the cloaking device and two color filters positioned on the first image-side of the cloaking device are depicted. However, in other embodiments, the color filters 154, 164 and/or 174, 184 may be replaced with a polarizer (e.g., a wire grid polarizer). In such an embodiments, light 4a (optical path A) and light 3b (optical path B) are reflected by the color filters 154, 174 as polarized light 5a and 4b, respectively, and light 1c is transmitted through color filters 154, 164, 174, 184 as polarized light 3c, thereby forming the image I from polarized light 9a, 7b, 1c. It should be understood that the image I formed from polarized light 9a, 7b, 1c will have a light intensity of 50% compared to the image formed from unpolarized light 9a, 7b, 1c.

While FIGS. 1A and 1B depict embodiments of a cloaking device assembly with two color filters positioned on the first object-side of the cloaking device and two color filters positioned on the first image-side of the cloaking device, more than two color filters may be positioned on the first object-side and the first image-side of a cloaking device. That is, 'n' color filters, where n is equal to or greater than two (2), may be spaced apart from and positioned generally parallel to each of the CR reflection boundaries. For example, and with reference to FIGS. 2A and 2B, a cloaking device assembly with four color filters positioned on the first object-side of the cloaking device and four color filters positioned on the first image-side of the cloaking device is depicted.

Figure 2A:
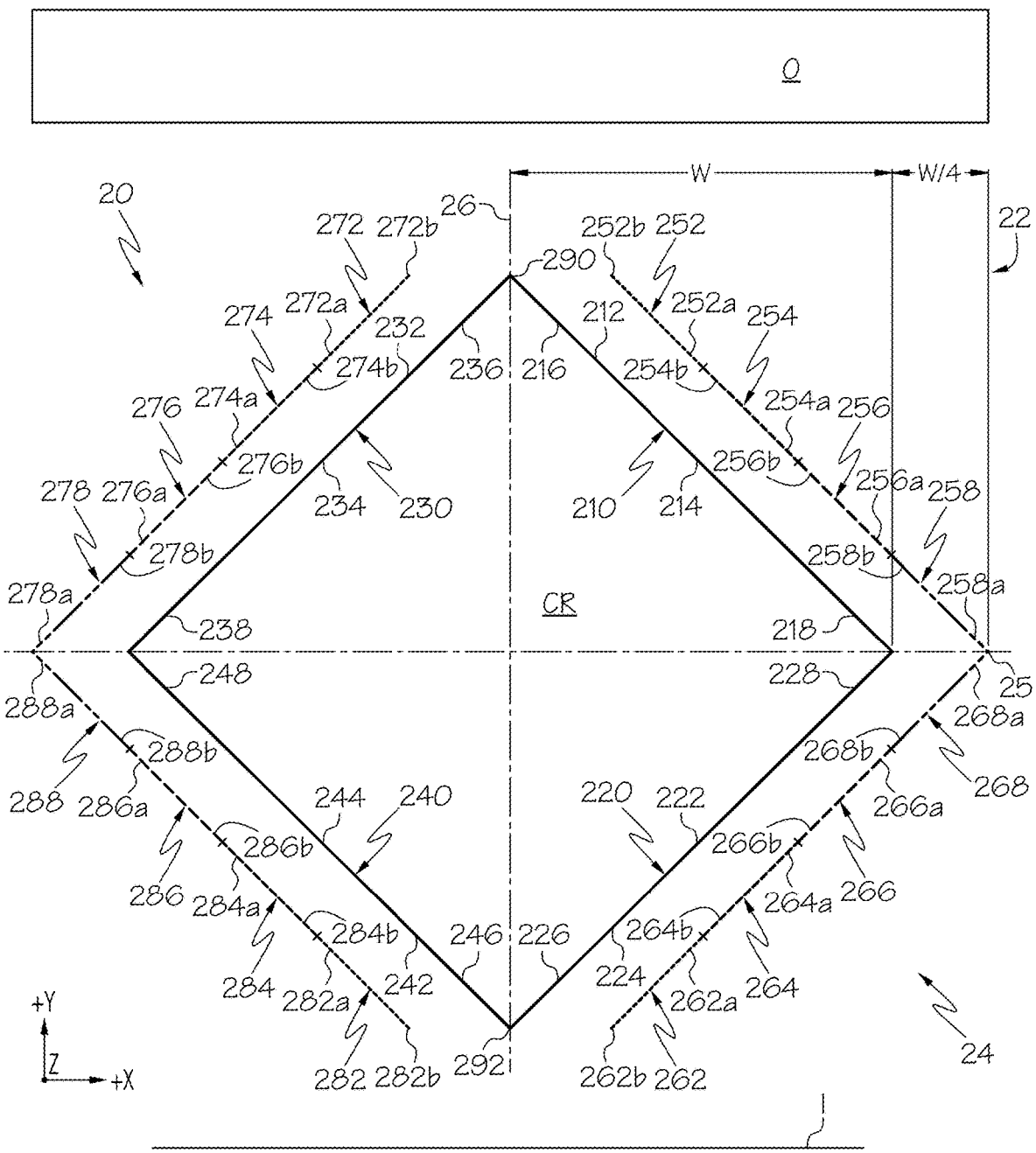
FIG. 2A schematically depicts a top view of a cloaking device assembly according to one or more embodiments described and illustrated herein.

Referring specifically to FIG. 2A, embodiments of a cloaking device include a cloaking device assembly 20 with an object-side 22, an image-side 24, four CR reflection boundaries 210, 220, 230, 240, and a cloaked region CR at least partially bounded by the CR reflection boundaries 210, 220, 230, 240. In embodiments, the CR reflection boundaries 210, 220, 230, 240 are planar reflection boundaries. In other embodiments, the CR reflection boundaries 210, 220, 230, 240 are not planar reflection boundaries. The object-side 22 is positioned above (+Y direction) a bisecting axis 25 and the image-side 24 is positioned below (−Y direction) the bisecting axis 25. That is, the bisecting axis 25 extends between and delineates the object-side 22 and the image-side 24. Each of the CR reflection boundaries 210, 220, 230, 240 has a length, a width and a height.

The CR reflection boundaries 210, 220, 230, 240 each have an outward facing reflection surface 212, 222, 232, 242 and an inward facing surface 214, 224, 234, 244, respectively. In embodiments, the inward facing surfaces 214, 224, 234, 244 may be an opaque surface that prevents light from within the cloaked region CR from propagating through the CR reflection boundaries 210, 220, 230, 240, respectively. The outward facing reflection surfaces 212, 222, 232, 242 may be made from omnidirectional photonic crystals or mirrors such that light incident on the outward facing reflection surfaces 212, 222, 232, 242 is reflected there from. In the alternative, one or more of the outward facing reflection surfaces 212, 222, 232, 242 may be a surface of a prism, e.g., a right angle prism, that totally internally reflects light incident on the surface.

The CR reflection boundaries 210, 220, 230, 240 may have an apex end 216, 226, 236, 246 and a side end 218, 228, 238, 248, respectively. The side ends 218, 228, 238, 248 are spaced apart from the apex ends 216, 226, 236, 246, respectively, and the CR reflection boundaries 210, 220, 230, 240 extend between the apex ends 216, 226, 236, 246 and the side ends 218, 228, 238, 248, respectively. In embodiments, the apex ends 216, 236 of the two CR reflection boundaries 210, 230, respectively, meet or intersect at an apex 290. In the alternative or in addition to, the apex ends 226, 246 of the two CR reflection boundaries 220, 240, respectively, meet or intersect at an apex 292. In such embodiments, a reference optical axis 26 bisects the apex 290 and the apex 292, and may be a centerline between a first side (+X direction) and a second side (−X direction) of the cloaking device assembly 20. In other embodiments, the apex ends 216, 236 of the two object-side CR reflection boundaries 210, 230, respectively, are spaced apart (X direction) from each other and/or the apex ends 226, 246 of the two image-side CR reflection boundaries 220, 240, respectively, are spaced apart from each other such that an uncloaked region or gap (not shown) is present between the spaced apart apex ends 216, 236 and/or spaced apart apex ends 226, 246. In such embodiments, an image of the portion of the object O positioned above (+Y direction) the uncloaked region is not provided on the image-side 24 of the cloaking device assembly 20. Also, in embodiments, the side end 218 may be positioned adjacent to and may be joined to side end 228, and the side end 238 may be positioned adjacent to and may be joined to side end 248 as depicted in FIG. 2A. In other embodiments, the side ends 218, 238 may be spaced apart (Y direction) from the side ends 228, 248 (not shown).

The two CR reflection boundaries 210, 230 may be positioned on the object-side 22 of the cloaking device assembly 20 to face an object 'O' and may be referred to herein as object-side CR reflection boundaries 210, 230. Also, the object-side CR reflection boundary 210 is positioned on a first side (+X direction) of the reference optical axis 26 and may be referred to herein as a first object-side CR reflection boundary 210 and the object-side CR reflection boundary 230 is positioned on a second side (−X direction) of the reference optical axis 26 opposite the first side and may be referred to herein as a second object-side CR reflection boundary 230. The two CR reflection boundaries 220, 240 may be positioned on the image-side 24 of the cloaking device assembly 20 to provide an image 'I' formed by the cloaking device assembly 20 and may be referred to herein as image-side CR reflection boundaries 220, 240. The image-side CR reflection boundary 220 is positioned on the first side (+X direction) of the reference optical axis 26 and may be referred to herein as a first image-side CR reflection boundary 220 and the image-side CR reflection boundary 240 is positioned on the second side (−X direction) of the reference optical axis 26 opposite the first side and may be referred to herein as a second image-side CR reflection boundary 240.

In embodiments, the two object-side CR reflection boundaries 210, 230 and the two image-side CR reflection boundaries 220, 240 may be oriented at an acute angle (e.g., 45°) relative to the bisecting axis 25 and the reference optical axis 26, and form the cloaked region CR that is bound at least partly by the inward facing surfaces 214, 234, 224, 244, respectively. The two object-side CR reflection boundaries 210, 230 and the two image-side CR reflection boundaries 220, 240 have a height 'h' (FIG. 4) in the Z-direction of the coordinate axes in the figures and light reflected or transmitted within the cloaked region CR does not pass through the inward facing surfaces 214, 234, 224, 244. Accordingly, an article located within the cloaked region CR (e.g., a cloaked article) is not visible to an observer viewing the cloaking device assembly 20 from the image-side 24 in the +Y direction.

Still referring to FIG. 2A, the cloaking device assembly 20 includes four color filters spaced apart from and positioned generally parallel (within +/−2°) with each of the CR reflection boundaries 210, 220, 230, 240. For example, in embodiments, four color filters 252, 254, 256, 258 (also referred to herein collectively as "color filters 252-258") are spaced apart from and positioned generally parallel to the first object-side CR reflection boundary 210; four color filters 262, 264, 266, 268 (also referred to herein collectively as "color filters 262-268") are spaced apart from and positioned generally parallel to the first image-side CR reflection boundary 220; four color filters 272, 274, 276, 278 (also referred to herein collectively as "color filters 272-278") are spaced apart from and positioned generally parallel to the second object-side CR reflection boundary 230; and four color filters 282, 284, 286, 288 (also referred to herein collectively as "color filters 282-288") are spaced apart from and positioned generally parallel to the second image-side CR reflection boundary 240. In embodiments, the color filters 252-258 are co-planar; the color filters 262-268 are co-planar; the color filters 272-278 are co-planar; and the color filters 282-288 are co-planar. It should be understood that adjacent co-planar color filters, e.g., color filters 252, 254, 256, and 258, are different color filters.

The four object-side color filters 252-258 are positioned on the first side (+X direction) of the reference optical axis 26 of the cloaking device assembly 20 and may be referred to herein as first object-side color filters 252-258. The four object-side color filters 272-278 are positioned on the second side (−X direction) of the reference optical axis 26 opposite the first side and may be referred to herein as second object-side color filters 272-278. The four image-side color filters 262-268 are positioned on the first side (+X direction) of the reference optical axis 26 and may be referred to herein as first image-side color filters 262-268. The four image-side color filters 282-288 are positioned on the second side (−X direction) of the reference optical axis 26 and may be referred to herein as second image-side color filters 282-288.

The color filters 252, 262, 272, 282 include a proximal end 252a, 262a, 272a, 282a, respectively, located proximal to the bisecting axis 25 and a distal end 252b, 262b, 272b, 282b, respectively, located distal from the bisecting axis 25. The distal ends 252b, 262b, 272b, 282b are spaced apart from the proximal ends 252a, 262a, 272a, 282a, respectively, and the color filters 252, 262, 272, 282 extend from the proximal ends 252a, 262a, 272a, 282a to the distal ends 252b, 262b, 272b, 282b, respectively. Similarly, the color filters 254, 264, 274, 284 include a proximal end 254a, 264a, 274a, 284a, respectively, proximal to the bisecting axis 25 and a distal end 254b, 264b, 274b, 284b, respectively, distal from the bisecting axis 25. The distal ends 254b, 264b, 274b, 284b are spaced apart from the proximal ends 254a, 264a, 274a, 284a, respectively, and the color filters 254, 264, 274, 284 extend from the proximal ends 254a, 264a, 274a, 284a to the distal ends 254b, 264b, 274b, 284b, respectively. In embodiments, the distal ends 254b, 264b, 274b, 284b of the color filters 254, 264, 274, 284, respectively, are positioned in contact with the proximal ends 252a, 262a, 272a, 282a of the color filters 252, 262, 272, 282, respectively. In such embodiments, the distal ends 254b, 264b, 274b, 284b of the color filters 254, 264, 274, 284, respectively, may be attached to the proximal ends 252a, 262a, 272a, 282a of the color filters 252, 262, 272, 282, respectively.

The color filters 256, 266, 276, 286 include a proximal end 256a, 266a, 276a, 286a, respectively, located proximal to the bisecting axis 25 and a distal end 256b, 266b, 276b, 286b, respectively, located distal from the bisecting axis 25. The distal ends 256b, 266b, 276b, 286b are spaced apart from the proximal ends 256a, 266a, 276a, 286a, respectively, and the color filters 256, 266, 276, 286 extend from the proximal ends 256a, 266a, 276a, 286a to the distal ends 256b, 266b, 276b, 286b, respectively. In embodiments, the distal ends 256b, 266b, 276b, 286b of the color filters 256, 266, 276, 286, respectively, are positioned in contact with the proximal ends 254a, 264a, 274a, 284a of the color filters 254, 264, 274, 284, respectively. In such embodiments, the distal ends 256b, 266b, 276b, 286b of the color filters 256, 266, 276, 286, respectively, may be attached to the proximal ends 256a, 266a, 276a, 286a of the color filters 256, 266, 276, 286, respectively.

The color filters 258, 268, 278, 288 include a proximal end 258a, 268a, 278a, 288a, respectively, proximal to the bisecting axis 25 and a distal end 258b, 268b, 278b, 288b, respectively, distal from the bisecting axis 25. The distal ends 258b, 268b, 278b, 288b are spaced apart from the proximal ends 258a, 268a, 278a, 288a, respectively, and the color filters 258, 268, 278, 288 extend from the proximal ends 258a, 268a, 278a, 288a to the distal ends 258b, 268b, 278b, 288b, respectively. In embodiments, the distal ends 258b, 268b, 278b, 288b of the color filters 258, 268, 278, 288, respectively, are positioned in contact with the proximal ends 256a, 266a, 276a, 286a of the color filters 256, 266, 276, 286, respectively. In such embodiments, the distal ends 258b, 268b, 278b, 288b of the color filters 258, 268, 278, 288, respectively, may be attached to the proximal ends 256a, 266a, 276a, 286a of the color filters 256, 266, 276, 286, respectively.

Still referring to FIG. 2A, in embodiments, the CR reflection boundaries 210, 220 are aligned at an angle of 45° relative to the reference optical axis 26 as depicted in FIG. 2A and the length of each of the first object-side color filters 252-258 extending from the respective proximal end to the respective distal end is equal. Also, the total length of the first object-side color filters 252-258 extending from the distal end 252b to the proximal end 258a is equal to the length of the first object-side CR reflection boundary 210 from the apex end 216 to the side end 218, and the distal end 258b of the first color filter 258 is positioned on a line extending from the side end 218 parallel to the reference optical axis 26. In such embodiments, the width (X direction) of the cloaking device assembly 20 on the first side (+X direction) of the reference optical axis 26 is equal to the width 'w' of the cloaked region CR from the reference optical axis 26 to the side end 218 of the first object-side CR reflection boundary 210 plus the width w divided by the number of color filters spaced apart from and extending generally parallel to the first object-side CR reflection boundary 210, i.e., w/4. Accordingly, the width of the cloaking device assembly 20 on the first side (+X direction) of the reference optical axis 26 is equal to w+w/4=5/4·w and has a cloaking ratio of 66.7%. As used herein, the term "cloaking ratio" refers to ratio of the cloaked region CR area divided by the cloaking device assembly area multiplied by 100 to provide a percentage. It should be understood that increasing the number of color filters spaced apart from and positioned generally parallel to a CR reflection boundary reduces the additional width added to a cloaking device assembly. For example, two color filters spaced apart from and positioned generally parallel to a CR reflection boundary increased the width of the cloaking device assembly 10 by w/2, whereas four color filters spaced apart from and positioned generally parallel to a CR reflection boundary increased the width of the cloaking device assembly 20 by only w/4.

As noted above, the four color filters 252, 262, 272, 282 may be different than the four color filters 254, 264, 274, 284, respectively, different than the four color filters 256, 266, 276, 286, respectively, and different than the four color filters 258, 268, 278, 288, respectively. Also, the four color filters 254, 264, 274, 284 may be different than the four color filters 256, 266, 276, 286, respectively, and different than the four color filters 258, 268, 278, 288, respectively, and the four color filters 256, 266, 276, 286 may be different than the four color filters 258, 268, 278, 288, respectively. In such embodiments, the four color filters 252, 262, 272, 282 may have a different cut-off wavelength than the four color filters 254, 264, 274, 284, respectively, a different cut-off wavelength than the four color filters 256, 266, 276, 286, respectively, and a different cut-off wavelength than the four color filters 258, 268, 278, 288, respectively. Also, the four color filters 254, 264, 274, 284 may have a different cut-off wavelength than the four color filters 256, 266, 276, 286, respectively, and a different cut-off wavelength than the four color filters 258, 268, 278, 288, respectively, and the four color filters 256, 266, 276, 286 may have a different cut-off wavelength than the four color filters 258, 268, 278, 288, respectively.

In embodiments, the color filters 252-258, 262-268, 272-278, 282-288 may be sequentially arranged in a cut-wavelength order between the reference optical axis 26 and the bisecting axis 25. In some embodiments, the color filters 252-258, 262-268, 272-278, 282-288 are long-pass color filters aligned with sequentially increasing short cut-off wavelengths from the reference optical axis 26 to the bisecting axis 25. In other embodiments, the color filters 252-258, 262-268, 272-278, 282-288 are short-pass color filters aligned with sequentially decreasing long cut-off wavelengths from the reference optical axis 26 to the bisecting axis 25. For example, if the color filters 252-258, 262-268, 272-278, 282-288 are long-pass color filters, a short cut-off wavelength $\lambda_{SC2}$ of the long-pass color filters 254, 264, 274, 284 is longer than a short cut-off wavelength $\lambda_{SC1}$ of the long-pass color filters 252, 262, 272, 282 (i.e., $\lambda_{SC1} < \lambda_{SC2}$); a short cut-off wavelength $\lambda_{SC3}$ of the long-pass color filters 256, 266, 276, 286 is longer than the short cut-off wavelength $\lambda_{SC2}$ of the long-pass color filters 254, 264, 274, 284 (i.e., $\lambda_{SC2} < \lambda_{SC3}$); and a short cut-off wavelength $\lambda_{SC4}$ of the long-pass color filters 258, 268, 278, 288 is shorter than the short cut-off wavelength $\lambda_{SC3}$ of the long-pass color filters 256, 266, 276, 286 (i.e., $\lambda_{SC3} < k_{SC4}$). Accordingly, long-pass color filters 252-258, 262-268, 272-278, 282, 288 are co-planar with an increasing cut-off wavelength order of $\lambda_{SC1} < \lambda_{SC2} < \lambda_{SC3} < \lambda_{SC4}$. In the alternative, if the color filters 252-258, 262-268, 272-278, 282-288 are short-pass color filters, a long cut-off wavelength $\lambda_{LC2}$ of the short-pass color filters 254, 264, 274, 284 is shorter than a long cut-off wavelength $\lambda_{LC1}$ of the short-pass color filters 252, 262, 272, 282 (i.e., $\lambda_{LC1} > \lambda_{LC2}$); a long cut-off wavelength $\lambda_{LC3}$ of the short-pass color filters 256, 266, 276, 286 is shorter than the long cut-off wavelength $\lambda_{LC2}$ of the short-pass color filters 254, 264, 274, 284 (i.e., $\lambda_{LC2} > \lambda_{LC3}$); and a long cut-off wavelength $\lambda_{LC4}$ of the short-pass color filters 258, 268, 278, 288 is shorter than the long cut-off wavelength $\lambda_{LC3}$ of the short-pass color filters 256, 266, 276, 286. Accordingly, short-pass color filters 252-258, 262-268, 272-278, 282-288 are co-planar with a decreasing cut-off wavelength order of $\lambda_{LC1} > \lambda_{LC2} > \lambda_{LC3} > \lambda_{LC4}$.

In embodiments, the color filters 252-258, 262-268, 272-278, 282-288 are all long-pass color filters or all short-pass color filters. In other embodiments, the first side (+X direction) color filters, i.e., color filters 252-258 and color filters 262-268 are long-pass color filters and the second side (−X direction) color filters, i.e., the color filters 272-278 and color filters 282-288 are short-pass color filters. In still other embodiments, the first side (+X direction) color filters, i.e., color filters 252-258 and color filters 262-268 are short-pass color filters and the second side (−X direction) color filters, i.e., the color filters 272-278 and color filters 282-288 are long-pass color filters.

Figure 2B:
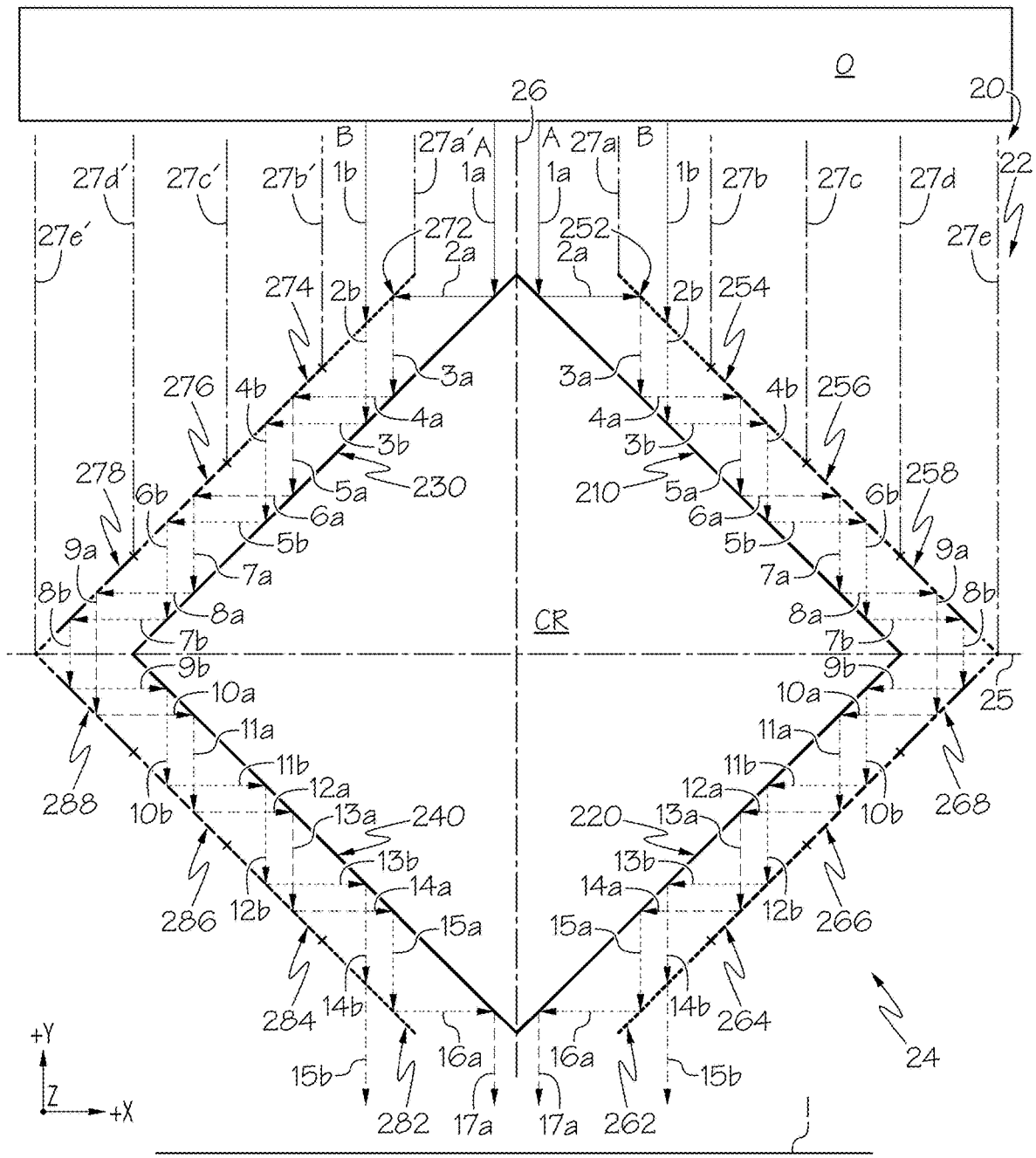
FIG. 2B schematically depicts a top view of the cloaking device assembly of FIG. 2A with light propagating from an object on an object-side of the cloaking device assembly to form a portion of an image on an image-side of the cloaking device assembly via two optical paths.
Figure 2C:
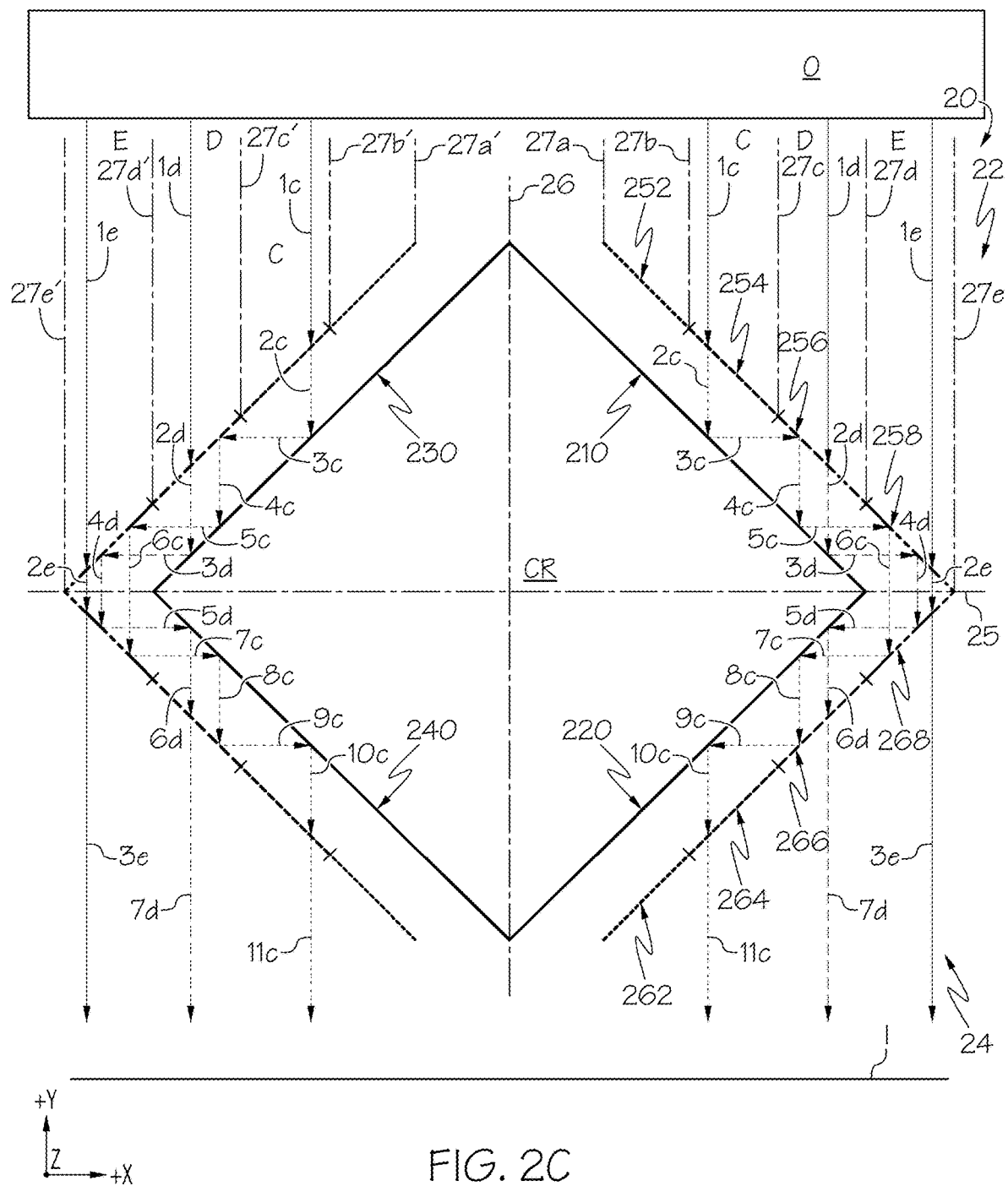
FIG. 2C schematically depicts a top view of the cloaking device assembly of FIG. 2A with light propagating from an object on an object-side of the cloaking device assembly to form a portion of an image on an image-side of the cloaking device assembly via three optical paths.

Referring now to FIGS. 2A-2C, the cloaking device assembly 20 includes five optical paths for light from an object 'O' positioned on the object-side 22 to propagate and form an image 'I' on the image-side 24 on the first side (+X direction) of the reference optical axis 26. The cloaking device assembly 20 may also include five optical paths for light from an object 'O' positioned on the object-side 22 to propagate and form an image 'I' on the image-side 24 on the second side (−X direction) of the reference optical axis 26. Regarding the five optical paths on the first side (+X direction) of the reference optical axis 26, light from the object O incident on the cloaking device assembly 20 between the reference optical axis 26 and a first optical path transition axis 27a propagates via an optical path 'A' (FIG. 2B). Light from the object O incident on the cloaking device assembly 20 between the first optical path transition axis 27a and a second optical path transition axis 27b propagates via an optical path 'B' (FIG. 2B). Light from the object O positioned above (+Y direction) the cloaking device assembly 20 between the second optical path transition axis 27b and a third optical path transition axis 27c propagates via an optical path 'C' (FIG. 2C). Light from the object O positioned above (+Y direction) the cloaking device assembly 20 between the third optical path transition axis 27c and a fourth optical path transition axis 27d propagates via an optical path 'D' (FIG. 2C). Light from the object O positioned above (+Y direction) the cloaking device assembly 20 between the fourth optical path transition axis 27d and a fifth optical path transition axis 27e propagates via an optical path 'E' (FIG. 2C).

The first optical path transition axis 27a extends parallel to the Y-axis in the figures from the distal end 252b (FIG. 2A) of the first object-side color filter 252 to the object O. Accordingly, light propagating via optical path A is incident on the first object-side CR reflection boundary 210 (FIG. 2B). The second optical path transition axis 27b extends parallel to the Y-axis from the distal end 254b (FIG. 2A) of the first object-side color filter 254 to object O. Accordingly, light propagating via optical path B is incident on the first object-side color filter 252 (FIG. 2B). The third optical path transition axis 27c extends parallel to the Y-axis from the proximal end 254a (FIG. 2A) of the first object-side color filter 254 to the object O. Accordingly, light propagating via optical path C is incident on the first object-side color filter 254 (FIG. 2C). The fourth optical path transition axis 27d extends parallel to the Y-axis from the proximal end 256a (FIG. 2A) of the first object-side color filter 256 to the object O. Accordingly, light propagating via optical path D is incident on the first object-side color filter 256 (FIG. 2C). The fifth optical path transition axis 27e extends parallel to the Y-axis from the proximal end 258a (FIG. 2A) of the first object-side color filter 258 to the object O. Accordingly, light propagating via optical path E is incident on the first object-side color filter 258 (FIG. 2C).

Regarding the first optical path A on the first side (+X direction) of the reference optical axis 26 (FIG. 2B), light from the object O positioned above (+Y direction) the cloaking device assembly 20 between the reference optical axis 26 and the first optical path transition axis 27a is incident on the first object-side CR reflection boundary 210 (shown as arrow '1a' in FIG. 2B) where it is reflected by the outward facing reflection surface 212 (FIG. 2A) as light 2a.

In embodiments where the color filters 252-258, 262-268 are long-pass color filters, the first object-side color filter 252 and the first image-side color filter 262 have a short cut-off wavelength $\lambda_{SC1}$; the first object-side color filter 254 and the first image-side color filter 264 have a short cut-off wavelength $\lambda_{SC2}$ that is greater than $\lambda_{SC1}$ ($\lambda_{SC1} < \lambda_{SC2}$); the first object-side color filter 256 and the first image-side color filter 266 have a short cut-off wavelength $\lambda_{SC3}$ that is greater than $\lambda_{SC2}$ ($\lambda_{SC2} < \lambda_{SC3}$); and the first object-side color filter 258 and the first image-side color filter 268 have a short cut-off wavelength $\lambda_{SC2}$ that is greater than $\lambda_{SC3}$ ($\lambda_{SC3} < \lambda_{SC4}$). Accordingly, the long-pass color filters 252-258 and 262-268 are sequentially arranged from the reference optical axis 26 to the bisecting axis 25 in the increasing cut-off wavelength order $\lambda_{SC1}, \lambda_{SC3}, \lambda_{SC2}, \lambda_{SC3}, \lambda_{SC1}$, where $\lambda_{SC1} < \lambda_{SC2} < \lambda_{SC3} < \lambda_{CL1}$.

The first object-side CR reflection boundary 210 is positioned relative to the first object-side color filter 252 with $\lambda_{SC1}$ such that light 2a reflected by the outward facing reflection surface 212 of the first object-side CR reflection boundary 210 is incident on the first object-side color filter 252. Wavelengths of light 2a shorter than $\alpha_{SC1}$ are reflected by the first object-side color filter 252 as light 3a and wavelengths of light 2a longer than $\lambda_{SC1}$ are transmitted through the first object-side color filter 252 (not shown). Also, wavelengths of light shorter than $\lambda_{SC1}$ will be reflected by the color filters 254, 256, 258, 268, 266, 264, 262 since wavelengths of light shorter than $\lambda_{SC1}$ are shorter than $\lambda_{SC2}$, $\lambda_{SC3}$ and $\lambda_{SC4}$, and long-pass color filters reflect light with wavelengths less than their corresponding short cut-off wavelengths. The first object-side color filter 252 is positioned relative to the first object-side CR reflection boundary 210 such that light 3a reflected by the first object-side color filter 252 is incident on the outward facing reflection surface 212 of the first object-side CR reflection boundary 210 where it is reflected as light 4a. The first object-side CR reflection boundary 210 is positioned relative to the first object-side color filter 254 with $\lambda_{SC2}$ such that light 4a reflected by the outward facing reflection surface 212 is incident on the first object-side color filter 254 where it is reflected as light 5a. The first object-side color filter 254 is positioned relative to the first object-side CR reflection boundary 210 such that light 5a reflected by the first object-side color filter 254 is incident on the outward facing reflection surface 212 of the first object-side CR reflection boundary 210 where it is reflected as light 6a. The first object-side CR reflection boundary 210 is positioned relative to the first object-side color filter 256 with $\lambda_{SC3}$ such that light 6a reflected by the outward facing reflection surface 212 is incident on the first object-side color filter 256 where it is reflected as light 7a. The first object-side color filter 256 is positioned relative to the first object-side CR reflection boundary 210 such that light 7a reflected by the first object-side color filter 256 is incident on the outward facing reflection surface 212 of the first object-side CR reflection boundary 210 where it is reflected as light 8a. The first object-side CR reflection boundary 210 is positioned relative to the first object-side color filter 258 with $\lambda_{SC4}$ such that light 8a reflected by the outward facing reflection surface 212 is incident on the first object-side color filter 258 where it is reflected as light 9a. The first object-side color filter 258 is positioned relative to the first image-side color filter 268 with $\lambda_{SC4}$ such that light 9a is reflected by the first object-side color filter 258 to the image-side 24 of the cloaking device assembly 20 where it is incident on the first image-side color filter 268 and reflected as light 10a.

On the image-side 24 of the cloaking device assembly 20, the first image-side color filter 268 is positioned relative to the first image-side CR reflection boundary 220 such that light 10a reflected by the first image-side color filter 268 is incident on the outward facing reflection surface 222 (FIG. 2A) where it is reflected as light 11a. The first image-side CR reflection boundary 220 is positioned relative to the first image-side color filter 266 with $\lambda_{SC3}$ such that light 11a reflected by the outward facing reflection surface 222 is incident on the first image-side color filter 266 where it is reflected as light 12a. The first image-side color filter 266 is positioned relative to the first image-side CR reflection boundary 220 such that light 12a reflected by the first image-side color filter 266 is incident on the outward facing reflection surface 222 where it is reflected as light 13a. The first image-side CR reflection boundary 220 is positioned relative to the first image-side color filter 264 with $\lambda_{SC2}$ such that light 13a reflected by the outward facing reflection surface 222 is incident on the first image-side color filter 264 where it is reflected as light 14a. The first image-side color filter 264 is positioned relative to the first image-side CR reflection boundary 220 such that light 14a reflected by the first image-side color filter 264 is incident on the outward facing reflection surface 222 where it is reflected as light 15a. The first image-side CR reflection boundary 220 is positioned relative to the first image-side color filter 262 with $\lambda_{SC1}$ such that light 15a reflected by the outward facing reflection surface 222 is incident on the first image-side color filter 262 where it is reflected as light 16a. The first image-side color filter 262 is positioned relative to the first image-side CR reflection boundary 220 such that light 16a reflected by the first image-side color filter 262 is incident on the outward facing reflection surface 222 where it is reflected as light 17a and forms a portion of the image I on the image-side 24 of the cloaking device assembly 20. It should be understood that the portion of the image I on the image-side 24 formed by light 17a on the first side (+X direction) of the reference optical axis 26 is formed from light with wavelengths shorter than $\lambda_{SC1}$.

Still referring to the first optical path A on the first side (+X direction) of the reference optical axis 26, in embodiments where the color filters 252-258 and 262-268 are short-pass color filters, the first object-side color filter 252 and the first image-side color filter 262 have a long cut-off wavelength $\lambda_{LC1}$; the first object-side color filter 254 and the first image-side color filter 264 have a long cut-off wavelength $\lambda_{LC2}$ that is less than $\lambda_{LC1}$ ($\lambda_{LC1}>\lambda_{LC2}$); the first object-side color filter 256 and the first image-side color filter 266 have a long cut-off wavelength $\lambda_{LC3}$ that is less than $\lambda_{LC2}$ ($\lambda_{LC2}>\lambda_{LC3}$); and the first object-side color filter 258 and the first image-side color filter 268 have a long cut-off wavelength $\lambda_{LC4}$ that is less than $\lambda_{LC3}$ ($\lambda_{LC3}>\lambda_{LC4}$) Accordingly, the short-pass color filters 252-258 and 262-268 are sequentially arranged from the reference optical axis 26 to the bisecting axis 25 in the decreasing cut-off wavelength order $\lambda_{LC1}$, $\lambda_{LC2}$, $\lambda_{LC3}$, $\lambda_{LC4}$, respectively, where $\lambda_{LC1}>\lambda_{LC2}>\lambda_{LC3}>\lambda_{LC4}$.

The first object-side CR reflection boundary 210 is positioned relative to the first object-side color filter 252 with $\lambda_{LC1}$ such that light 2a reflected by the outward facing reflection surface 212 of the first object-side CR reflection boundary 210 is incident on the first object-side color filter 252. Wavelengths of light 2a longer than $\lambda_{LC1}$ are reflected by the first object-side color filter 252 as light 3a and wavelengths of light 2a shorter than $\lambda_{LC1}$ are transmitted through the first object-side color filter 252 (not shown). Also, wavelengths of light longer than $\lambda_{LC1}$ will be reflected by the color filters 254, 256, 258, 268, 266, 264, 262 since wavelengths of light longer than $\lambda_{LC1}$ are longer than $\lambda_{LC2}$, $\lambda_{LC3}$, and $\lambda_{LC4}$, and short-pass color filters reflect light with wavelengths greater than their corresponding long cut-off wavelengths. The first object-side color filter 252 is positioned relative to the first object-side CR reflection boundary 210 such that light 3a reflected by the first object-side color filter 252 is incident on the outward facing reflection surface 212 of the first object-side CR reflection boundary 210 where it is reflected as light 4a. The first object-side CR reflection boundary 210 is positioned relative to the first object-side color filter 254 with $\lambda_{LC2}$ such that light 4a reflected by the outward facing reflection surface 212 is incident on the first object-side color filter 254. The first object-side color filter 254 is positioned relative to the first object-side CR reflection boundary 210 such that light 5a reflected by the first object-side color filter 254 is incident on the outward facing reflection surface 212 of the first object-side CR reflection boundary 210 where it is reflected as light 6a. The first object-side CR reflection boundary 210 is positioned relative to the first object-side color filter 256 with $\lambda_{LC3}$ such that light 6a reflected by the outward facing reflection surface 212 is incident on the first object-side color filter 256. The first object-side color filter 256 is positioned relative to the first object-side CR reflection boundary 210 such that light 7a reflected by the first object-side color filter 256 is incident on the outward facing reflection surface 212 of the first object-side CR reflection boundary 210 where it is reflected as light 8a. The first object-side CR reflection boundary 210 is positioned relative to the first object-side color filter 258 with $\lambda_{LC4}$ such that light 8a reflected by the outward facing reflection surface 212 is incident on the first object-side color filter 258 where it is reflected as light 9a. The first object-side color filter 258 is positioned relative to the first image-side color filter 268 with $\lambda_{LC4}$ such that light 9a is reflected by the first object-side color filter 258 to the image-side 24 of the cloaking device assembly 20 where it is incident on the first image-side color filter 268 and reflected as light 10a.

On the image-side 24 of the cloaking device assembly 20, the first image-side color filter 268 is positioned relative to the first image-side CR reflection boundary 220 such that light 10a reflected by the first image-side color filter 268 is incident on the outward facing reflection surface 222 (FIG. 2A) where it is reflected as light 11a. The first image-side CR reflection boundary 220 is positioned relative to the first image-side color filter 266 with $\lambda_{LC3}$ such that light 11a reflected by the outward facing reflection surface 222 is incident on the first image-side color filter 266 where it is reflected as light 12a. The first image-side color filter 266 is positioned relative to the first image-side CR reflection boundary 220 such that light 12a reflected by the first image-side color filter 266 is incident on the outward facing reflection surface 222 where it is reflected as light 13a. The first image-side CR reflection boundary 220 is positioned relative to the first image-side color filter 264 with $\lambda_{LC2}$ such that light 13a reflected by the outward facing reflection surface 222 is incident on the first image-side color filter 264 where it is reflected as light 14a. The first image-side color filter 264 is positioned relative to the first image-side CR reflection boundary 220 such that light 14a reflected by the first image-side color filter 264 is incident on the outward facing reflection surface 222 where it is reflected as light 15a. The first image-side CR reflection boundary 220 is positioned relative to the first image-side color filter 262 with $\lambda_{LC1}$ such that light 15*a* reflected by the outward facing reflection surface 222 is incident on the first image-side color filter 262 where it is reflected as light 16*a*. The first image-side color filter 262 is positioned relative to the first image-side CR reflection boundary 220 such that light 16*a* reflected by the first image-side color filter 262 is incident on the outward facing reflection surface 222 where it is reflected as light 17*a* and forms a portion of the image I on the image-side 24 of the cloaking device assembly 10. It should be understood that the portion of the image I on the image-side 24 formed by light 17*a* on the first side (+X direction) of the reference optical axis 26 is formed from light with wavelengths longer than $\lambda_{LC1}$.

Accordingly, light from the object O may travel from the object-side 22 to the image-side 24 on the first side (+X direction) of the reference optical axis 26 via the first optical path A: object O—first object-side CR reflection boundary 210—first object-side color filter 252—first object-side CR reflection boundary 210—first object-side color filter 254—first object-side CR reflection boundary 210—first object-side color filter 256—first object-side CR reflection boundary 210—first object-side color filter 258—first image-side color filter 268—first image-side CR reflection boundary 220—first image-side color filter 266—first image-side CR reflection boundary 220—first image-side color filter 264—first image-side CR reflection boundary 220—first image-side color filter 262—first image-side CR reflection boundary 220—image I. That is, light from the object O may travel from the object-side 22 to the image-side 24 on the first side (+X direction) of the reference optical axis 26 via the first optical path A: object O—reflection from first object-side CR reflection boundary 210—reflection from first object-side color filter 252—reflection from first object-side CR reflection boundary 210—reflection from first object-side color filter 254—reflection from first object-side CR reflection boundary 210—reflection from first object-side color filter 256—reflection from first object-side CR reflection boundary 210—reflection from first object-side color filter 258—reflection from first image-side color filter 268—reflection from first image-side CR reflection boundary 220—reflection from first image-side color filter 266—reflection from first image-side CR reflection boundary 220—reflection from first image-side color filter 264—reflection from first image-side CR reflection boundary 220—reflection from first image-side color filter 262—reflection from first image-side CR reflection boundary 220—image I.

Regarding the second optical path B (FIG. 2B) on the first side (+X direction) of the reference optical axis 26, light from the object O positioned above (+Y direction) the cloaking device assembly 20 between the first optical path transition axis 27*a* and the second optical path transition axis 27*b* is incident on the first object-side color filter 252 (shown as arrow '1*b*' in FIG. 2B). As noted above, in embodiments where the color filters 252-258 and 262-268 are long-pass color filters, the long-pass color filters 252-258 and 262-268 are sequentially arranged from the reference optical axis 26 to the bisecting axis 25 in the cut-off wavelength order $\lambda_{SC1}$, $\lambda_{SC2}$, $\lambda_{SC3}$, $\lambda_{SC4}$, where $\lambda_{SC1} < \lambda_{SC2} < \lambda_{SC3} < \lambda_{SC4}$. Accordingly, wavelengths of light 1*b* shorter than $\lambda_{SC1}$ are reflected by the first object-side color filter 252 (not shown) and wavelengths of light 1*b* longer than $\lambda_{SC1}$ are transmitted through the first object-side color filter 252 as light 2*b*. The first object-side color filter 252 is positioned relative to the first object-side CR reflection boundary 210 such that light 2*b* transmitted through the first object-side color filter 252 is incident on the first object-side CR reflection boundary 210 where it is reflected by the outward facing reflection surface 212 (FIG. 2A) as light 3*b*. The first object-side CR reflection boundary 210 is positioned relative to the first object-side color filter 254 with $\lambda_{SC2}$ such that light 3*b* reflected by the outward facing reflection surface 212 is incident on the first object-side color filter 254. Wavelengths of light 3*b* shorter than the short cut-off wavelength $\lambda_{SC2}$ are reflected by the first object-side color filter 254 as light 4*b* and wavelengths of light 3*b* longer than the short cut-off wavelength $\lambda_{SC2}$ are transmitted through the first object-side color filter 254 (not shown). That is, light 4*b* reflected by the first object-side color filter 254 has wavelengths longer than $\lambda_{SC1}$ and shorter than $\lambda_{SC2}$. Also, light with wavelengths shorter than $\lambda_{SC2}$ will be reflected by the color filters 256, 258, 268, 266, and 264 since wavelengths shorter than $\lambda_{SC2}$ are shorter than $\lambda_{SC3}$ and $\lambda_{SC4}$. The first object-side color filter 254 is positioned relative to the object-side CR reflection boundary 210 such that light 4*b* reflected by the first object-side color filter 254 is incident on the object-side CR reflection boundary 210 where it is reflected as light 5*b*. The first object-side CR reflection boundary 210 is positioned relative to the first object-side color filter 256 with $\lambda_{SC3}$ such that light 5*b* reflected by the outward facing reflection surface 212 is incident on the first object-side color filter 256 where it is reflected as 6*b*. The first object-side color filter 256 is positioned relative to the object-side CR reflection boundary 210 such that light 6*b* reflected by the first object-side color filter 256 is incident on the object-side CR reflection boundary 210 where it is reflected as light 7*b*. The first object-side CR reflection boundary 210 is positioned relative to the first object-side color filter 258 with $\lambda_{SC4}$ such that light 7*b* reflected by the outward facing reflection surface 212 is incident on the first object-side color filter 258 where it is reflected as light 8*b*. The first object-side color filter 258 is positioned relative to the first image-side color filter 268 with $\lambda_{SC4}$ such that light 8*b* is reflected by the first object-side color filter 258 to the image-side 24 of the cloaking device assembly 20 where it is incident on the first image-side color filter 268 and reflected as light 9*b*.

On the image-side 24 of the cloaking device assembly 20, the first image-side color filter 268 is positioned relative to the image-side CR reflection boundary 220 such that light 9*b* reflected by the first image-side color filter 268 is incident on the outward facing reflection surface 222 (FIG. 2A) where it is reflected as light 10*b*. The first image-side CR reflection boundary 220 is positioned relative to the first image-side color filter 266 with $\lambda_{SC3}$ such that light 10*b* reflected by the outward facing reflection surface 222 is incident on the first image-side color filter 266 where it is reflected as light 11*b*. The first image-side color filter 266 is positioned relative to the first image-side CR reflection boundary 220 such that light 11*b* reflected by the first image-side color filter 266 is incident on the outward facing reflection surface 222 where it is reflected as light 12*b*. The first image-side CR reflection boundary 220 is positioned relative to the first image-side color filter 264 with $\lambda_{SC2}$ such that light 12*b* reflected by the outward facing reflection surface 222 is incident on the first image-side color filter 264 where it is reflected as light 13*b*. The first image-side color filter 264 is positioned relative to the first image-side CR reflection boundary 220 such that light 13*b* reflected by the first image-side color filter 264 is incident on the outward facing reflection surface 222 where it is reflected as light 14*b*. The first image-side CR reflection boundary 220 is positioned relative to the first image-side color filter 262 with $\lambda_{SC1}$ such that light 14*b* reflected by the outward facing reflection surface 222 is incident on the first image-side color filter 262. Light 14*b* has wavelengths of light longer than $\lambda_{SC1}$ and is transmitted through first image-side color filter 262 as light 15b and forms a portion of the image I on the image-side 24 of the cloaking device assembly 20. It should be understood that the portion of the image I on the image-side 24 formed by light 15b on the first side (+X direction) of the reference optical axis 26 is formed from light wavelengths between $\lambda_{SC1}$ and $\lambda_{SC2}$.

Still referring to the second optical path B on the first side (+X direction) of the reference optical axis 26, in embodiments where the color filters 252-258 and 262-268 are short-pass color filters, the short-pass color filters 252-258 and 262-268 are sequentially arranged from the reference optical axis 26 to the bisecting axis 25 in a cut-off wavelength order $\lambda_{LC1}$, $\lambda_{LC2}$, $\lambda_{LC3}$, $\lambda_{LC4}$, where $\lambda_{LC1} > \lambda_{LC2} > \lambda_{LC3} < \lambda_{LC4}$. Accordingly, wavelengths of light 1b shorter than $\lambda_{LC1}$ are transmitted through the first object-side color filter 252 as light 2b and wavelengths of light 1b longer than $\lambda_{LC1}$ are reflected by the first object-side color filter 252 (not shown). The first object-side color filter 252 is positioned relative to the first object-side CR reflection boundary 210 such that light 2b transmitted through the first object-side color filter 252 is incident on the first object-side CR reflection boundary 210 where it is reflected by the outward facing reflection surface 212 (FIG. 2A) as light 3b. The first object-side CR reflection boundary 210 is positioned relative to the first object-side color filter 254 with $\lambda_{LC2}$ such that light 3b reflected by the outward facing reflection surface 212 is incident on the first object-side color filter 254. Wavelengths of light 3b shorter than the long cut-off wavelength $\lambda_{LC2}$ are transmitted through the first object-side color filter 254 (not shown) and wavelengths of light 3b longer than the long cut-off wavelength $\lambda_{LC2}$ are reflected by the first object-side color filter 254 as light 4b. That is, light 4b reflected by the first object-side color filter 254 has wavelengths shorter than $\lambda_{LC1}$ and longer than $\lambda_{LC2}$. Also, light with wavelengths longer than $\lambda_{LC2}$ will be reflected by the color filters 256, 258, 268, 266, and 264 since wavelengths longer than $\lambda_{LC2}$ are longer than $\lambda_{LC3}$ and $\lambda_{LC4}$. The first object-side color filter 254 is positioned relative to the object-side CR reflection boundary 210 such that light 4b reflected by the first object-side color filter 254 is incident on the object-side CR reflection boundary 210 where it is reflected as light 5b. The first object-side CR reflection boundary 210 is positioned relative to the first object-side color filter 256 with $\lambda_{LC3}$ such that light 5b reflected by the outward facing reflection surface 212 is incident on the first object-side color filter 256 where it is reflected as light 6b. The first object-side color filter 256 is positioned relative to the object-side CR reflection boundary 210 such that light 6b reflected by the first object-side color filter 256 is incident on the object-side CR reflection boundary 210 where it is reflected as light 7b. The first object-side CR reflection boundary 210 is positioned relative to the first object-side color filter 258 with $\lambda_{LC3}$ such that light 7b reflected by the outward facing reflection surface 212 is incident on the first object-side color filter 258 where it is reflected as 8b. The first object-side color filter 258 is positioned relative to the first image-side color filter 268 with $\lambda_{LC3}$ such that light 8b is reflected by the first object-side color filter 258 to the image-side 24 of the cloaking device assembly 20 where it is incident on the first image-side color filter 268 and reflected as light 9b.

On the image-side 24 of the cloaking device assembly 20, the first image-side color filter 268 is positioned relative to the image-side CR reflection boundary 220 such that light 9b reflected by the first image-side color filter 268 is incident on the outward facing reflection surface 222 (FIG. 2A) where it is reflected as light 10b. The first image-side CR reflection boundary 220 is positioned relative to the first image-side color filter 266 with $\lambda_{LC3}$ such that light 10b reflected by the outward facing reflection surface 222 is incident on the first image-side color filter 266 where it is reflected as light 11b. The first image-side color filter 266 is positioned relative to the first image-side CR reflection boundary 220 such that light 11b reflected by the first image-side color filter 266 is incident on the outward facing reflection surface 222 where it is reflected as light 12b. The first image-side CR reflection boundary 220 is positioned relative to the first image-side color filter 264 with $\lambda_{LC2}$ such that light 12b reflected by the outward facing reflection surface 222 is incident on the first image-side color filter 264 where it is reflected as light 13b. The first image-side color filter 264 is positioned relative to the first image-side CR reflection boundary 220 such that light 13b reflected by the first image-side color filter 264 is incident on the outward facing reflection surface 222 where it is reflected as light 14b. The first image-side CR reflection boundary 220 is positioned relative to the first image-side color filter 262 with $\lambda_{LC1}$ such that light 14b reflected by the outward facing reflection surface 222 is incident on the first image-side color filter 262. Light 14b has wavelengths of light shorter than $\lambda_{LC1}$ and is transmitted through first image-side color filter 262 as light 15b and forms a portion of the image I on the image-side 24 of the cloaking device assembly 20. It should be understood that the portion of the image I on the image-side 24 formed by light 15b on the first side (+X direction) of the reference optical axis 26 is formed from light with wavelengths between $\lambda_{LC1}$ and $\lambda_{LC2}$.

Accordingly, light from the object O may travel from the object-side 22 to the image-side 24 on the first side (+X direction) of the reference optical axis 26 via the second optical path B: object O—first object-side color filter 252—first object-side CR reflection boundary 210—first object-side color filter 254—first object-side CR reflection boundary 210—first object-side color filter 256—first object-side CR reflection boundary 210—first object-side color filter 258—first image-side color filter 268—first image-side CR reflection boundary 220—first image-side color filter 266—first image-side CR reflection boundary 220—first image-side color filter 264—first image-side CR reflection boundary 220—first image-side color filter 262—image I. That is, light from the object O may travel from the object-side 22 to the image-side 24 on the first side (+X direction) of the reference optical axis 26 via the second optical path A: object O—transmittance through first object-side color filter 252—reflection from first object-side CR reflection boundary 210—reflection from first object-side color filter 254—reflection from first object-side CR reflection boundary 210—reflection from first object-side color filter 256—reflection from first object-side CR reflection boundary 210—reflection from first object-side color filter 258—reflection from first image-side color filter 268—reflection from first image-side CR reflection boundary 220—reflection from first image-side color filter 266—reflection from first image-side CR reflection boundary 220—reflection from first image-side color filter 264—reflection from first image-side CR reflection boundary 220—transmittance through first image-side color filter 262—image I.

Regarding the third optical path C (FIG. 2C) on the first side (+X direction) of the reference optical axis 26, light from the object O positioned above (+Y direction) the cloaking device assembly 20 between the second optical path transition axis 27b and the third optical path transition axis 27c is incident on the first object-side color filter 254 (shown as arrow '1c' in FIG. 2C). As noted above, in embodiments where the color filters 252-258 and 262-268 are long-pass color filters, the long-pass color filters 252-258 and 262-268 are sequentially arranged from the reference optical axis 26 to the bisecting axis 25 in the cut-off wavelength order $\lambda_{SC1}$, $\lambda_{SC2}$, $\lambda_{SC3}$, $\lambda_{SC4}$, where $\lambda_{SC1} < \lambda_{SC2} < \lambda_{SC3} < \lambda_{SC4}$. Accordingly, wavelengths of light 1c longer than $\lambda_{SC2}$ are transmitted through the first object-side color filter 254 as light 2c and wavelengths of light 1c shorter than $\lambda_{SC2}$ are reflected by the first object-side color filter 254 (not shown). The first object-side color filter 254 is positioned relative to the first object-side CR reflection boundary 210 such that light 2c transmitted through the first object-side color filter 254 is incident on the first object-side CR reflection boundary 210 where it is reflected by the outward facing reflection surface 212 (FIG. 2A) as light 3c. The first object-side CR reflection boundary 210 is positioned relative to the first object-side color filter 256 with $\lambda_{SC3}$ such that light 3c reflected by the outward facing reflection surface 212 is incident on the first object-side color filter 256. Wavelengths of light 3c shorter than the short cut-off wavelength $\lambda_{SC3}$ are reflected by the first object-side color filter 256 as light 4c and wavelengths of light 3c longer than the short cut-off wavelength $\lambda_{SC3}$ are transmitted through the first object-side color filter 256 (not shown). That is, light 4c reflected by the first object-side color filter 256 has wavelengths longer than $\lambda_{SC2}$ and shorter than $\lambda_{SC3}$. Also, light with wavelengths shorter than $\lambda_{SC3}$ will be reflected by the color filters 258, 268, and 266 since wavelengths shorter than $\lambda_{SC3}$ are shorter than $\lambda_{SC4}$. The first object-side color filter 256 is positioned relative to the object-side CR reflection boundary 210 such that light 4c reflected by the first object-side color filter 256 is incident on the object-side CR reflection boundary 210 where it is reflected as light 5c. The first object-side CR reflection boundary 210 is positioned relative to the first object-side color filter 258 with $\lambda_{SC4}$ such that light 5c reflected by the outward facing reflection surface 212 is incident on the first object-side color filter 258 where it is reflected as 6c. The first object-side color filter 258 is positioned relative to the first image-side color filter 268 with $\lambda_{SC4}$ such that light 6c is reflected by the first object-side color filter 258 to the image-side 24 of the cloaking device assembly 20 where it is incident on the first image-side color filter 268 and reflected as light 7c.

On the image-side 24 of the cloaking device assembly 20, the first image-side color filter 268 is positioned relative to the image-side CR reflection boundary 220 such that light 7c reflected by the first image-side color filter 268 is incident on the outward facing reflection surface 222 (FIG. 2A) where it is reflected as light 8c. The first image-side CR reflection boundary 220 is positioned relative to the first image-side color filter 266 with $\lambda_{SC3}$ such that light 8c reflected by the outward facing reflection surface 222 is incident on the first image-side color filter 266 where it is reflected as light 9c. The first image-side color filter 266 is positioned relative to the first image-side CR reflection boundary 220 such that light 9c reflected by the first image-side color filter 266 is incident on the outward facing reflection surface 222 where it is reflected as light 10c. The first image-side CR reflection boundary 220 is positioned relative to the first image-side color filter 264 with $\lambda_{SC2}$ such that light 10c reflected by the outward facing reflection surface 222 is incident on the first image-side color filter 264. Light 10c has wavelengths of light longer than $\lambda_{SC2}$ and is transmitted through the first image-side color filter 264 as light 11c and forms a portion of the image I on the image-side 24 of the cloaking device assembly 20. It should be understood that the portion of the image I on the image-side 24 formed by light 11c on the first side (+X direction) of the reference optical axis 26 is formed from light with wavelengths between $\lambda_{SC2}$ and $\lambda_{SC3}$.

Still referring to the third optical path C on the first side (+X direction) of the reference optical axis 26, in embodiments where the color filters 252-258 and 262-268 are short-pass color filters, the short-pass color filters 252-258 and 262-268 are sequentially arranged from the reference optical axis 26 to the bisecting axis 25 in the cut-off wavelength order $\lambda_{LC1}$, $\lambda_{LC2}$, $\lambda_{LC3}$, $\lambda_{LC4}$, where $\lambda_{LC1} > \lambda_{LC2} > \lambda_{LC3} < \lambda_{LC4}$. Accordingly, wavelengths of light 1c shorter than $\lambda_{LC2}$ are transmitted through the first object-side color filter 254 as light 2c and wavelengths of light 1c longer than $\lambda_{LC2}$ are reflected by the first object-side color filter 254 (not shown). The first object-side color filter 254 is positioned relative to the first object-side CR reflection boundary 210 such that light 2c transmitted through the first object-side color filter 254 is incident on the first object-side CR reflection boundary 210 where it is reflected by the outward facing reflection surface 212 (FIG. 2A) as light 3c. The first object-side CR reflection boundary 210 is positioned relative to the first object-side color filter 256 with $\lambda_{LC3}$ such that light 3c reflected by the outward facing reflection surface 212 is incident on the first object-side color filter 256. Wavelengths of light 3c longer than the long cut-off wavelength $\lambda_{LC3}$ are reflected by the first object-side color filter 256 as light 4c and wavelengths of light 3c shorter than long cut-off wavelength $\lambda_{LC3}$ are transmitted through the first object-side color filter 256 (not shown). That is, light 4c reflected by the first object-side color filter 256 has wavelengths longer than $\lambda_{LC2}$ and shorter than $\lambda_{LC3}$. Also, light with wavelengths longer than $\lambda_{LC3}$ will be reflected by the color filters 258, 268, and 266 since wavelengths longer than $\lambda_{LC3}$ are longer than $\lambda_{LC4}$. The first object-side color filter 256 is positioned relative to the object-side CR reflection boundary 210 such that light 4c reflected by the first object-side color filter 256 is incident on the object-side CR reflection boundary 210 where it is reflected as light 5c. The first object-side CR reflection boundary 210 is positioned relative to the first object-side color filter 258 with $\lambda_{LC4}$ such that light 5c reflected by the outward facing reflection surface 212 is incident on the first object-side color filter 258 where it is reflected as light 6c. The first object-side color filter 258 is positioned relative to the first image-side color filter 268 with $\lambda_{LC4}$ such that light 6c is reflected by the first object-side color filter 258 to the image-side 24 of the cloaking device assembly 20 where it is incident on the first image-side color filter 268 and reflected as light 7c.

On the image-side 24 of the cloaking device assembly 20, the first image-side color filter 268 is positioned relative to the image-side CR reflection boundary 220 such that light 7c reflected by the first image-side color filter 268 is incident on the outward facing reflection surface 222 (FIG. 2A) where it is reflected as light 8c. The first image-side CR reflection boundary 220 is positioned relative to the first image-side color filter 266 with $\lambda_{LC3}$ such that light 8c reflected by the outward facing reflection surface 222 is incident on the first image-side color filter 266 where it is reflected as light 9c. The first image-side color filter 266 is positioned relative to the first image-side CR reflection boundary 220 such that light 9c reflected by the first image-side color filter 266 is incident on the outward facing reflection surface 222 where it is reflected as light 10c. The first image-side CR reflection boundary 220 is positioned relative to the first image-side color filter 264 with $\lambda_{LC2}$ such that light 10c reflected by the outward facing reflection surface 222 is incident on the first image-side color filter 264. Light 10c has wavelengths of light longer than $\lambda_{LC2}$ and is transmitted through first image-side color filter 264 as light 11c and forms a portion of the image I on the image-side 24 of the cloaking device assembly 20. It should be understood that the portion of the image I on the image-side 24 formed by light 11c on the first side (+X direction) of the reference optical axis 26 is formed from light with wavelengths between $\lambda_{LC2}$ and $\lambda_{LC3}$.

Accordingly, light from the object O may travel from the object-side 22 to the image-side 24 on the first side (+X direction) of the reference optical axis 26 via the third optical path C: object O—first object-side color filter 254—first object-side CR reflection boundary 210—first object-side color filter 256—first object-side CR reflection boundary 210—first object-side color filter 258—first image-side color filter 268—first image-side CR reflection boundary 220—first image-side color filter 266—first image-side CR reflection boundary 220—first image-side color filter 264—image I. That is, light from the object O may travel from the object-side 22 to the image-side 24 on the first side (+X direction) of the reference optical axis 26 via the second optical path C: object O—transmittance through first object-side color filter 254—reflection from first object-side CR reflection boundary 210—reflection from first object-side color filter 256—reflection from first object-side CR reflection boundary 210—reflection from first object-side color filter 258—reflection from first image-side color filter 268—reflection from first image-side CR reflection boundary 220—reflection from first image-side color filter 266—reflection from first image-side CR reflection boundary 220—transmittance through first image-side color filter 264—image I.

Regarding the fourth optical path D (FIG. 2C) on the first side (+X direction) of the reference optical axis 26, light from the object O positioned above (+Y direction) the cloaking device assembly 20 between the third optical path transition axis 27c and the fourth optical path transition axis 27d is incident on the first object-side color filter 256 (shown as arrow '1d' in FIG. 2C). As noted above, in embodiments where the color filters 252-258 and 262-268 are long-pass color filters, the long-pass color filters 252-258 and 262-268 are sequentially arranged from the reference optical axis 26 to the bisecting axis 25 in the cut-off wavelength order $\alpha_{SC1}$, $\lambda_{SC2}$, $\lambda_{SC3}$, $\lambda_{SC4}$, where $\lambda_{SC1}<\lambda_{SC2}<\lambda_{SC3}<\lambda_{SC4}$. Accordingly, wavelengths of light 1d shorter than $\lambda_{SC3}$ are reflected by the first object-side color filter 256 (not shown) and wavelengths of light 1d longer than $\lambda_{SC3}$ are transmitted through the first object-side color filter 256 as light 2d. The first object-side color filter 256 is positioned relative to the first object-side CR reflection boundary 210 such that light 2d transmitted through the first object-side color filter 256 is incident on the first object-side CR reflection boundary 210 where it is reflected by the outward facing reflection surface 212 (FIG. 2A) as light 3d. The first object-side CR reflection boundary 210 is positioned relative to the first object-side color filter 258 with $\lambda_{SC4}$ such that light 3d reflected by the outward facing reflection surface 212 is incident on the first object-side color filter 258. Wavelengths of light 3d shorter than the short cut-off wavelength $\lambda_{SC4}$ are reflected by the first object-side color filter 258 as light 4d and wavelengths of light 3d longer than the short cut-off wavelength $\lambda_{SC4}$ are transmitted through the first object-side color filter 258 (not shown). That is, light 4d reflected by the first object-side color filter 258 has wavelengths longer than $\lambda_{SC3}$ and shorter than $\lambda_{SC4}$. The first object-side color filter 258 is positioned relative to the first image-side color filter 268 with $\lambda_{SC4}$ such that light 4d reflected by the first object-side color filter 258 is incident on the first image-side color filter 268 where it is reflected as light 5d. The first image-side color filter 268 is positioned relative to the image-side CR reflection boundary 220 such that light 5d reflected by the first image-side color filter 268 is incident on the outward facing reflection surface 222 (FIG. 2A) where it is reflected as light 6d. The first image-side CR reflection boundary 220 is positioned relative to the first image-side color filter 266 with $\lambda_{SC3}$ such that light 6d reflected by the outward facing reflection surface 222 is incident on the first image-side color filter 266. Light 6d has wavelengths longer than $\lambda_{SC3}$ and is transmitted through the first image-side color filter 266 as light 7d and forms a portion of the image I on the image-side 24 of the cloaking device assembly 20. It should be understood that the portion of the image I on the image-side 24 formed by light 7d on the first side (+X direction) of the reference optical axis 26 is formed from light with wavelengths between $\lambda_{SC3}$ and $\lambda_{SC4}$.

Still referring to the fourth optical path D on the first side (+X direction) of the reference optical axis 26, in embodiments where the color filters 252-258 and 262-268 are short-pass color filters, the short-pass color filters 252-258 and 262-268 are sequentially arranged from the reference optical axis 26 to the bisecting axis 25 in the cut-off wavelength order $\lambda_{LC1}$, $\lambda_{LC2}$, $\lambda_{LC3}$, $\lambda_{LC4}$, where $\lambda_{LC1}>\lambda_{LC2}>\lambda_{LC3}>\lambda_{LC4}$. Accordingly, wavelengths of light 1d shorter than $\lambda_{LC3}$ are transmitted through the first object-side color filter 256 as light 2d and wavelengths of light 1d longer than $\lambda_{LC3}$ are reflected by the first object-side color filter 256 (not shown). The first object-side color filter 256 is positioned relative to the first object-side CR reflection boundary 210 such that light 2d transmitted through the first object-side color filter 256 is incident on the first object-side CR reflection boundary 210 where it is reflected by the outward facing reflection surface 212 (FIG. 2A) as light 3d. The first object-side CR reflection boundary 210 is positioned relative to the first object-side color filter 258 with $\lambda_{LC4}$ such that light 3d reflected by the outward facing reflection surface 212 is incident on the first object-side color filter 258. Wavelengths of light 3d longer than the long cut-off wavelength $\lambda_{LC4}$ are reflected by the first object-side color filter 258 as light 4d and wavelengths of light 3d shorter than long cut-off wavelength $\lambda_{LC4}$ are transmitted through the first object-side color filter 258 (not shown). That is, light 4d reflected by the first object-side color filter 258 has wavelengths longer than $\lambda_{LC3}$ and shorter than $\lambda_{LC4}$. The first object-side color filter 258 is positioned relative to the first image-side color filter 268 with $\lambda_{LC4}$ such that light 4d reflected by the first object-side color filter 258 is incident on the first image-side color filter 268 where it is reflected as light 5d. The first image-side color filter 268 is positioned relative to the image-side CR reflection boundary 220 such that light 5d reflected by the first image-side color filter 268 is incident on the outward facing reflection surface 222 (FIG. 2A) where it is reflected as light 6d. The first image-side CR reflection boundary 220 is positioned relative to the first image-side color filter 266 with $\lambda_{LC3}$ such that light 6d reflected by the outward facing reflection surface 222 is incident on the first image-side color filter 266. Light 6d has wavelengths longer than $\lambda_{LC3}$ and is transmitted through the first image-side color filter 264 as light 7d and forms a portion of the image I on the image-side 24 of the cloaking device assembly 20. It should be understood that the portion of the image I on the image-side 24 formed by light 7d on the first side (+X direction) of the reference optical axis 26 is formed with electromagnetic radiation with wavelengths between $\lambda_{LC3}$ and $\lambda_{LC4}$.

Accordingly, light from the object O may travel from the object-side 22 to the image-side 24 on the first side (+X direction) of the reference optical axis 26 via the fourth optical path D: object O—first object-side color filter 256—first object-side CR reflection boundary 210—first object-side color filter 258—first image-side color filter 268—first image-side CR reflection boundary 220—first image-side color filter 266—image I. That is, light from the object O may travel from the object-side 22 to the image-side 24 on the first side (+X direction) of the reference optical axis 26 via the fourth optical path D: object O transmittance through first object-side color filter 256—reflection from first object-side CR reflection boundary 210—reflection from first object-side color filter 258—reflection from first image-side color filter 268—reflection from first image-side CR reflection boundary 220—transmittance through first image-side color filter 266—image I.

Regarding the fifth optical path E (FIG. 2C) on the first side (+X direction) of the reference optical axis 26, light from the object O positioned above (+Y direction) the cloaking device assembly 20 between the fourth optical path transition axis 27d and the fifth optical path transition axis 27e is incident on the first object-side color filter 258 (shown as arrow '1e' in FIG. 2C). In embodiments where the color filters 252-258 and 262-268 are long-pass color filters, the first object-side color filter 258 has the short cut-off wavelength $\lambda_{SC4}$ and wavelengths of light 1e shorter than $\lambda_{SC4}$ are reflected by the first object-side color filter 258 (not shown) and wavelengths of light e longer than $\lambda_{SC4}$ are transmitted through the first object-side color filter 258 as light 2e. The first object-side color filter 258 is positioned relative to the first image-side color filter 268 with $\lambda_{SC4}$ such that light 2e transmitted through the first object-side color filter 258 is incident on the first image-side color filter 268. Light 2e has wavelengths longer than $\lambda_{SC4}$ and is transmitted through first image-side color filter 268 as light 3e and forms a portion of the image I on the image-side 24 of the cloaking device assembly 20. It should be understood that the portion of the image I on the image-side 24 formed by light 3e on the first side (+X direction) of the reference optical axis 26 is formed with electromagnetic radiation with wavelengths longer than $\lambda_{SC4}$.

Still referring to the fifth optical path E on the first side (+X direction) of the reference optical axis 26 (FIG. 2C), in embodiments where the color filters 252-258 and 262-268 are short-pass color filters the first object-side color filter 258 has the long cut-off wavelength $\lambda_{LC4}$ and wavelengths of light 1e longer than $\lambda_{LC4}$ are reflected by the first object-side color filter 258 (not shown) and wavelengths of light 1e shorter than $\lambda_{LC4}$ are transmitted through the first object-side color filter 258 as light 2e. The first object-side color filter 258 is positioned relative to the first image-side color filter 268 with $\lambda_{LC4}$ such that light 2e transmitted through the first object-side color filter 258 is incident on the first image-side color filter 268. Light 2e has wavelengths longer than $\lambda_{LC4}$ and is transmitted through first image-side color filter 268 as light 3e and forms a portion of the image I on the image-side 24 of the cloaking device assembly 20. It should be understood that the portion of the image I on the image-side 24 formed by light 3e on the first side (+X direction) of the reference optical axis 26 is formed from light with wavelengths shorter than $\lambda_{LC4}$.

Accordingly, light from the object O may travel from the object-side 22 to the image-side 24 on the first side (+X direction) of the reference optical axis 26 via the fifth optical path E: object O—first object-side color filter 258—first image-side color filter 266—image I. That is, light from the object O may travel from the object-side 22 to the image-side 24 on the first side (+X direction) of the reference optical axis 26 via the fifth optical path E: object O transmittance through first object-side color filter 258—transmittance through first image-side color filter 268—image I.

Still referring to FIGS. 2A-2C, and regarding the five optical paths on the second side (−X direction) of the reference optical axis 26, light from the object O incident on the cloaking device assembly 20 between the reference optical axis 26 and a first optical path transition axis 27a' propagates via an optical path 'A' (FIG. 2B). Light from the object O incident on the cloaking device assembly 20 between the first optical path transition axis 27a' and a second optical path transition axis 27b' propagates via an optical path 'B' (FIG. 2B). Light from the object O positioned above (+Y direction) the cloaking device assembly 20 between the second optical path transition axis 27b' and a third optical path transition axis 27c' propagates via an optical path 'C' (FIG. 2C). Light from the object O positioned above (+Y direction) the cloaking device assembly 20 between the third optical path transition axis 27c' and a fourth optical path transition axis 27d' propagates via an optical path 'D' (FIG. 2C). Light from the object O positioned above (+Y direction) the cloaking device assembly 20 between the fourth optical path transition axis 27d' and a fifth optical path transition axis 27e' propagates via an optical path 'E' (FIG. 2C).

The first optical path transition axis 27a' extends parallel to the Y-axis in the figures from the distal end 272b (FIG. 2A) of the second object-side color filter 272 to the object O. Accordingly, light propagating via optical path A is incident on the second object-side CR reflection boundary 230 (FIG. 2B). The second optical path transition axis 27b' extends parallel to the Y-axis from the distal end 274b (FIG. 2A) of the second object-side color filter 274 to object O. Accordingly, light propagating via optical path B is incident on the second object-side color filter 272 (FIG. 2B). The third optical path transition axis 27c' extends parallel to the Y-axis from the proximal end 274a (FIG. 2A) of the second object-side color filter 274 to the object O. Accordingly, light propagating via optical path C is incident on the second object-side color filter 274 (FIG. 2C). The fourth optical path transition axis 27d' extends parallel to the Y-axis from the proximal end 276a (FIG. 2A) of the second object-side color filter 276 to the object O. Accordingly, light propagating via optical path D is incident on the second object-side color filter 276 (FIG. 2C). The fifth optical path transition axis 27e' extends parallel to the Y-axis from the proximal end 278a (FIG. 2A) of the second object-side color filter 278 to the object O. Accordingly, light propagating via optical path E is incident on the second object-side color filter 278 (FIG. 2C).

Regarding the first optical path A on the second side (−X direction) of the reference optical axis 26 (FIG. 2B), light from the object O positioned above (+Y direction) the cloaking device assembly 20 between the reference optical axis 26 and the first optical path transition axis 27a' is incident on the second object-side CR reflection boundary 230 (shown as arrow '1a' in FIG. 2B) where it is reflected by the outward facing reflection surface 232 (FIG. 2A) as light 2a.

In embodiments where the color filters 272-278, 282-288 are long-pass color filters, the second object-side color filter 272 and the second image-side color filter 282 have a short cut-off wavelength $\lambda_{SC5}$; the second object-side color filter 274 and the second image-side color filter 284 have a short cut-off wavelength $\lambda_{SC6}$ that is greater than $\lambda_{SC5}$ ($X_{SC5} < \lambda_{SC6}$); the second object-side color filter 276 and the second image-side color filter 286 have a short cut-off wavelength $\lambda_{SC7}$ that is greater than $\lambda_{SC6}$ ($\lambda_{SC6} < \lambda_{SC7}$); and the second object-side color filter 278 and the second image-side color filter 288 have a short cut-off wavelength $\lambda_{SC8}$ that is greater than $\lambda_{SC7}$ ($\lambda_{SC7} < \lambda_{SC8}$). Accordingly, the long-pass color filters 272-278 and 282-288 are sequentially arranged from the reference optical axis 26 to the bisecting axis 25 in a cut-off wavelength order $\lambda_{SC5}, \lambda_{SC6}, \lambda_{SC7}, \lambda_{SC8}$, where $\lambda_{SC5} < \lambda_{SC6} < \lambda_{SC7} < \lambda_{SC8}$. In embodiments, the short cut-off wavelengths $\lambda_{SC5}, \lambda_{SC6}, \lambda_{SC7}, \lambda_{SC8}$ for the color filters 272-278 and 282-288 may be equal to short cut-off wavelengths $\alpha_{SC1}, \lambda_{SC2}, \lambda_{SC3}, \lambda_{SC4}$, respectively, for the color filters 252-258 and 262-268. In other embodiments, the short cut-off wavelengths $\lambda_{SC5}, \lambda_{SC6}, \lambda_{SC7}, \lambda_{SC8}$ may not be equal to $\lambda_{SC1}, \lambda_{SC2}, \lambda_{SC3}, \lambda_{SC4}$, respectively.

The second object-side CR reflection boundary 230 is positioned relative to the second object-side color filter 272 with $\lambda_{SC5}$ such that light 2a reflected by the outward facing reflection surface 232 of the second object-side CR reflection boundary 230 is incident on the second object-side color filter 272. Wavelengths of light 2a shorter than $\lambda_{SC5}$ are reflected by the second object-side color filter 272 as light 3a and wavelengths of light 2a longer than $\lambda_{SC5}$ are transmitted through the second object-side color filter 272 (not shown). Also, wavelengths of light shorter than $\lambda_{SC5}$ will be reflected by the color filters 274, 276, 278, 288, 286, 284, 282 since wavelengths of light shorter than $\lambda_{SC5}$ are shorter than $\lambda_{SC6}, \lambda_{SC7}$ and $\lambda_{SC8}$, and long-pass color filters reflect light with wavelengths less than their corresponding short cut-off wavelengths. The second object-side color filter 272 is positioned relative to the second object-side CR reflection boundary 230 such that light 3a reflected by the second object-side color filter 272 is incident on the outward facing reflection surface 232 of the second object-side CR reflection boundary 230 where it is reflected as light 4a. The second object-side CR reflection boundary 230 is positioned relative to the second object-side color filter 274 with $\lambda_{SC6}$ such that light 4a reflected by the outward facing reflection surface 232 is incident on the second object-side color filter 274 where it is reflected as light 5a. The second object-side color filter 274 is positioned relative to the second object-side CR reflection boundary 230 such that light 5a reflected by the second object-side color filter 274 is incident on the outward facing reflection surface 232 of the second object-side CR reflection boundary 230 where it is reflected as light 6a. The second object-side CR reflection boundary 230 is positioned relative to the second object-side color filter 276 with $\lambda_{SC7}$ such that light 6a reflected by the outward facing reflection surface 232 is incident on the second object-side color filter 276 where it is reflected as light 7a. The second object-side color filter 276 is positioned relative to the second object-side CR reflection boundary 230 such that light 7a reflected by the second object-side color filter 276 is incident on the outward facing reflection surface 232 of the second object-side CR reflection boundary 230 where it is reflected as light 8a. The second object-side CR reflection boundary 230 is positioned relative to the second object-side color filter 278 with $\lambda_{SC8}$ such that light 8a reflected by the outward facing reflection surface 232 is incident on the second object-side color filter 278 where it is reflected as light 9a. The second object-side color filter 278 is positioned relative to the second image-side color filter 288 with $\lambda_{SC8}$ such that light 9a is reflected by the second object-side color filter 278 to the image-side 24 of the cloaking device assembly 20 where it is incident on the second image-side color filter 288 and reflected as light 10a.

On the image-side 24 of the cloaking device assembly 20, the second image-side color filter 288 is positioned relative to the second image-side CR reflection boundary 240 such that light 10a reflected by the second image-side color filter 288 is incident on the outward facing reflection surface 242 (FIG. 2A) where it is reflected as light 11a. The second image-side CR reflection boundary 240 is positioned relative to the second image-side color filter 286 with $\lambda_{SC7}$ such that light 11a reflected by the outward facing reflection surface 242 is incident on the second image-side color filter 286 where it is reflected as light 12a. The second image-side color filter 286 is positioned relative to the second image-side CR reflection boundary 240 such that light 12a reflected by the second image-side color filter 286 is incident on the outward facing reflection surface 242 where it is reflected as light 13a. The second image-side CR reflection boundary 240 is positioned relative to the second image-side color filter 284 with $\lambda_{SC6}$ such that light 13a reflected by the outward facing reflection surface 242 is incident on the second image-side color filter 284 where it is reflected as light 14a. The second image-side color filter 284 is positioned relative to the second image-side CR reflection boundary 240 such that light 14a reflected by the second image-side color filter 284 is incident on the outward facing reflection surface 242 where it is reflected as light 15a. The second image-side CR reflection boundary 240 is positioned relative to the second image-side color filter 282 with $\lambda_{SC5}$ such that light 15a reflected by the outward facing reflection surface 242 is incident on the second image-side color filter 282 where it is reflected as light 16a. The second image-side color filter 282 is positioned relative to the second image-side CR reflection boundary 240 such that light 16a reflected by the second image-side color filter 282 is incident on the outward facing reflection surface 242 where it is reflected as light 17a and forms a portion of the image I on the image-side 24 of the cloaking device assembly 20. It should be understood that the portion of the image I on the image-side 24 formed by light 17a on the second side (−X direction) of the reference optical axis 26 is formed from light with wavelengths shorter than $\lambda_{SC5}$.

Still referring to the first optical path A on the second side (−X direction) of the reference optical axis 26, in embodiments where the color filters 272-278 and 282-288 are short-pass color filters, the second object-side color filter 272 and the second image-side color filter 282 have a long cut-off wavelength $\lambda_{LC5}$; the second object-side color filter 274 and the second image-side color filter 284 have a long cut-off wavelength $\lambda_{LC6}$ that is less than $\lambda_{LC5}$ ($\lambda_{LC5} > \lambda_{LC6}$); the second object-side color filter 276 and the second image-side color filter 286 have a long cut-off wavelength $\lambda_{LC7}$ that is less than $\lambda_{LC6}$ ($\lambda_{LC6} > \lambda_{LC7}$); and the second object-side color filter 278 and the second image-side color filter 288 have a long cut-off wavelength $\lambda_{LC8}$ that is less than $\lambda_{LC7}$ ($\lambda_{LC7} > \lambda_{LC8}$). Accordingly, the short-pass color filters 272-278 and 282-288 are sequentially arranged from the reference optical axis 26 to the bisecting axis 25 in a cut-off wavelength order $\lambda_{LC5}, \lambda_{LC6}, \lambda_{LC7}, \lambda_{LC8}$, respectively, where $\lambda_{LC5} > \lambda_{LC6} > \lambda_{LC7} > \lambda_{LC8}$. In embodiments, the long cut-off wavelengths $\lambda_{LC5}, \lambda_{LC6}, \lambda_{LC7}, \lambda_{LC8}$ for the color filters 272-278 and 282-288 may be equal to the long cut-off wavelengths $\lambda_{LC1}, \lambda_{LC2}, \lambda_{LC3}$, respectively, for the color filters 252-258 and 262-268. In other embodiments, the long cut-off wavelengths $\lambda_{LC5}, \lambda_{LC6}, \lambda_{LC7}, \lambda_{LC8}$ may not be equal to $\lambda_{LC1}, \lambda_{LC2}, \lambda_{LC3}, \lambda_{LC4}$, respectively.

The second object-side CR reflection boundary 230 is positioned relative to the second object-side color filter 272 with $\lambda_{LC5}$ such that light 2a reflected by the outward facing reflection surface 232 of the second object-side CR reflection boundary 230 is incident on the second object-side color filter 272. Wavelengths of light 2a longer than $\lambda_{LC5}$ are reflected by the second object-side color filter 272 as light 3a and wavelengths of light 2a shorter than $\lambda_{LC5}$ are transmitted through the second object-side color filter 272 (not shown). Also, wavelengths of light longer than $\lambda_{LC5}$ will be reflected by the color filters 274, 276, 278, 288, 286, 284, 282 since wavelengths of light longer than $\lambda_{LC5}$ are longer than $\lambda_{LC6}$, $\lambda_{LC7}$, and $\lambda_{LC8}$, and short-pass color filters reflect light with wavelengths greater than their corresponding long cut-off wavelengths. The second object-side color filter 272 is positioned relative to the second object-side CR reflection boundary 230 such that light 3a reflected by the second object-side color filter 272 is incident on the outward facing reflection surface 232 of the second object-side CR reflection boundary 230 where it is reflected as light 4a. The second object-side CR reflection boundary 230 is positioned relative to the second object-side color filter 274 with $\lambda_{LC6}$ such that light 4a reflected by the outward facing reflection surface 232 is incident on the second object-side color filter 274. The second object-side color filter 274 is positioned relative to the second object-side CR reflection boundary 230 such that light 5a reflected by the second object-side color filter 274 is incident on the outward facing reflection surface 232 of the second object-side CR reflection boundary 230 where it is reflected as light 6a. The second object-side CR reflection boundary 230 is positioned relative to the second object-side color filter 276 with $\lambda_{LC7}$ such that light 6a reflected by the outward facing reflection surface 232 is incident on the second object-side color filter 276. The second object-side color filter 276 is positioned relative to the second object-side CR reflection boundary 230 such that light 7a reflected by the second object-side color filter 276 is incident on the outward facing reflection surface 232 of the second object-side CR reflection boundary 230 where it is reflected as light 8a. The second object-side CR reflection boundary 230 is positioned relative to the second object-side color filter 278 with $\lambda_{LC8}$ such that light 8a reflected by the outward facing reflection surface 232 is incident on the second object-side color filter 278 where it is reflected as light 9a. The second object-side color filter 278 is positioned relative to the second image-side color filter 288 with $\lambda_{LC8}$ such that light 9a is reflected by the second object-side color filter 278 to the image-side 24 of the cloaking device assembly 20 where it is incident on the second image-side color filter 288 and reflected as light 10a.

On the image-side 24 of the cloaking device assembly 20, the second image-side color filter 288 is positioned relative to the second image-side CR reflection boundary 240 such that light 10a reflected by the second image-side color filter 288 is incident on the outward facing reflection surface 242 (FIG. 2A) where it is reflected as light 11a. The second image-side CR reflection boundary 240 is positioned relative to the second image-side color filter 286 with $\lambda_{LC7}$ such that light 11a reflected by the outward facing reflection surface 242 is incident on the second image-side color filter 286 where it is reflected as light 12a. The second image-side color filter 286 is positioned relative to the second image-side CR reflection boundary 240 such that light 12a reflected by the second image-side color filter 286 is incident on the outward facing reflection surface 242 where it is reflected as light 13a. The second image-side CR reflection boundary 240 is positioned relative to the second image-side color filter 284 with $\lambda_{LC6}$ such that light 13a reflected by the outward facing reflection surface 242 is incident on the second image-side color filter 284 where it is reflected as light 14a. The second image-side color filter 284 is positioned relative to the second image-side CR reflection boundary 240 such that light 14a reflected by the second image-side color filter 284 is incident on the outward facing reflection surface 242 where it is reflected as light 15a. The second image-side CR reflection boundary 240 is positioned relative to the second image-side color filter 282 with $\lambda_{LC5}$ such that light 15a reflected by the outward facing reflection surface 242 is incident on the second image-side color filter 282 where it is reflected as light 16a. The second image-side color filter 282 is positioned relative to the second image-side CR reflection boundary 240 such that light 16a reflected by the second image-side color filter 282 is incident on the outward facing reflection surface 242 where it is reflected as light 17a and forms a portion of the image I on the image-side 24 of the cloaking device assembly 10. It should be understood that the portion of the image I on the image-side 24 formed by light 17a on the second side (−X direction) of the reference optical axis 26 is formed from light with wavelengths longer than $\lambda_{LC5}$.

Accordingly, light from the object O may travel from the object-side 22 to the image-side 24 on the second side (−X direction) of the reference optical axis 26 via the first optical path A: object O—second object-side CR reflection boundary 230—second object-side color filter 272—second object-side CR reflection boundary 230—second object-side color filter 274—second object-side CR reflection boundary 230—second object-side color filter 276—second object-side CR reflection boundary 230—second object-side color filter 278—second image-side color filter 288—second image-side CR reflection boundary 240—second image-side color filter 286—second image-side CR reflection boundary 240—second image-side color filter 284—second image-side CR reflection boundary 240—second image-side color filter 282—second image-side CR reflection boundary 240—image I. That is, light from the object O may travel from the object-side 22 to the image-side 24 on the second side (−X direction) of the reference optical axis 26 via the first optical path A: object O—reflection from second object-side CR reflection boundary 230—reflection from second object-side color filter 272—reflection from second object-side CR reflection boundary 230 reflection from second object-side color filter 274—reflection from second object-side CR reflection boundary 230—reflection from second object-side color filter 276—reflection from second object-side CR reflection boundary 230—reflection from second object-side color filter 278—reflection from second image-side color filter 288—reflection from second image-side CR reflection boundary 240—reflection from second image-side color filter 286—reflection from second image-side CR reflection boundary 240—reflection from second image-side color filter 284—reflection from second image-side CR reflection boundary 240—reflection from second image-side color filter 282—reflection from second image-side CR reflection boundary 240—image I.

Regarding the second optical path B (FIG. 2B) on the second side (−X direction) of the reference optical axis 26, light from the object O positioned above (+Y direction) the cloaking device assembly 20 between the first optical path transition axis 27a' and the second optical path transition axis 27b' is incident on the second object-side color filter 272 (shown as arrow '1b' in FIG. 2B). As noted above, in embodiments where the color filters 272-278 and 282-288 are long-pass color filters, the long-pass color filters 272-278 and 282-288 are sequentially arranged from the reference optical axis 26 to the bisecting axis 25 in the cut-off wavelength order $\lambda_{SC5}$, $\lambda_{SC6}$, $\lambda_{SC7}$, $\lambda_{SC8}$, where $\lambda_{SC5} < \lambda_{SC6} < \lambda_{SC7} < \lambda_{SC8}$. Accordingly, wavelengths of light 1b shorter than $\lambda_{SC5}$ are reflected by the second object-side color filter 272 (not shown) and wavelengths of light 1b longer than $\lambda_{SC5}$ are transmitted through the second object-side color filter 272 as light 2b. The second object-side color filter 272 is positioned relative to the second object-side CR reflection boundary 230 such that light 2b transmitted through the second object-side color filter 272 is incident on the second object-side CR reflection boundary 230 where it is reflected by the outward facing reflection surface 232 (FIG. 2A) as light 3b. The second object-side CR reflection boundary 230 is positioned relative to the second object-side color filter 274 with $\lambda_{SC6}$ such that light 3b reflected by the outward facing reflection surface 232 is incident on the second object-side color filter 274. Wavelengths of light 3b shorter than the short cut-off wavelength $\lambda_{SC6}$ are reflected by the second object-side color filter 274 as light 4b and wavelengths of light 3b longer than the short cut-off wavelength $\lambda_{SC6}$ are transmitted through the second object-side color filter 274 (not shown). That is, light 4b reflected by the second object-side color filter 274 has wavelengths longer than $\lambda_{SC5}$ and shorter than $\lambda_{SC6}$. Also, light with wavelengths shorter than $\lambda_{SC6}$ will be reflected by the color filters 276, 278, 288, 286, and 284 since wavelengths shorter than $\lambda_{SC6}$ are shorter than $\lambda_{SC7}$ and $\lambda_{SC3}$. The second object-side color filter 274 is positioned relative to the object-side CR reflection boundary 230 such that light 4b reflected by the second object-side color filter 274 is incident on the object-side CR reflection boundary 230 where it is reflected as light 5b. The second object-side CR reflection boundary 230 is positioned relative to the second object-side color filter 276 with $\lambda_{SC7}$ such that light 5b reflected by the outward facing reflection surface 232 is incident on the second object-side color filter 276 where it is reflected as 6b. The second object-side color filter 276 is positioned relative to the object-side CR reflection boundary 230 such that light 6b reflected by the second object-side color filter 276 is incident on the object-side CR reflection boundary 230 where it is reflected as light 7b. The second object-side CR reflection boundary 230 is positioned relative to the second object-side color filter 278 with $\lambda_{SC8}$ such that light 7b reflected by the outward facing reflection surface 232 is incident on the second object-side color filter 278 where it is reflected as light 8b. The second object-side color filter 278 is positioned relative to the second image-side color filter 288 with $\lambda_{SC8}$ such that light 8b is reflected by the second object-side color filter 278 to the image-side 24 of the cloaking device assembly 20 where it is incident on the second image-side color filter 288 and reflected as light 9b.

On the image-side 24 of the cloaking device assembly 20, the second image-side color filter 288 is positioned relative to the image-side CR reflection boundary 240 such that light 9b reflected by the second image-side color filter 288 is incident on the outward facing reflection surface 242 (FIG. 2A) where it is reflected as light 10b. The second image-side CR reflection boundary 240 is positioned relative to the second image-side color filter 286 with $\lambda_{SC7}$ such that light 10b reflected by the outward facing reflection surface 242 is incident on the second image-side color filter 286 where it is reflected as light 11b. The second image-side color filter 286 is positioned relative to the second image-side CR reflection boundary 240 such that light 11b reflected by the second image-side color filter 286 is incident on the outward facing reflection surface 242 where it is reflected as light 12b. The second image-side CR reflection boundary 240 is positioned relative to the second image-side color filter 284 with $\lambda_{SC6}$ such that light 12b reflected by the outward facing reflection surface 242 is incident on the second image-side color filter 284 where it is reflected as light 13b. The second image-side color filter 284 is positioned relative to the second image-side CR reflection boundary 240 such that light 13b reflected by the second image-side color filter 284 is incident on the outward facing reflection surface 242 where it is reflected as light 14b. The second image-side CR reflection boundary 240 is positioned relative to the second image-side color filter 282 with $\lambda_{SC5}$ such that light 14b reflected by the outward facing reflection surface 242 is incident on the second image-side color filter 282. Light 14b has wavelengths of light longer than $\lambda_{SC5}$ and is transmitted through second image-side color filter 282 as light 15b and forms a portion of the image I on the image-side 24 of the cloaking device assembly 20. It should be understood that the portion of the image I on the image-side 24 formed by light 15b on the second side (−X direction) of the reference optical axis 26 is formed from light wavelengths between $\lambda_{SC5}$ and $\lambda_{SC6}$.

Still referring to the second optical path B on the second side (−X direction) of the reference optical axis 26, in embodiments where the color filters 272-278 and 282-288 are short-pass color filters, the short-pass color filters 272-278 and 282-288 are sequentially arranged from the reference optical axis 26 to the bisecting axis 25 in a cut-off wavelength order $\lambda_{LC5}$, $\lambda_{LC6}$, $\lambda_{LC7}$, $\lambda_{LC8}$, where $\lambda_{LC5} > \lambda_{LC6} > \lambda_{LC7} > \lambda_{LC8}$. Accordingly, wavelengths of light 1b shorter than $\lambda_{LC5}$ are transmitted through the second object-side color filter 272 as light 2b and wavelengths of light 1b longer than $\lambda_{LC5}$ are reflected by the second object-side color filter 272 (not shown). The second object-side color filter 272 is positioned relative to the second object-side CR reflection boundary 230 such that light 2b transmitted through the second object-side color filter 272 is incident on the second object-side CR reflection boundary 230 where it is reflected by the outward facing reflection surface 232 (FIG. 2A) as light 3b. The second object-side CR reflection boundary 230 is positioned relative to the second object-side color filter 274 with $\lambda_{LC6}$ such that light 3b reflected by the outward facing reflection surface 232 is incident on the second object-side color filter 274. Wavelengths of light 3b shorter than the long cut-off wavelength $\lambda_{LC6}$ are transmitted through the second object-side color filter 274 (not shown) and wavelengths of light 3b longer than the long cut-off wavelength $\lambda_{LC6}$ are reflected by the second object-side color filter 274 as light 4b. That is, light 4b reflected by the second object-side color filter 274 has wavelengths shorter than $\lambda_{LC5}$ and longer than $\lambda_{LC6}$. Also, light with wavelengths longer than $\lambda_{LC6}$ will be reflected by the color filters 276, 278, 288, 286, and 284 since wavelengths longer than $\lambda_{LC6}$ are longer than $\lambda_{LC7}$ and $\lambda_{LC8}$. The second object-side color filter 274 is positioned relative to the object-side CR reflection boundary 230 such that light 4b reflected by the second object-side color filter 274 is incident on the object-side CR reflection boundary 230 where it is reflected as light 5b. The second object-side CR reflection boundary 230 is positioned relative to the second object-side color filter 276 with $\lambda_{LC7}$ such that light 5b reflected by the outward facing reflection surface 232 is incident on the second object-side color filter 276 where it is reflected as light 6b. The second object-side color filter 276 is positioned relative to the object-side CR reflection boundary 230 such that light 6b reflected by the second object-side color filter 276 is incident on the object-side CR reflection boundary 230 where it is reflected as light 7b. The second object-side CR reflection boundary 230 is positioned relative to the second object-side color filter 278 with $\lambda_{LC8}$ such that light 7b reflected by the outward facing reflection surface 232 is incident on the second object-side color filter 278 where it is reflected as 8b. The second object-side color filter 278 is positioned relative to the second image-side color filter 288 with $\lambda_{LC8}$ such that light 8b is reflected by the second object-side color filter 278 to the image-side 24 of the cloaking device assembly 20 where it is incident on the second image-side color filter 288 and reflected as light 9b.

On the image-side 24 of the cloaking device assembly 20, the second image-side color filter 288 is positioned relative to the image-side CR reflection boundary 240 such that light 9b reflected by the second image-side color filter 288 is incident on the outward facing reflection surface 242 (FIG. 2A) where it is reflected as light 10b. The second image-side CR reflection boundary 240 is positioned relative to the second image-side color filter 286 with $\lambda_{LC7}$ such that light 10b reflected by the outward facing reflection surface 242 is incident on the second image-side color filter 286 where it is reflected as light 11b. The second image-side color filter 286 is positioned relative to the second image-side CR reflection boundary 240 such that light 11b reflected by the second image-side color filter 286 is incident on the outward facing reflection surface 242 where it is reflected as light 12b. The second image-side CR reflection boundary 240 is positioned relative to the second image-side color filter 284 with $\lambda_{LC6}$ such that light 12b reflected by the outward facing reflection surface 242 is incident on the second image-side color filter 284 where it is reflected as light 13b. The second image-side color filter 284 is positioned relative to the second image-side CR reflection boundary 240 such that light 13b reflected by the second image-side color filter 284 is incident on the outward facing reflection surface 242 where it is reflected as light 14b. The second image-side CR reflection boundary 240 is positioned relative to the second image-side color filter 282 with $\lambda_{LC5}$ such that light 14b reflected by the outward facing reflection surface 242 is incident on the second image-side color filter 282. Light 14b has wavelengths of light shorter than $\lambda_{LC5}$ and is transmitted through second image-side color filter 282 as light 15b and forms a portion of the image I on the image-side 24 of the cloaking device assembly 20. It should be understood that the portion of the image I on the image-side 24 formed by light 15b on the second side (–X direction) of the reference optical axis 26 is formed from light with wavelengths between $\lambda_{LC5}$ and $\lambda_{LC6}$.

Accordingly, light from the object O may travel from the object-side 22 to the image-side 24 on the second side (–X direction) of the reference optical axis 26 via the second optical path B: object O—second object-side color filter 272—second object-side CR reflection boundary 230—second object-side color filter 274—second object-side CR reflection boundary 230—second object-side color filter 276—second object-side CR reflection boundary 230—second object-side color filter 278—second image-side color filter 288—second image-side CR reflection boundary 240—second image-side color filter 286—second image-side CR reflection boundary 240—second image-side color filter 284—second image-side CR reflection boundary 240—second image-side color filter 282—image I. That is, light from the object O may travel from the object-side 22 to the image-side 24 on the second side (–X direction) of the reference optical axis 26 via the second optical path A: object O—transmittance through second object-side color filter 272—reflection from second object-side CR reflection boundary 230 reflection from second object-side color filter 274—reflection from second object-side CR reflection boundary 230—reflection from second object-side color filter 276—reflection from second object-side CR reflection boundary 230—reflection from second object-side color filter 278—reflection from second image-side color filter 288—reflection from second image-side CR reflection boundary 240—reflection from second image-side color filter 286—reflection from second image-side CR reflection boundary 240—reflection from second image-side color filter 284—reflection from second image-side CR reflection boundary 240—transmittance through second image-side color filter 282—image I.

Regarding the third optical path C (FIG. 2C) on the second side (–X direction) of the reference optical axis 26, light from the object O positioned above (+Y direction) the cloaking device assembly 20 between the second optical path transition axis 27b' and the third optical path transition axis 27c' is incident on the second object-side color filter 274 (shown as arrow '1c' in FIG. 2C). As noted above, in embodiments where the color filters 272-278 and 282-288 are long-pass color filters, the long-pass color filters 272-278 and 282-288 are sequentially arranged from the reference optical axis 26 to the bisecting axis 25 in the cut-off wavelength order $\lambda_{SC5}$, $\lambda_{SC6}$, $\lambda_{SC7}$, $\lambda_{SC8}$, where $\lambda_{SC5}<\lambda_{SC6}<\lambda_{SC7}<\lambda_{SC8}$. Accordingly, wavelengths of light 1c longer than $\lambda_{SC6}$ are transmitted through the second object-side color filter 274 as light 2c and wavelengths of light 1c shorter than $\lambda_{SC6}$ are reflected by the second object-side color filter 274 (not shown). The second object-side color filter 274 is positioned relative to the second object-side CR reflection boundary 230 such that light 2c transmitted through the second object-side color filter 274 is incident on the second object-side CR reflection boundary 230 where it is reflected by the outward facing reflection surface 232 (FIG. 2A) as light 3c. The second object-side CR reflection boundary 230 is positioned relative to the second object-side color filter 276 with $\lambda_{SC7}$ such that light 3c reflected by the outward facing reflection surface 232 is incident on the second object-side color filter 276. Wavelengths of light 3c shorter than the short cut-off wavelength $\lambda_{SC7}$ are reflected by the second object-side color filter 276 as light 4c and wavelengths of light 3c longer than the short cut-off wavelength $\lambda_{SC7}$ are transmitted through the second object-side color filter 276 (not shown). That is, light 4c reflected by the second object-side color filter 276 has wavelengths longer than $\lambda_{SC6}$ and shorter than $\lambda_{SC7}$. Also, light with wavelengths shorter than $\lambda_{SC7}$ will be reflected by the color filters 278, 288, and 286 since wavelengths shorter than $\lambda_{SC7}$ are shorter than $\lambda_{SC8}$. The second object-side color filter 276 is positioned relative to the object-side CR reflection boundary 230 such that light 4c reflected by the second object-side color filter 276 is incident on the object-side CR reflection boundary 230 where it is reflected as light 5c. The second object-side CR reflection boundary 230 is positioned relative to the second object-side color filter 278 with $\lambda_{SC8}$ such that light 5c reflected by the outward facing reflection surface 232 is incident on the second object-side color filter 278 where it is reflected as 6c. The second object-side color filter 278 is positioned relative to the second image-side color filter 288 with $\lambda_{SC8}$ such that light 6c is reflected by the second object-side color filter 278 to the image-side 24 of the cloaking device assembly 20 where it is incident on the second image-side color filter 288 and reflected as light 7c.

On the image-side 24 of the cloaking device assembly 20, the second image-side color filter 288 is positioned relative to the image-side CR reflection boundary 240 such that light 7c reflected by the second image-side color filter 288 is incident on the outward facing reflection surface 242 (FIG. 2A) where it is reflected as light 8c. The second image-side CR reflection boundary 240 is positioned relative to the second image-side color filter 286 with $\lambda_{SC7}$ such that light 8c reflected by the outward facing reflection surface 242 is incident on the second image-side color filter 286 where it is reflected as light 9c. The second image-side color filter 286 is positioned relative to the second image-side CR reflection boundary 240 such that light 9c reflected by the second image-side color filter 286 is incident on the outward facing reflection surface 242 where it is reflected as light 10c. The second image-side CR reflection boundary 240 is positioned relative to the second image-side color filter 284 with $\lambda_{SC6}$ such that light 10c reflected by the outward facing reflection surface 242 is incident on the second image-side color filter 284. Light 10c has wavelengths of light longer than $\lambda_{SC6}$ and is transmitted through second image-side color filter 284 as light 11c and forms a portion of the image I on the image-side 24 of the cloaking device assembly 20. It should be understood that the portion of the image I on the image-side 24 formed by light 11c on the second side (−X direction) of the reference optical axis 26 is formed from light with wavelengths between $\lambda_{SC6}$ and $\lambda_{SC7}$.

Still referring to the third optical path C on the second side (−X direction) of the reference optical axis 26, in embodiments where the color filters 272-278 and 282-288 are short-pass color filters, the short-pass color filters 272-278 and 282-288 are sequentially arranged from the reference optical axis 26 to the bisecting axis 25 in the cut-off wavelength order $\lambda_{LC5}$, $\lambda_{LC6}$, $\lambda_{LC7}$, $\lambda_{LC8}$, where $\lambda_{LC5} > \lambda_{LC6} > \lambda_{LC7} < \lambda_{LC8}$. Accordingly, wavelengths of light 1c shorter than $\lambda_{LC6}$ are transmitted through the second object-side color filter 274 as light 2c and wavelengths of light 1c longer than $\lambda_{LC6}$ are reflected by the second object-side color filter 274 (not shown). The second object-side color filter 274 is positioned relative to the second object-side CR reflection boundary 230 such that light 2c transmitted through the second object-side color filter 274 is incident on the second object-side CR reflection boundary 230 where it is reflected by the outward facing reflection surface 232 (FIG. 2A) as light 3c. The second object-side CR reflection boundary 230 is positioned relative to the second object-side color filter 276 with $\lambda_{LC7}$ such that light 3c reflected by the outward facing reflection surface 232 is incident on the second object-side color filter 276. Wavelengths of light 3c longer than the long cut-off wavelength $\lambda_{LC7}$ are reflected by the second object-side color filter 276 as light 4c and wavelengths of light 3c shorter than long cut-off wavelength $\lambda_{LC7}$ are transmitted through the second object-side color filter 276 (not shown). That is, light 4c reflected by the second object-side color filter 276 has wavelengths longer than $\lambda_{LC6}$ and shorter than $\lambda_{LC7}$. Also, light with wavelengths longer than $\lambda_{LC7}$ will be reflected by the color filters 278, 288, and 286 since wavelengths longer than $\lambda_{LC7}$ are longer than $\lambda_{LC8}$. The second object-side color filter 276 is positioned relative to the object-side CR reflection boundary 230 such that light 4c reflected by the second object-side color filter 276 is incident on the object-side CR reflection boundary 230 where it is reflected as light 5c. The second object-side CR reflection boundary 230 is positioned relative to the second object-side color filter 278 with $\lambda_{LC8}$ such that light 5c reflected by the outward facing reflection surface 232 is incident on the second object-side color filter 278 where it is reflected as light 6c. The second object-side color filter 278 is positioned relative to the second image-side color filter 288 with $\lambda_{LC8}$ such that light 6c is reflected by the second object-side color filter 278 to the image-side 24 of the cloaking device assembly 20 where it is incident on the second image-side color filter 288 and reflected as light 7c.

On the image-side 24 of the cloaking device assembly 20, the second image-side color filter 288 is positioned relative to the image-side CR reflection boundary 240 such that light 7c reflected by the second image-side color filter 288 is incident on the outward facing reflection surface 242 (FIG. 2A) where it is reflected as light 8c. The second image-side CR reflection boundary 240 is positioned relative to the second image-side color filter 286 with $\lambda_{LC7}$ such that light 8c reflected by the outward facing reflection surface 242 is incident on the second image-side color filter 286 where it is reflected as light 9c. The second image-side color filter 286 is positioned relative to the second image-side CR reflection boundary 240 such that light 9c reflected by the second image-side color filter 286 is incident on the outward facing reflection surface 242 where it is reflected as light 10c. The second image-side CR reflection boundary 240 is positioned relative to the second image-side color filter 284 with $\lambda_{LC6}$ such that light 10c reflected by the outward facing reflection surface 242 is incident on the second image-side color filter 284. Light 10c has wavelengths of light longer than $\lambda_{LC6}$ and is transmitted through second image-side color filter 284 as light 11c and forms a portion of the image I on the image-side 24 of the cloaking device assembly 20. It should be understood that the portion of the image I on the image-side 24 formed by light 11c on the second side (−X direction) of the reference optical axis 26 is formed from light with wavelengths between $\lambda_{LC6}$ and $\lambda_{LC7}$.

Accordingly, light from the object O may travel from the object-side 22 to the image-side 24 on the second side (−X direction) of the reference optical axis 26 via the third optical path C: object O—second object-side color filter 274—second object-side CR reflection boundary 230—second object-side color filter 276—second object-side CR reflection boundary 230—second object-side color filter 278—second image-side color filter 288—second image-side CR reflection boundary 240—second image-side color filter 286—second image-side CR reflection boundary 240—second image-side color filter 284—image I. That is, light from the object O may travel from the object-side 22 to the image-side 24 on the second side (−X direction) of the reference optical axis 26 via the second optical path C: object O—transmittance through second object-side color filter 274—reflection from second object-side CR reflection boundary 230—reflection from second object-side color filter 276—reflection from second object-side CR reflection boundary 230—reflection from second object-side color filter 278—reflection from second image-side color filter 288—reflection from second image-side CR reflection boundary 240—reflection from second image-side color filter 286—reflection from second image-side CR reflection boundary 240—transmittance through second image-side color filter 284—image I.

Regarding the fourth optical path D (FIG. 2C) on the second side (−X direction) of the reference optical axis 26, light from the object O positioned above (+Y direction) the cloaking device assembly 20 between the third optical path transition axis 27c' and the fourth optical path transition axis 27d' is incident on the second object-side color filter 276 (shown as arrow '1d' in FIG. 2C). As noted above, in embodiments where the color filters 272-278 and 282-288 are long-pass color filters, the long-pass color filters 272-278 and 282-288 are sequentially arranged from the reference optical axis 26 to the bisecting axis 25 in the cut-off wavelength order $\lambda_{SC5}$, $\lambda_{SC6}$, $\lambda_{SC7}$, $\lambda_{SC8}$, where $\lambda_{SC5} < \lambda_{SC6} < \lambda_{SC7} < \lambda_{SC8}$. Accordingly, wavelengths of light 1*d* shorter than $\lambda_{SC7}$ are reflected by the second object-side color filter 276 (not shown) and wavelengths of light 1*d* longer than $\lambda_{SC7}$ are transmitted through the second object-side color filter 276 as light 2*d*. The second object-side color filter 276 is positioned relative to the second object-side CR reflection boundary 230 such that light 2*d* transmitted through the second object-side color filter 276 is incident on the second object-side CR reflection boundary 230 where it is reflected by the outward facing reflection surface 232 (FIG. 2A) as light 3*d*. The second object-side CR reflection boundary 230 is positioned relative to the second object-side color filter 278 with $\lambda_{SC8}$ such that light 3*d* reflected by the outward facing reflection surface 232 is incident on the second object-side color filter 278. Wavelengths of light 3*d* shorter than the short cut-off wavelength $\lambda_{SC8}$ are reflected by the second object-side color filter 278 as light 4*d* and wavelengths of light 3*d* longer than the short cut-off wavelength $\lambda_{SC8}$ are transmitted through the second object-side color filter 278 (not shown). That is, light 4*d* reflected by the second object-side color filter 278 has wavelengths longer than $\lambda_{SC7}$ and shorter than $\lambda_{SC8}$. The second object-side color filter 278 is positioned relative to the second image-side color filter 288 with $\lambda_{SC8}$ such that light 4*d* reflected by the second object-side color filter 278 is incident on the second image-side color filter 288 where it is reflected as light 5*d*. The second image-side color filter 288 is positioned relative to the image-side CR reflection boundary 240 such that light 5*d* reflected by the second image-side color filter 288 is incident on the outward facing reflection surface 242 (FIG. 2A) where it is reflected as light 6*d*. The second image-side CR reflection boundary 240 is positioned relative to the second image-side color filter 286 with $\lambda_{SC7}$ such that light 6*d* reflected by the outward facing reflection surface 242 is incident on the second image-side color filter 286. Light 6*d* has wavelengths longer than $\lambda_{SC7}$ and is transmitted through the second image-side color filter 286 as light 7*d* and forms a portion of the image I on the image-side 24 of the cloaking device assembly 20. It should be understood that the portion of the image I on the image-side 24 formed by light 7*d* on the second side (−X direction) of the reference optical axis 26 is formed from light with wavelengths between $\lambda_{SC7}$ and $\lambda_{SC8}$.

Still referring to the fourth optical path D on the second side (−X direction) of the reference optical axis 26, in embodiments where the color filters 272-278 and 282-288 are short-pass color filters, the short-pass color filters 272-278 and 282-288 are sequentially arranged from the reference optical axis 26 to the bisecting axis 25 in the cut-off wavelength order $\lambda_{LC5}$, $\lambda_{LC6}$, $\lambda_{LC7}$, $\lambda_{LC8}$, where $\lambda_{LC5} > \lambda_{LC6} > \lambda_{LC7} > \lambda_{LC8}$. Accordingly, wavelengths of light 1*d* shorter than $\lambda_{LC7}$ are transmitted through the second object-side color filter 276 as light 2*d* and wavelengths of light 1*d* longer than $\lambda_{LC7}$ are reflected by the second object-side color filter 276 (not shown). The second object-side color filter 276 is positioned relative to the second object-side CR reflection boundary 230 such that light 2*d* transmitted through the second object-side color filter 276 is incident on the second object-side CR reflection boundary 230 where it is reflected by the outward facing reflection surface 232 (FIG. 2A) as light 3*d*. The second object-side CR reflection boundary 230 is positioned relative to the second object-side color filter 278 with $\lambda_{LC8}$ such that light 3*d* reflected by the outward facing reflection surface 232 is incident on the second object-side color filter 278. Wavelengths of light 3*d* longer than the long cut-off wavelength $\lambda_{LC8}$ are reflected by the second object-side color filter 278 as light 4*d* and wavelengths of light 3*d* shorter than long cut-off wavelength $\lambda_{LC8}$ are transmitted through the second object-side color filter 278 (not shown). That is, light 4*d* reflected by the second object-side color filter 278 has wavelengths longer than $\lambda_{LC7}$ and shorter than $\lambda_{LC8}$. The second object-side color filter 278 is positioned relative to the second image-side color filter 288 with $\lambda_{LC8}$ such that light 4*d* reflected by the second object-side color filter 278 is incident on the second image-side color filter 288 where it is reflected as light 5*d*. The second image-side color filter 288 is positioned relative to the image-side CR reflection boundary 240 such that light 5*d* reflected by the second image-side color filter 288 is incident on the outward facing reflection surface 242 (FIG. 2A) where it is reflected as light 6*d*. The second image-side CR reflection boundary 240 is positioned relative to the second image-side color filter 286 with $\lambda_{LC7}$ such that light 6*d* reflected by the outward facing reflection surface 242 is incident on the second image-side color filter 286. Light 6*d* has wavelengths longer than $\lambda_{LC7}$ and is transmitted through the second image-side color filter 284 as light 7*d* and forms a portion of the image I on the image-side 24 of the cloaking device assembly 20. It should be understood that the portion of the image I on the image-side 24 formed by light 7*d* on the second side (−X direction) of the reference optical axis 26 is formed with electromagnetic radiation with wavelengths between $\lambda_{LC7}$ and $\lambda_{LC8}$.

Accordingly, light from the object O may travel from the object-side 22 to the image-side 24 on the second side (−X direction) of the reference optical axis 26 via the fourth optical path D: object O—second object-side color filter 276—second object-side CR reflection boundary 230—second object-side color filter 278—second image-side color filter 288—second image-side CR reflection boundary 240—second image-side color filter 286—image I. That is, light from the object O may travel from the object-side 22 to the image-side 24 on the second side (−X direction) of the reference optical axis 26 via the fourth optical path D: object O transmittance through second object-side color filter 276—reflection from second object-side CR reflection boundary 230—reflection from second object-side color filter 278—reflection from second image-side color filter 288—reflection from second image-side CR reflection boundary 240—transmittance through second image-side color filter 286—image I.

Regarding the fifth optical path E (FIG. 2C) on the second side (−X direction) of the reference optical axis 26, light from the object O positioned above (+Y direction) the cloaking device assembly 20 between the fourth optical path transition axis 27*d*' and the fifth optical path transition axis 27*e*' is incident on the second object-side color filter 278 (shown as arrow '1*e*' in FIG. 2C). In embodiments where the color filters 272-278 and 282-288 are long-pass color filters, the second object-side color filter 278 has the short cut-off wavelength $\lambda_{SC8}$ and wavelengths of light 1*e* shorter than $\lambda_{SC8}$ are reflected by the second object-side color filter 278 (not shown) and wavelengths of light 1*e* longer than $\lambda_{SC8}$ are transmitted through the second object-side color filter 278 as light 2*e*. The second object-side color filter 278 is positioned relative to the second image-side color filter 288 with $\lambda_{SC8}$ such that light 2*e* transmitted through the second object-side color filter 278 is incident on the second image-side color filter 288. Light 2*e* has wavelengths longer than $\lambda_{SC8}$ and is transmitted through second image-side color filter 288 as light 3*e* and forms a portion of the image I on the image-side 24 of the cloaking device assembly 20. It should be understood that the portion of the image I on the image-side 24 formed by light 3e on the second side (−X direction) of the reference optical axis 26 is formed with electromagnetic radiation with wavelengths longer than $\lambda_{SC8}$.

Still referring to the fifth optical path E on the second side (−X direction) of the reference optical axis 26 (FIG. 2C), in embodiments where the color filters 272-278 and 282-288 are short-pass color filters the second object-side color filter 278 has the long cut-off wavelength $\lambda_{LC8}$ and wavelengths of light 1e longer than $\lambda_{LC8}$ are reflected by the second object-side color filter 278 (not shown) and wavelengths of light 1e shorter than $\lambda_{LC8}$ are transmitted through the second object-side color filter 278 as light 2e. The second object-side color filter 278 is positioned relative to the second image-side color filter 288 with $\lambda_{LC8}$ such that light 2e transmitted through the second object-side color filter 278 is incident on the second image-side color filter 288. Light 2e has wavelengths longer than $\lambda_{LC8}$ and is transmitted through second image-side color filter 288 as light 3e and forms a portion of the image I on the image-side 24 of the cloaking device assembly 20. It should be understood that the portion of the image I on the image-side 24 formed by light 3e on the second side (−X direction) of the reference optical axis 26 is formed from light with wavelengths shorter than $\lambda_{LC8}$.

Accordingly, light from the object O may travel from the object-side 22 to the image-side 24 on the second side (−X direction) of the reference optical axis 26 via the fifth optical path E: object O—second object-side color filter 278—second image-side color filter 286—image I. That is, light from the object O may travel from the object-side 22 to the image-side 24 on the second side (−X direction) of the reference optical axis 26 via the fifth optical path E: object O—transmittance through second object-side color filter 278—transmittance through second image-side color filter 288—image I.

Still referring to FIGS. 2A-2C, embodiments of a cloaking device assembly with four color filters positioned on the first object-side of the cloaking device and four color filters positioned on the first image-side of the cloaking device are depicted. However, in other embodiments, the color filters 258, 268 and/or 278, 288 may be replaced with polarizers (e.g., polarizers 258, 268 and/or 278, 288). In such an embodiments, light 8a (optical path A), light 7b (optical path B), light 5c (optical path C) and light 3d (optical path D) are reflected by the polarizers 258, 278 as polarized light 9a, 8b, 6c, and 4d, respectively, and light 1e is transmitted through polarizers 258, 268, 278, 288 as polarized light 3c, thereby forming the image I from polarized light 17a, 15b, 11c, 7d, 3e. It should be understood that the image I formed from polarized light 17a, 15b, 11c, 7d, 3e will have a light intensity of 50% compared to the image formed from unpolarized light 17a, 15b, 11c, 7d, 3e.

Figure 3:
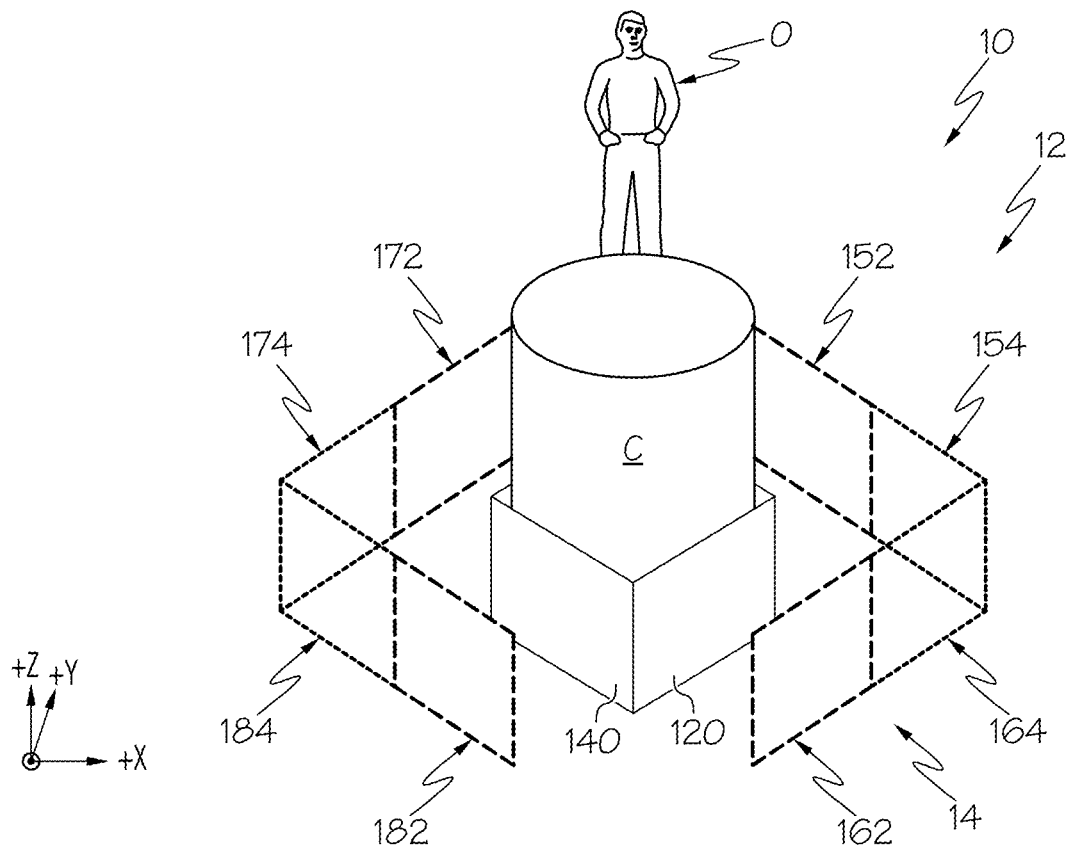
FIG. 3 schematically depicts a top perspective view of the cloaking device assemblies of FIG. 1A with a first object on one side of the cloaking device assemblies and a second object within the cloaked regions of the cloaking device assemblies.
Figure 4:
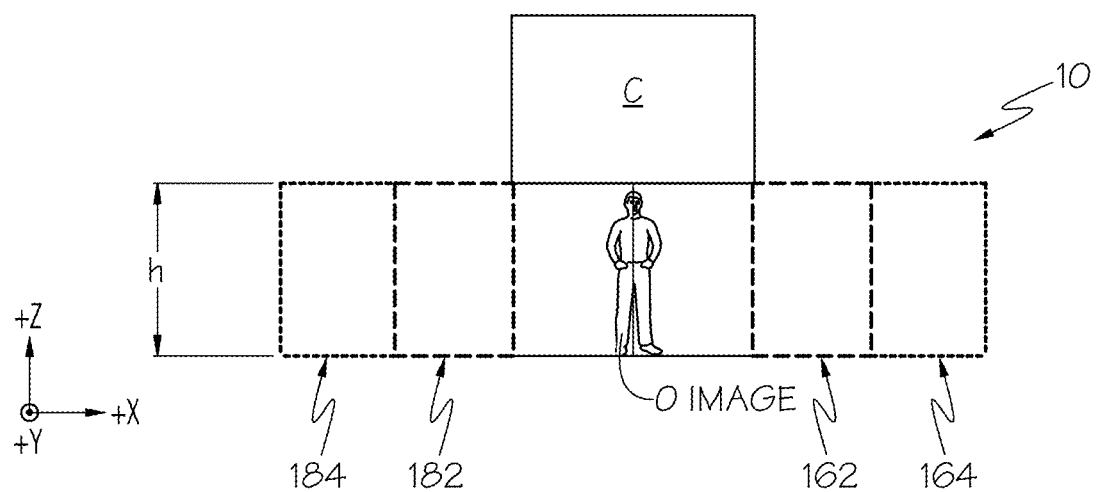
FIG. 4 schematically depicts a side view of the cloaking device assembly of FIG. 3 with the first object on one side of the cloaking device assembly and the second object within the cloaked region of the cloaking device assembly.

Referring now to FIGS. 1A, 3 and 4, a top perspective view and a side view of the cloaking device assembly 10 according to embodiments described herein is shown in FIGS. 3 and 4. Particularly, FIG. 3 is a top perspective view of an article in the form of a column 'C' within the cloaked region CR of the cloaking device assembly 10 (FIG. 1A) and an object 'O' (e.g., a person) located behind the column C on the object-side 12 of the cloaking device assembly 10 in the +Y direction. The column C has a height dimension in the Z direction (increasing height in the +Z direction) greater than the height h of the cloaking device (FIG. 4). FIG. 4 is a side view from the +Y direction of the cloaking device assembly 10 shown in FIG. 3 and shows the portion of the column C that is within the cloaked region CR is not visible and the object O located behind the column C in the +Y direction is visible to an observer viewing the cloaking device assembly 10 in the +Y direction. Accordingly, the column C positioned within the cloaked region CR is not visible to an observer viewing the image-side 14 of the cloaking device assembly 10 and an image of the object O is visible to the observer viewing the image-side 14. Although column C in FIG. 3 is separate from the inward facing surfaces 114, 124, 134, 144, i.e., column C is a separate object from the cloaking device assembly 10, it should be understood that column C may be structurally part of the cloaking device assembly 10 and have an outer surface that provides or is equivalent to the inward facing surfaces 114, 124, 134, 144. It should also be understood that an image provide on the image-side 14 will have three different colors. That is, and assuming the cut-off wavelengths for the second side color filters 172, 174, 182, 184 are equal to the cut-off wavelengths for the first side color filters 152, 154, 162, 164, respectively, an observer viewing the image-side 14 in the +Y direction will see the image with a first color where color filters 164, 184 are positioned, a second color where color filters 162, 182 are positioned, and a third color where CR reflection boundaries 120, 140 are positioned.

Figure 5:
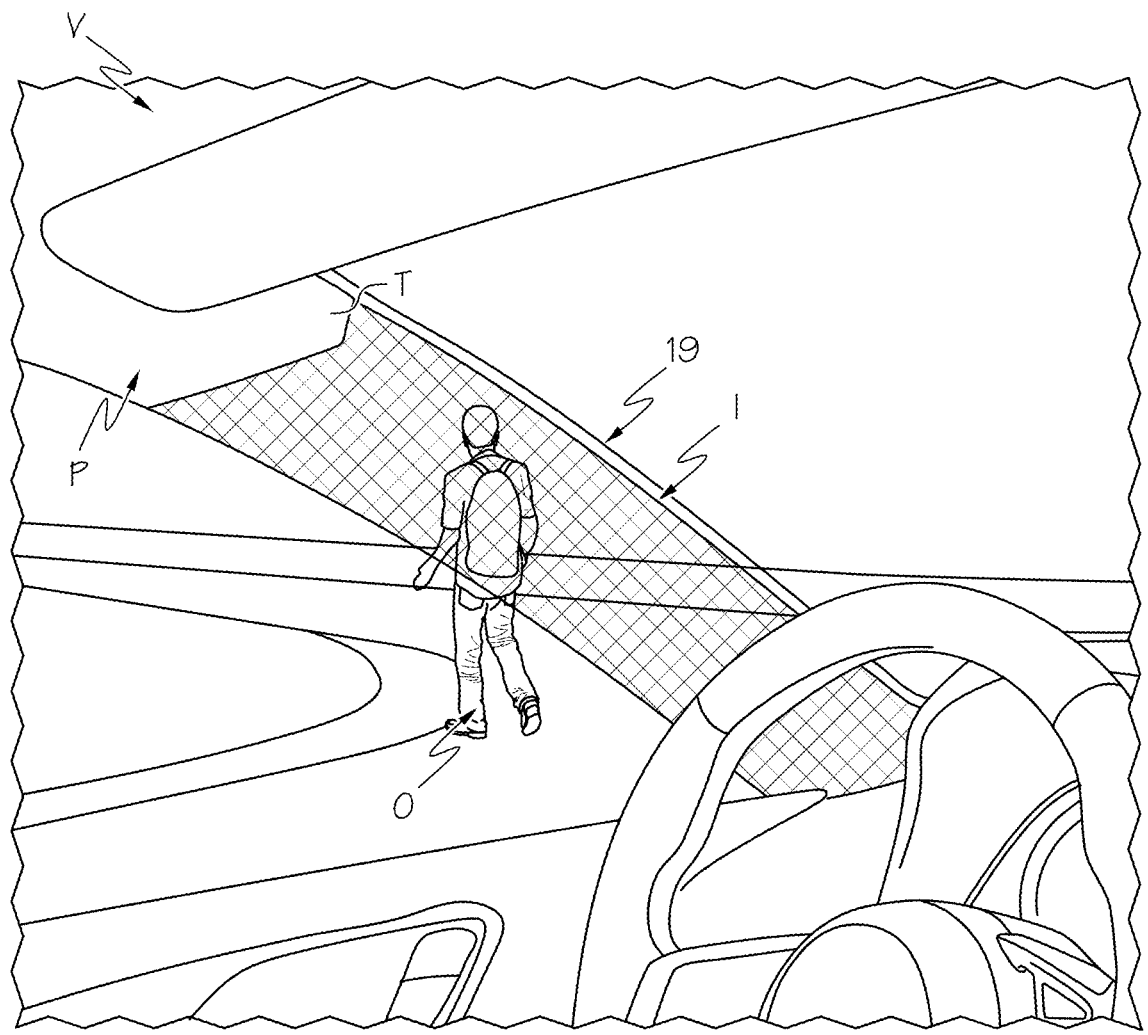
FIG. 5 schematically depicts a side view of a cloaking device assembly cloaking an A-pillar of a vehicle according to one or more embodiments described and illustrated herein.

Referring to FIG. 5, embodiments of an A-pillar of a vehicle being cloaked by a cloaking device are shown. Particularly, FIG. 5 shows a cloaking device 19 cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V is a target object O in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O on an image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. It should be appreciated that cloaking of the A-pillar P with the cloaking device 19 and removing the blind spot produced by the A-pillar P is performed without the use of metamaterials, video images, cameras, sophisticated electronics, etc.

Examples

Figure 6A:
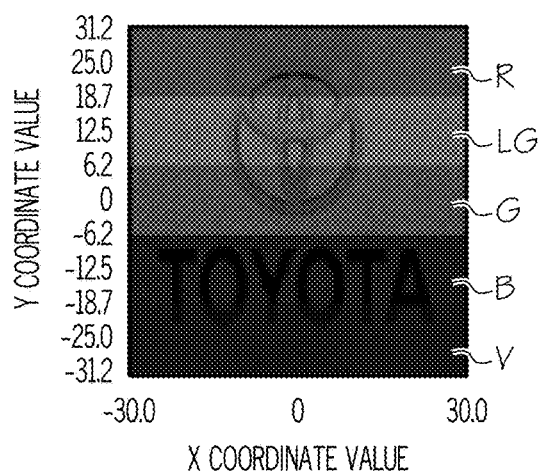
FIG. 6A depicts a computer simulated cloaking image for a cloaking device assembly according to FIG. 2A with a 0° misalignment between a reference optical axis and a viewing angle of the cloaking device assembly.
Figure 6B:
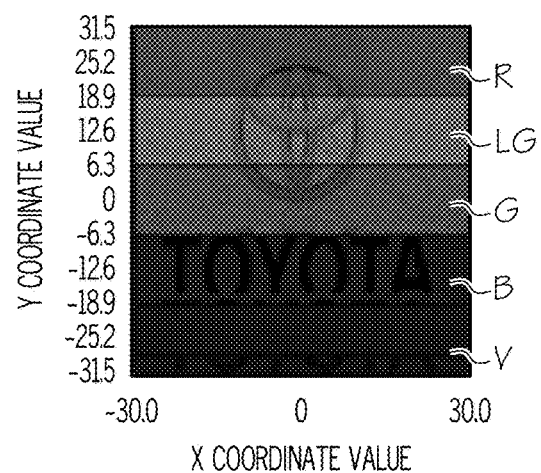
FIG. 6B depicts a computer simulated cloaking image for a cloaking device assembly according to FIG. 2A with a 1° misalignment between a reference optical axis and a viewing angle of the cloaking device assembly.
Figure 6C:
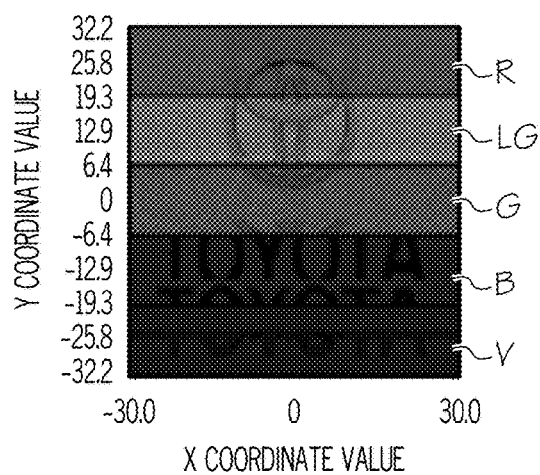
FIG. 6C depicts a computer simulated cloaking image for a cloaking device assembly according to FIG. 2A with a 2° misalignment between a reference optical axis and a viewing angle of the cloaking device assembly.
Figure 6D:
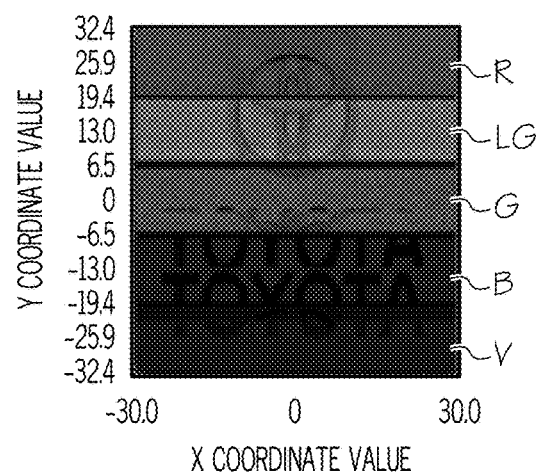
FIG. 6D depicts a computer simulated cloaking image for a cloaking device assembly according to FIG. 2A with a 3° misalignment between a reference optical axis and a viewing angle of the cloaking device assembly.
Figure 6E:
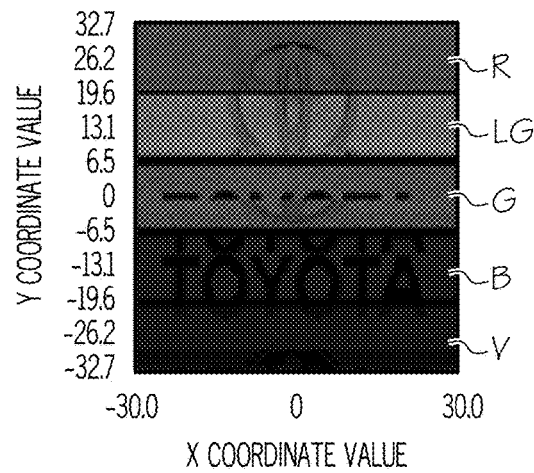
FIG. 6E depicts a computer simulated cloaking image for a cloaking device assembly according to FIG. 2A with a 4° misalignment between a reference optical axis and a viewing angle of the cloaking device assembly.

Referring now to FIGS. 6A-6E, images of an object in the form of an emblem positioned on the object-side 22 of the cloaking device assembly 20 and as viewed from the image-side 24 simulated using a commercial software program (Zemax OpticStudio) are depicted. The cloaking device assembly 20 with the two CR reflection boundaries 210, 220, four color filters 252-258, and four color filters 262-268 were provided in the form of two planar mirrors and eight color filters. The color filters 252, 262 were Edmund #69898 long-pass color filters with a short cut-off wavelength equal to 450 nm ($\lambda_{SC1}$=450 nm). The color filters 254, 264 were Edmund #69899 long-pass color filters with a short cut-off wavelength equal to 500 nm ($\lambda_{SC2}$=500 nm). The color filters 256, 266 were Thorlabs DMLP550R long-pass color filters with a short cut-off wavelength equal to 550 nm ($\lambda_{SC3}$=550 nm). The color filters 258, 268 were Thorlabs DMLP605R long-pass color filters with a short cut-off wavelength equal to 605 nm ($\lambda_{SC4}$=605 nm). The cloaking device assembly 20 had a cloaking ratio of about 66.7%. FIG. 6A depicts an image of the object with no misalignment (0°) between the reference optical axis 26 and a viewing angle of the cloaking device assembly 20. That is, as used herein, the term misalignment refers to an angle defined by the reference optical axis of a cloaking device assembly and a line of sight of an observer viewing the cloaking device assembly from the image-side as depicted by the +Y direction in the figures (also referred to herein as a "viewing angle"). FIG. 6B depicts an image of the object with a 1° misalignment between the reference optical axis 26 and a viewing angle of the cloaking device assembly 20. FIG. 6C depicts an image of the object with a 2° misalignment between the reference optical axis 26 and a viewing angle of the cloaking device assembly 20. FIG. 6D depicts an image of the object with a 3° misalignment between the reference optical axis 26 and a viewing angle of the cloaking device assembly 20. FIG. 6E depicts an image of the object with a 4° misalignment between the reference optical axis 26 and a viewing angle of the cloaking device assembly 20. As shown by the images in FIGS. 6A-6E, an image of the object on the object-side 22 of the cloaking device assembly 20 can be seen clearly with up to 4° of misalignment. Accordingly, an observer can view or "see" the object O through the cloaked region CR even if the observer is not looking directly along the reference optical axis 26 of the cloaking device assembly 20. Also, optical path A depicted in FIG. 2B provides a portion of the image with wavelengths of light shorter than 450 nm (i.e., a violet color 'V'), optical path B provides a portion of the image with wavelengths between 450 nm and 500 nm (i.e., a blue color 'B'), optical path C depicted in FIG. 2C provides a portion of the image with wavelengths of light between 500 nm and 550 nm (i.e., a green color 'G'), optical path D provides a portion of the image with wavelengths of light between 550 nm and 605 nm (i.e., a light green color 'LG'), and optical path E provides a portion of the image with wavelengths of light longer than 605 nm (i.e., a red color 'R').

The cloaking devices described herein may be used to cloak vehicle articles such as a vehicle A-pillar, B-pillar, C-pillar, D-pillar, etc., and remove a blind spot caused by the vehicle article. Also, the cloaking devices described herein may be used to cloak articles such as extension cords, electrical conduit, piping, etc., in home, office and industrial environments. The terms "object," "article," and "item" may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
    an object-side, an image-side, a reference optical axis extending from the object-side to the image-side, a bisecting axis extending between the object-side and the image-side, and a cloaked region (CR) between the object-side and the image-side;
    an object-side CR reflection boundary and a plurality of object-side color filters spaced apart from and positioned generally parallel to the object-side CR reflection boundary; and
    an image-side CR reflection boundary and a plurality of image-side color filters spaced apart from and positioned generally parallel to the image-side CR reflection boundary;
    wherein light from an object located on the object-side of the cloaking device and obscured by the CR propagates via at least two optical paths to form an image of the object on the image-side of the cloaking device such that the light from the object appears to pass through the CR.

2. The cloaking device of claim 1, wherein:
    each of the plurality of object-side color filters and each of the plurality of image-side color filters comprise a cut-off wavelength; and
    the plurality of object-side color filters and the plurality of image-side color filters are sequentially arranged in a cut-off wavelength order between the reference optical axis and the bisecting axis.

3. The cloaking device of claim 1, wherein the plurality of object-side color filters comprise a plurality object-side long-pass color filters and the plurality of image-side color filters comprise a plurality of image-side long-pass color filters.

4. The cloaking device of claim 1, wherein:
    the plurality of object-side color filters comprise a plurality of object-side long-pass color filters sequentially arranged in a cut-off wavelength order between the reference optical axis and the bisecting axis with increasing short cut-off wavelengths from the reference optical axis to the bisecting axis; and
    the plurality of image-side color filters comprise a plurality of image-side long-pass color filters sequentially arranged in a cut-off wavelength order between the reference optical axis and the bisecting axis with increasing short cut-off wavelengths from the reference optical axis to the bisecting axis.

5. The cloaking device of claim 1, wherein the plurality of object-side color filters comprise a plurality of object-side short-pass color filters and the plurality of image-side color filters comprise a plurality of image-side long-pass color filters.

6. The cloaking device of claim 1, wherein:
    the plurality of object-side color filters comprise a plurality of object-side short-pass color filters sequentially arranged in a cut-off wavelength order between the reference optical axis and the bisecting axis with decreasing long cut-off wavelengths from the reference optical axis to the bisecting axis; and
    the plurality of image-side color filters comprise a plurality of image-side short-pass color filters sequentially arranged in a cut-off wavelength order between the reference optical axis and the bisecting axis with decreasing long cut-off wavelengths from the reference optical axis to the bisecting axis.

7. The cloaking device of claim 1, wherein the plurality of object-side color filters are co-planar and the plurality of image-side color filters are co-planar.

8. A cloaking device assembly comprising:
an object-side, an image-side, a cloaked region (CR) between the object-side and the image-side, a reference optical axis extending from the object-side to the image-side, and a bisecting axis extending between the object-side and the image-side;
a first object-side CR reflection boundary and a plurality of first object-side color filters on a first side of the reference optical axis, wherein the plurality of first object-side color filters are spaced apart from and positioned generally parallel to the first object-side CR reflection boundary; and
a second object-side CR reflection boundary and a plurality of second object-side color filters positioned on a second side of the reference optical axis opposite the first side, wherein the plurality of second object-side color filters are spaced apart from and positioned generally parallel to the second object-side CR reflection boundary;
a first image-side CR reflection boundary and a plurality of first image-side color filters positioned on the first side of the reference optical axis, wherein the plurality of first image-side color filters are spaced apart from and positioned generally parallel to the first image-side CR reflection boundary; and
a second image-side CR reflection boundary and a plurality of second image-side color filters positioned on the second side of the reference optical axis opposite the first side, wherein the plurality of second image-side color filters are spaced apart from and positioned generally parallel to the second object-side CR reflection boundary;
wherein light from an object located on the object-side of the cloaking device assembly and obscured by the CR is redirected around the CR via at least two optical paths on the first side of the reference optical axis and at least two optical paths on the second side of the reference optical axis to form an image of the object on the image-side of the cloaking device assembly such that the light from the object appears to pass through the CR.

9. The cloaking device assembly of claim 8, wherein:
the plurality of first object-side color filters on the first side of the reference optical axis comprise a plurality of first cut-off wavelengths;
the plurality of second object-side color filters on the second side of the reference optical axis comprise a plurality of second cut-off wavelengths;
the plurality of first image-side color filters on the first side of the reference optical axis comprise the plurality of first cut-off wavelengths;
the plurality of second image-side color filters on the second side of the reference optical axis comprise the plurality of second cut-off wavelengths; and
the plurality of first object-side color filters, the plurality of second object-side color filters, the plurality of first image-side color filters, and the plurality of second image-side color filters are sequentially arranged in a cut-off wavelength order between the reference optical axis and the bisecting axis.

10. The cloaking device assembly of claim 9, wherein the plurality of second cut-off wavelengths are equal to the plurality of first cut-off wavelengths.

11. The cloaking device assembly of claim 8, wherein the plurality of first object-side color filters, the plurality of second object-side color filters, the plurality of first image-side color filters and the plurality of second image-side color filters are long-pass color filters.

12. The cloaking device assembly of claim 8, wherein the plurality of first object-side color filters, the plurality of second object-side color filters, the plurality of first image-side color filters and the plurality of second image-side color filters are long-pass color filters sequentially arranged in a cut-off wavelength order between the reference optical axis and the bisecting axis with increasing short cut-off wavelengths from the reference optical axis to the bisecting axis.

13. The cloaking device assembly of claim 8, wherein the plurality of first object-side color filters, the plurality of second object-side color filters, the plurality of first image-side color filters and the plurality of second image-side color filters are short-pass color filters.

14. The cloaking device assembly of claim 8, wherein the plurality of first object-side color filters, the plurality of second object-side color filters, the plurality of first image-side color filters and the plurality of second image-side color filters are short-pass color filters sequentially arranged in a cut-off wavelength order between the reference optical axis to the bisecting axis with decreasing long cut-off wavelengths from the reference optical axis to the bisecting axis.

15. A vehicle comprising:
an A-pillar; and
a cloaking device positioned on the A-pillar, the cloaking device comprising:
an object-side positioned on an exterior side of the vehicle, an image-side positioned on an interior side of the vehicle, a reference optical axis extending from the object-side to the image-side, a bisecting axis extending between the object-side and the image-side, and a cloaked region (CR) between the object-side and the image-side;
an object-side CR reflection boundary and a plurality of object-side color filters spaced apart from and positioned generally parallel to the object-side CR reflection boundary; and
an image-side CR reflection boundary and a plurality of image-side color filters spaced apart from and positioned generally parallel to the image-side CR reflection boundary;
wherein light from an object located on the object-side of the cloaking device and obscured by the A-pillar is redirected around the A-pillar via at least three optical paths to form an image of the object on the image-side of the cloaking device such that the light from the object appears to pass through the A-pillar.

16. The vehicle of claim 15, wherein:
each of the plurality of object-side color filters and each of the plurality of image-side color filters comprise a cut-off wavelength; and
the plurality of object-side color filters and the plurality of image-side color filters are sequentially arranged in a cut-off wavelength order between the reference optical axis and the bisecting axis.

17. The vehicle of claim 15, wherein the plurality of object-side color filters comprise a plurality object-side long-pass color filters and the plurality of image-side color filters comprise a plurality of image-side long-pass color filters.

18. The vehicle of claim 15, wherein:
the plurality of object-side color filters comprise a plurality of object-side long-pass color filters and the plurality of image-side color filters comprise a plurality of image-side long-pass color filters; and the plurality of object-side long-pass color filters and the plurality of image-side long-pass color filters are sequentially arranged in a cut-off wavelength order between the reference optical axis and the bisecting axis with increasing short cut-off wavelengths from the reference optical axis to the bisecting axis.

19. The vehicle of claim 15, wherein the plurality of object-side color filters comprise a plurality of object-side short-pass color filters and the plurality of image-side color filters comprise a plurality of image-side long-pass color filters.

20. The vehicle of claim 15, wherein:
the plurality of object-side color filters comprise a plurality of object-side short-pass color filters and the plurality of image-side color filters comprise a plurality of image-side short-pass color filters; and the plurality of object-side short-pass color filters and the plurality of image-side short-pass color filters are sequentially arranged in a cut-off wavelength order between the reference optical axis and the bisecting axis with decreasing long cut-off wavelengths from the reference optical axis to the bisecting axis.

* * * * *

UNITED STATES PATENT AND TRADEMARK OFFICE
CERTIFICATE OF CORRECTION

PATENT NO. : 10,688,930 B2  Page 1 of 1
APPLICATION NO. : 15/883875
DATED : June 23, 2020
INVENTOR(S) : Chengang Ji, Kyu-Tae Lee and Debasish Banerjee It is certified that error appears in the above-identified patent and that said Letters Patent is hereby corrected as shown below:

In Column 10, Line 38, after "optical path", delete "13'" and insert --'B'--, therefor.

In Column 15, Line 34, after "optical path", delete "13'" and insert --'B'--, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*